Nov. 3, 1953  R. N. PRICE  2,658,011
APPARATUS FOR AND METHOD OF HANDLING AND WASHING
AMPOULES AND VIALS IN PACKED-LOTS
Filed Jan. 29, 1947  11 Sheets-Sheet 1
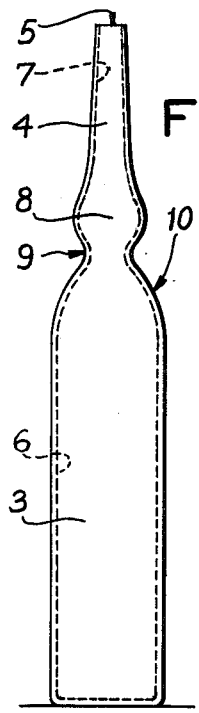
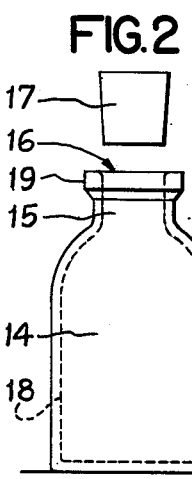
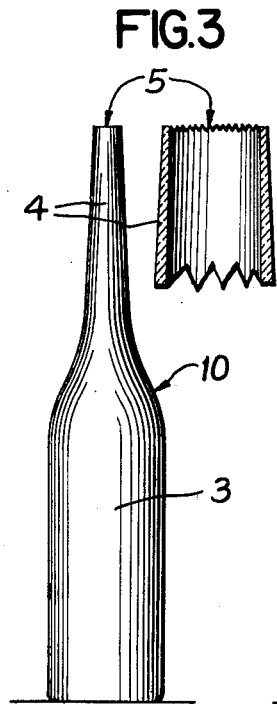
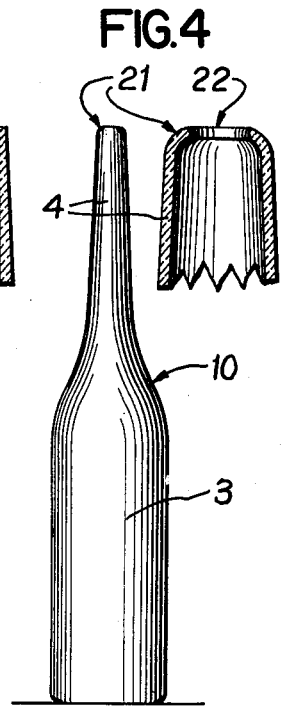
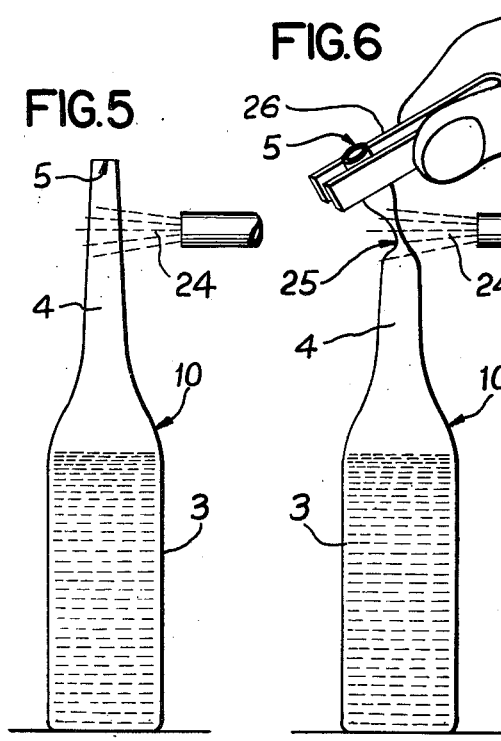
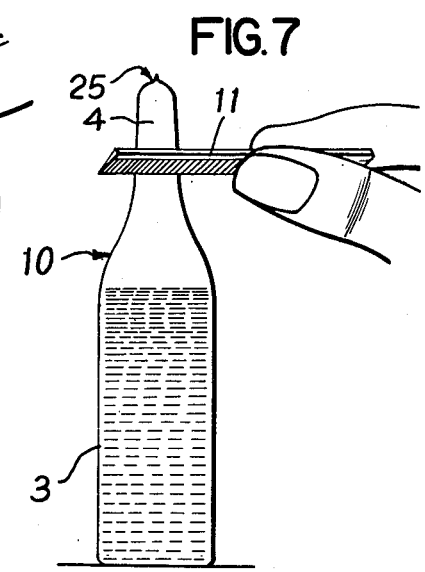
INVENTOR.
RUDOLPH N. PRICE
BY
James C. Ledbetter
ATTORNEY Nov. 3, 1953  R. N. PRICE  2,658,011
APPARATUS FOR AND METHOD OF HANDLING AND WASHING
AMPOULES AND VIALS IN PACKED-LOTS
Filed Jan. 29, 1947  11 Sheets-Sheet 2
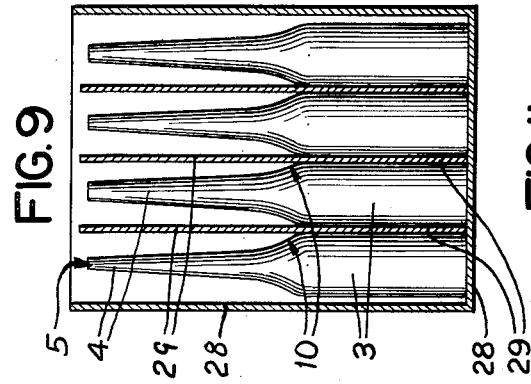
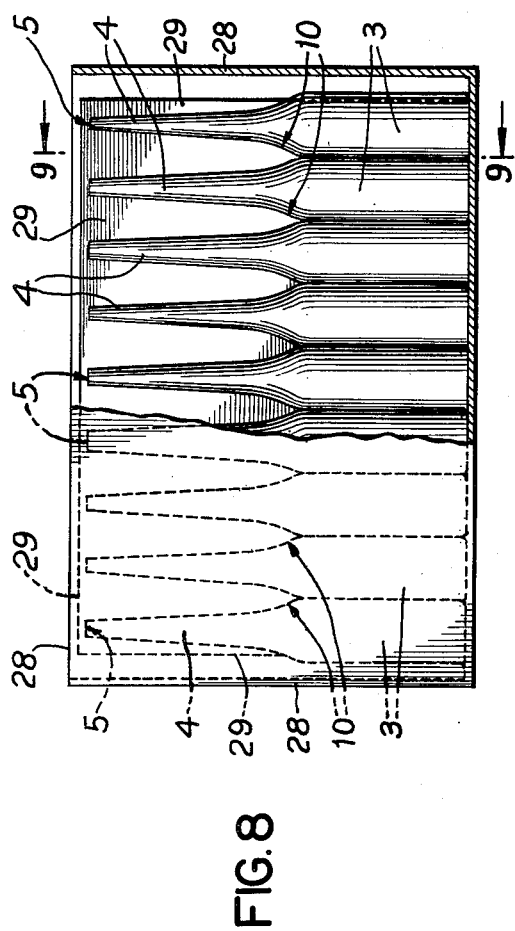
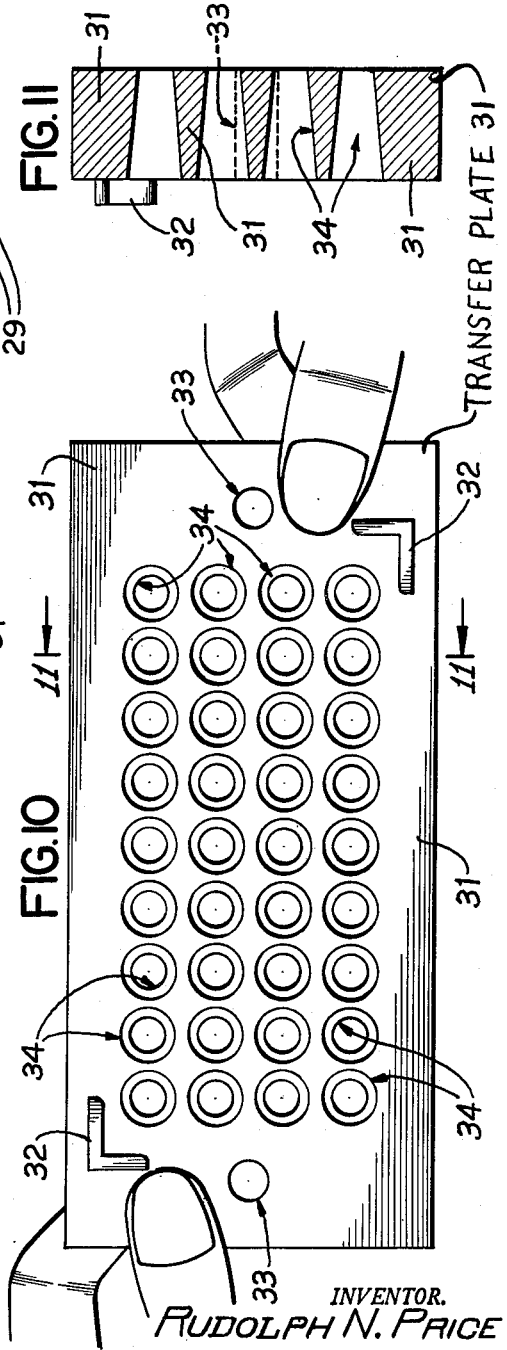
INVENTOR.
RUDOLPH N. PRICE
BY
James C. Ledbetter
ATTORNEY

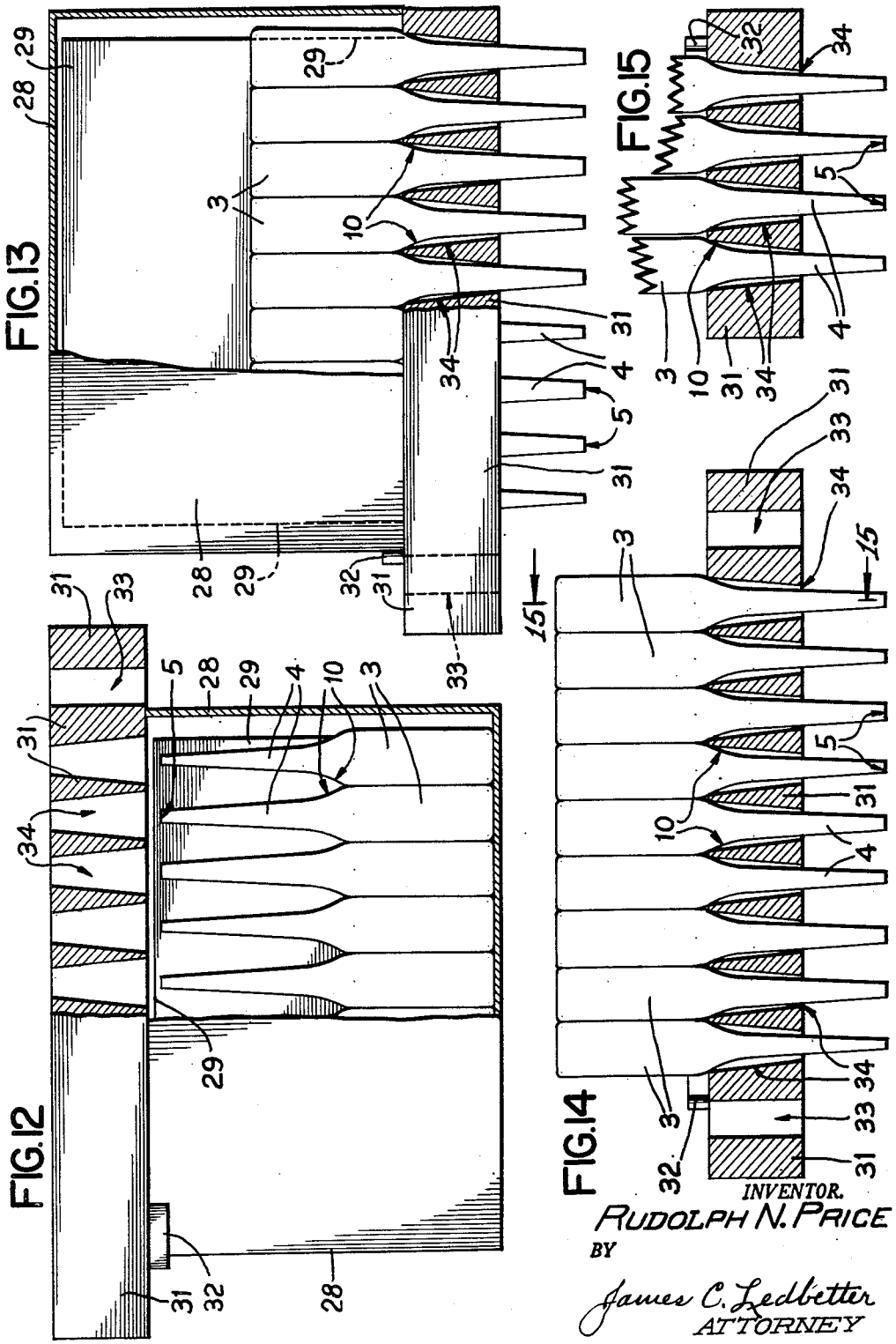

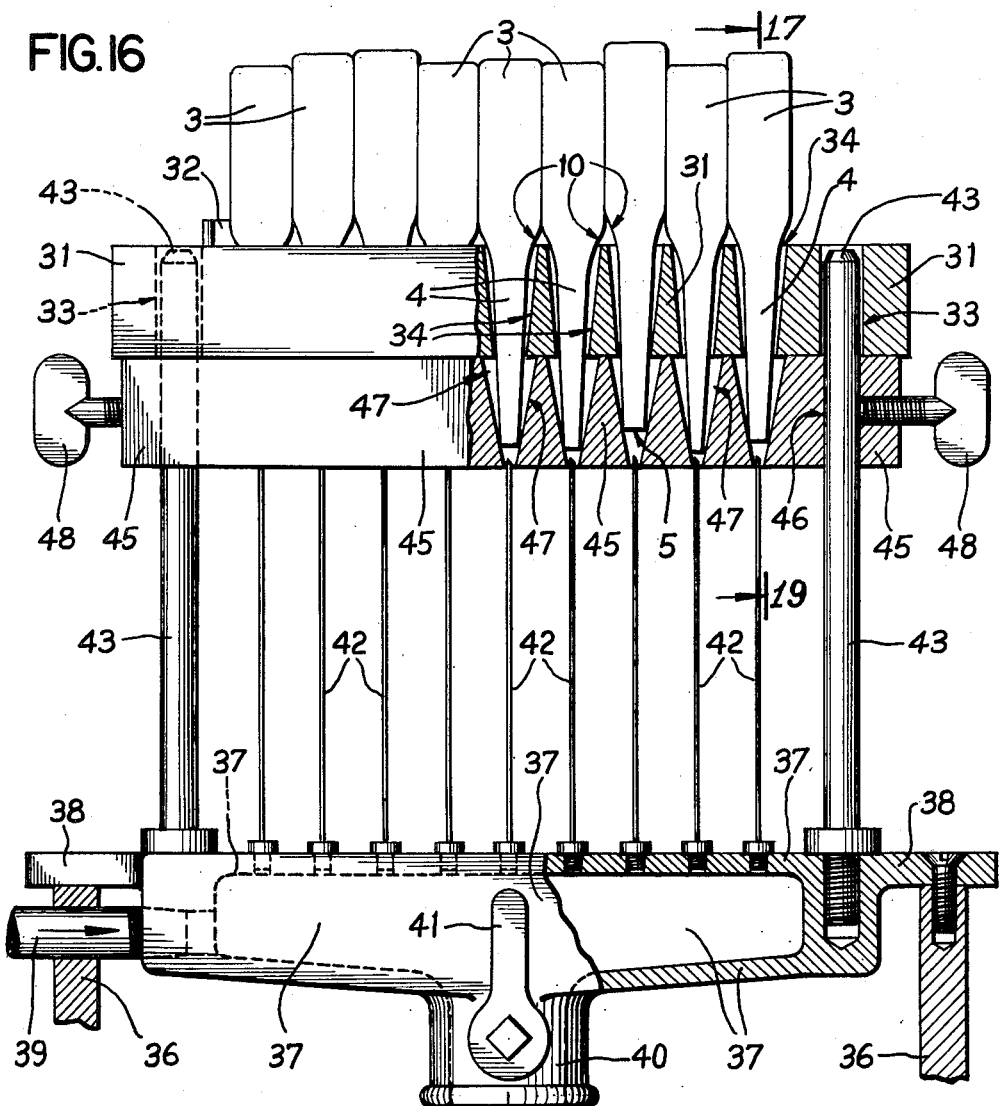
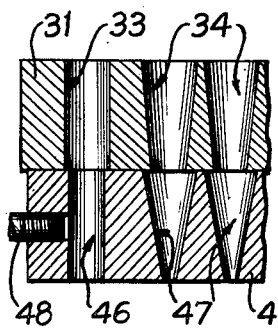
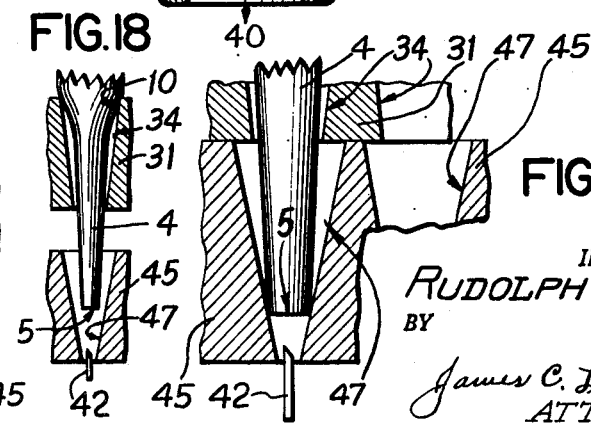

Nov. 3, 1953     R. N. PRICE     2,658,011
APPARATUS FOR AND METHOD OF HANDLING AND WASHING
AMPOULES AND VIALS IN PACKED-LOTS
Filed Jan. 29, 1947     11 Sheets-Sheet 5
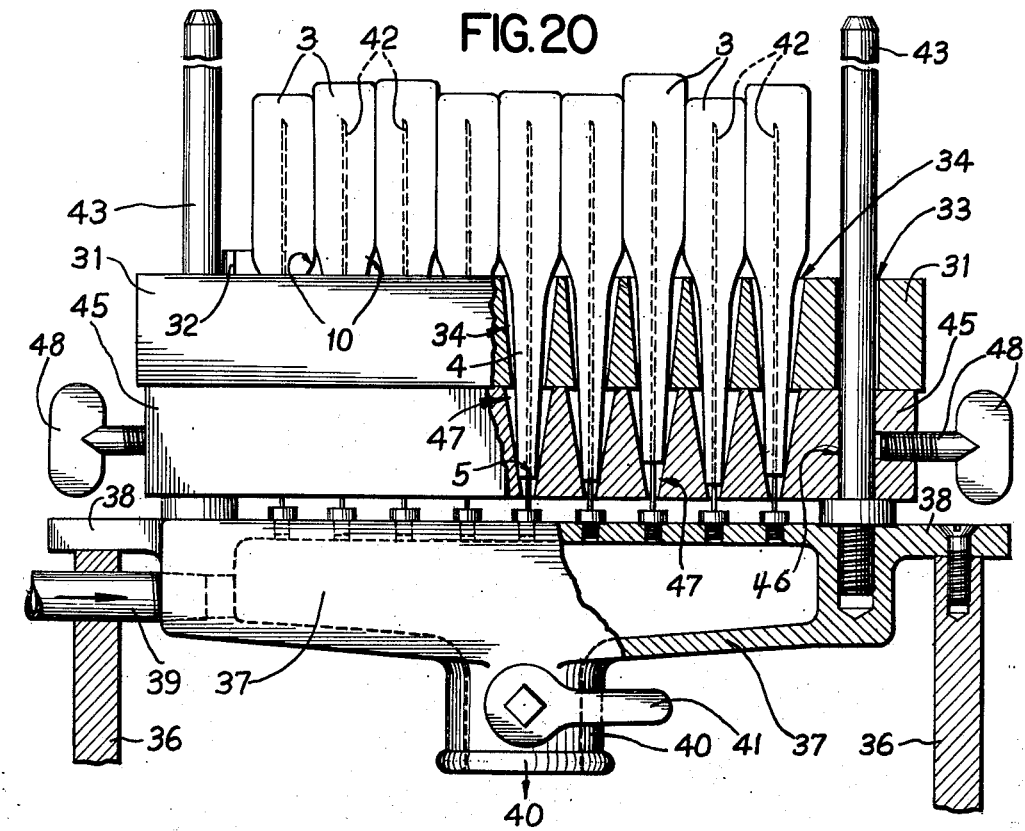
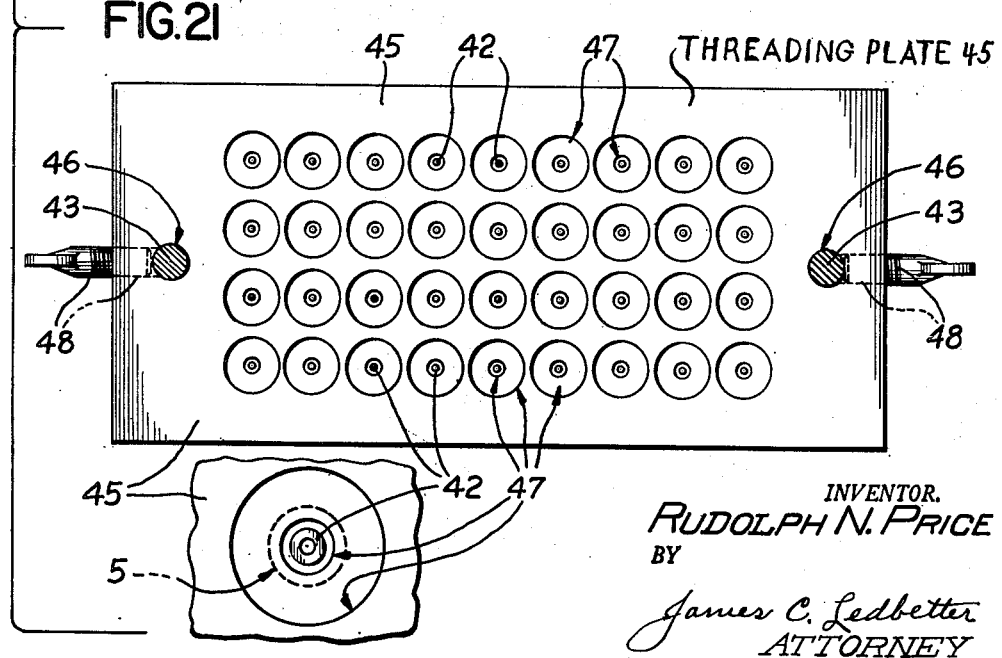
INVENTOR.
RUDOLPH N. PRICE
BY
James C. Ledbetter
ATTORNEY

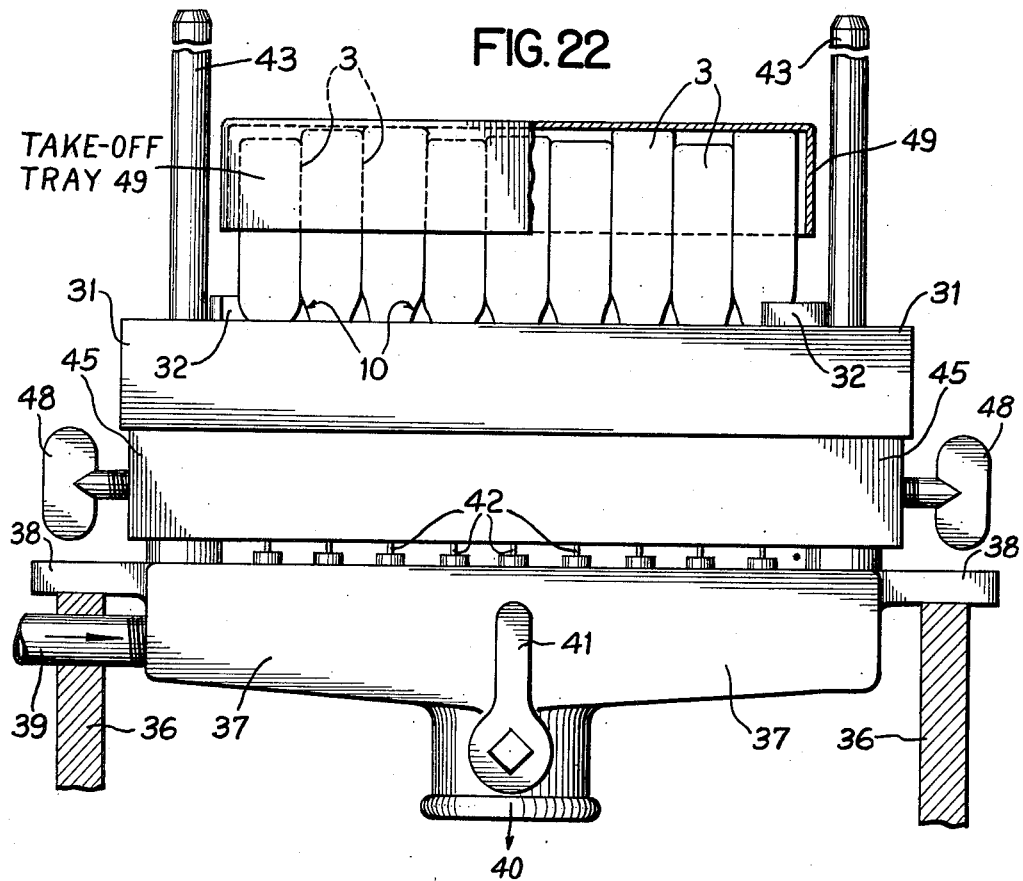
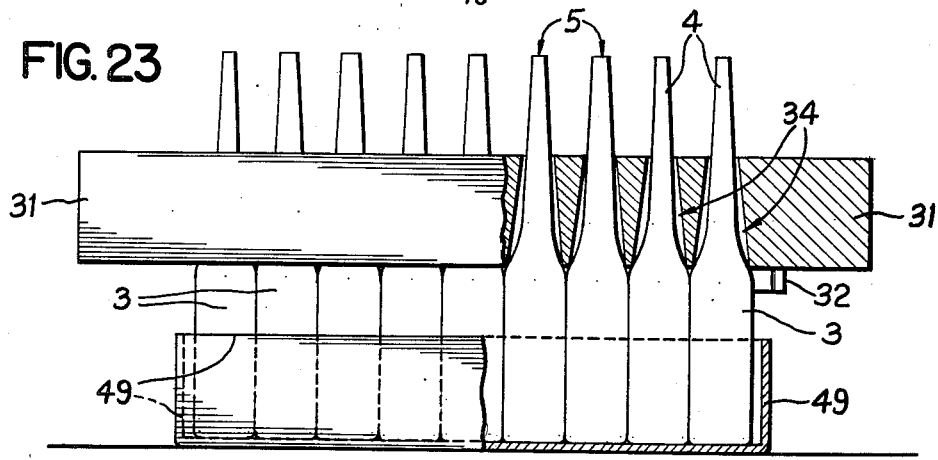

TAKE-OFF TRAY 49

STORAGE TRAY 50

INVENTOR.
RUDOLPH N. PRICE

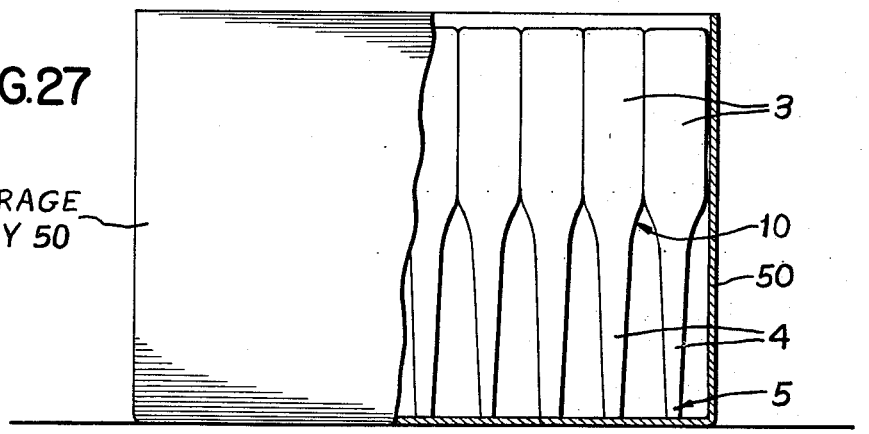
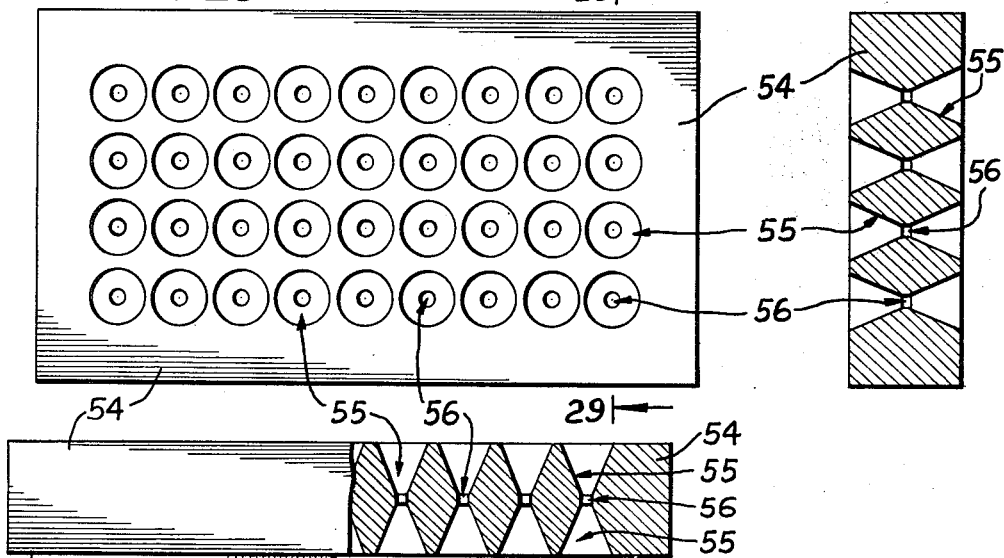
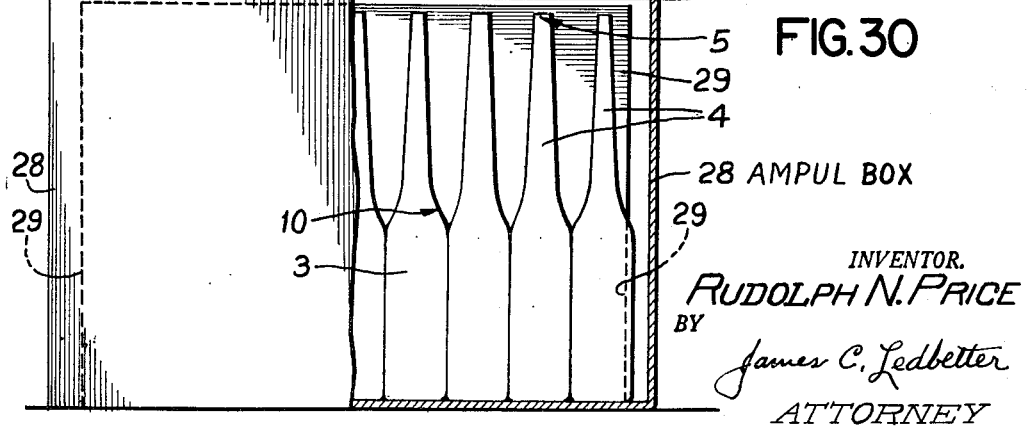

Nov. 3, 1953     R. N. PRICE     2,658,011
APPARATUS FOR AND METHOD OF HANDLING AND WASHING
AMPOULES AND VIALS IN PACKED-LOTS
Filed Jan. 29, 1947     11 Sheets-Sheet 9
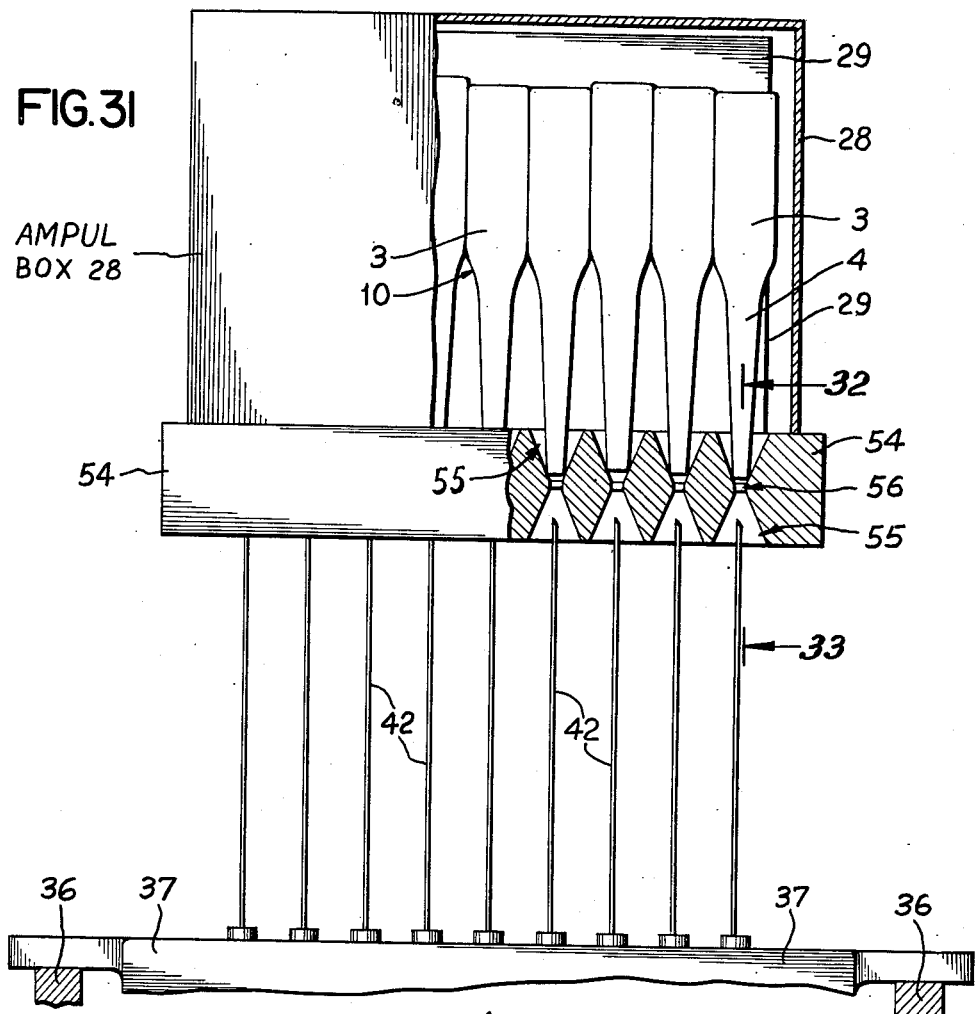
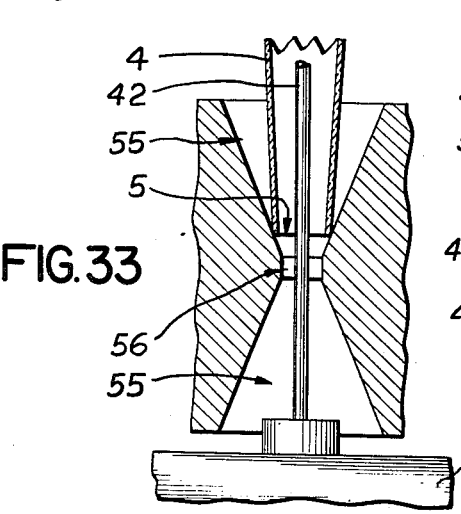
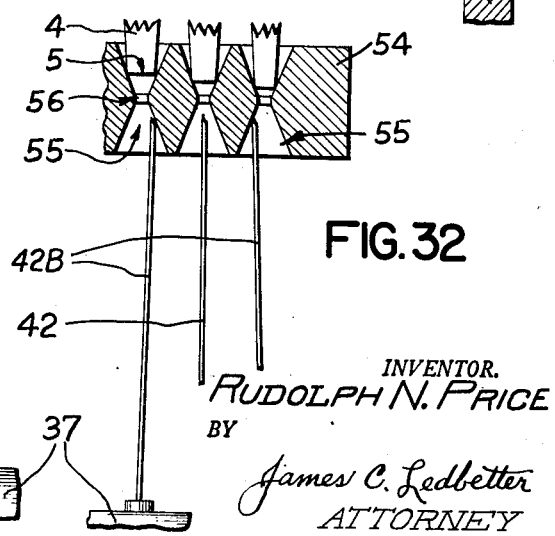
INVENTOR.
RUDOLPH N. PRICE
BY
James C. Ledbetter
ATTORNEY

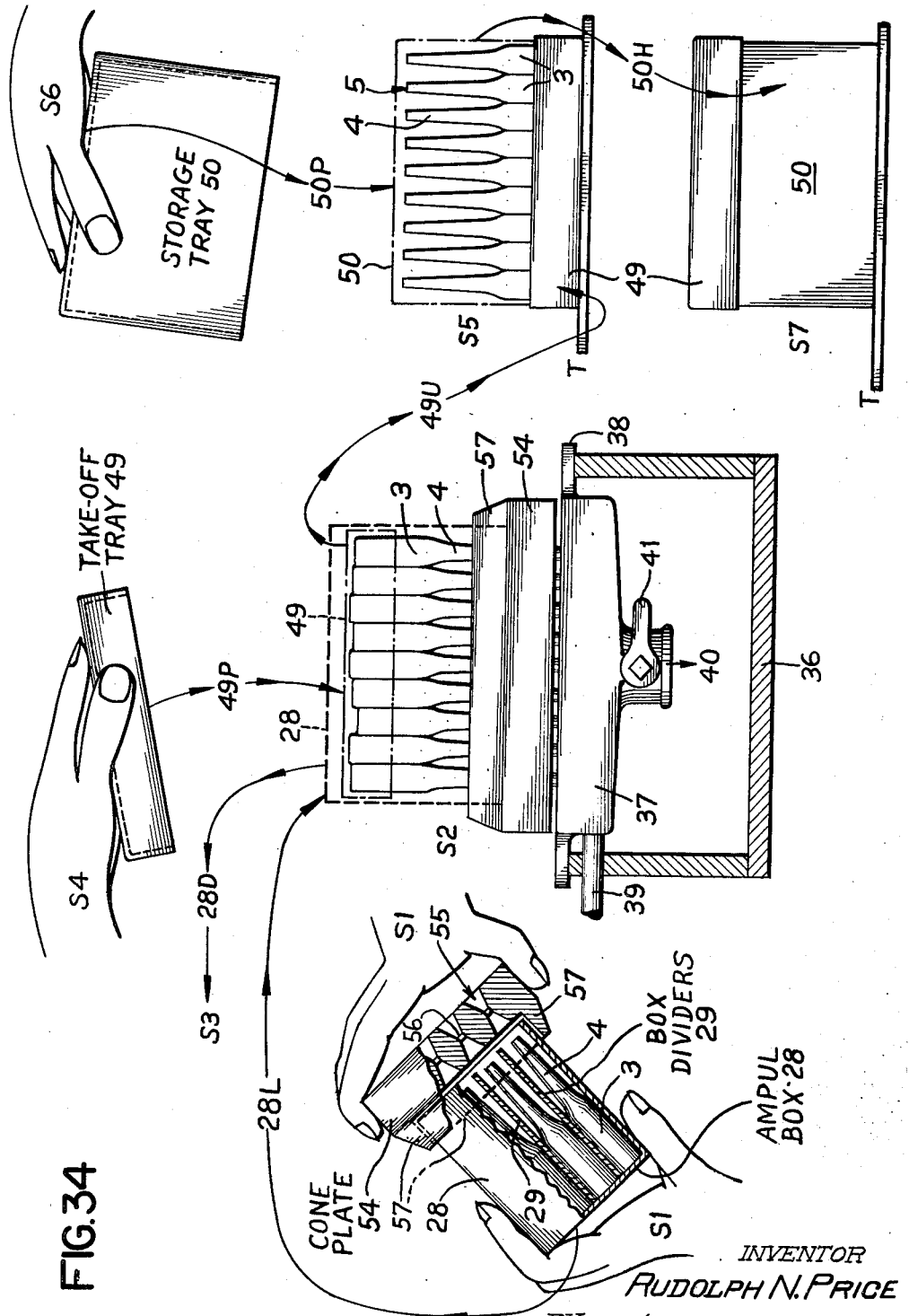

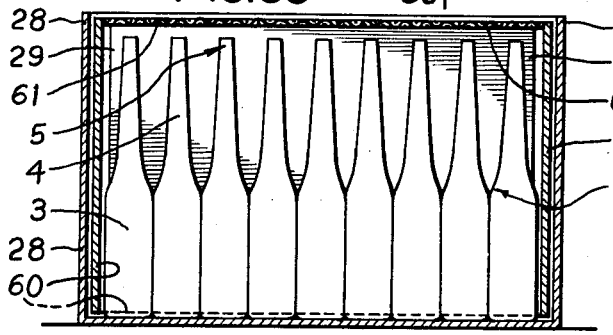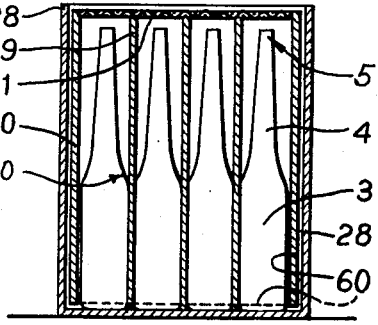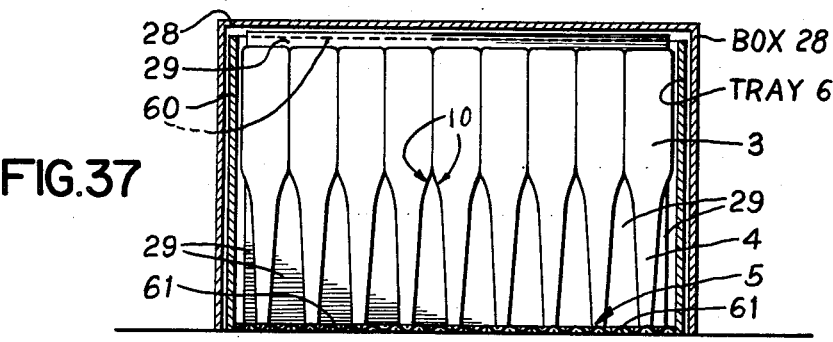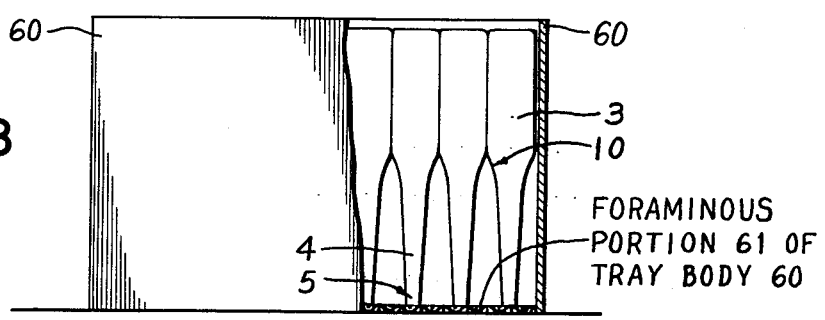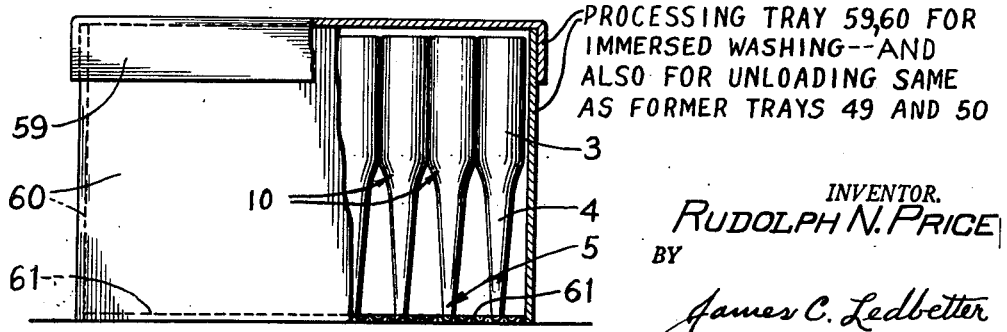

Patented Nov. 3, 1953

2,658,011

UNITED STATES PATENT OFFICE

2,658,011

APPARATUS FOR AND METHOD OF HANDLING AND WASHING AMPOULES AND VIALS IN PACKED-LOTS

Rudolph N. Price, Manhasset, N. Y.

Application January 29, 1947, Serial No. 725,126

33 Claims. (Cl. 134—22)

This invention pertains in general to the ampul and vial art of the scentific-container field and is entitled Apparatus for and Method of Handling and Washing Ampuls and Vials in Packed-Lots.

More particularly, the invention relates to new and useful apparatus and methods for handling, washing, sterilizing and processing scientific or technical containers in lots. Such containers usually are of small size and made of high-grade chemically-resistant glass. They are known generally as "ampuls" and "vials," the latter also being known as "ampul-vials" and "serum-bottles."

My new apparatus is especially suited for use in a comparatively new field (that of the ampul and vial branch of the pharmaceutical art) and more importantly is concerned with ampuls per se of the flame-sealing or flame-sealed type comprising special-glass containers necessarily having long thin necks of ultra-fragile form which pose specific problems when handling them.

The pharmaceutical processing of scientific containers (ampuls and vials) in the United States for medicinal uses is under an essential and exacting standard of United States Government control in the interest of public health. There exist numerous and unusually complex problems arising from the ultra-fragibility of glass ampuls of the flame-sealing type due to the fracturing and chipping of their delicate necks and thin-lip open-mouth tips which is a source of glass-particle contamination well known in the ampul field. In addition, there are numerous sources of contamination, other than the glass-particle aspect of the problem, which are difficult to eliminate.

Some of the known causes of ampul and vial contamination are hereinafter illustrated and explained; and this invention is presented to solve the problems concerning their handling and washing on a newly discovered mass-production basis having a minimum or new low-mark of percentage contamination.

Methods of hand work as conventionally practiced in pharmaceutical-processing laboratories—before, during and after the washing of scientific containers, particularly flame-sealing ampuls—as well as the current use of ampul-washing machines per se (recently on the market and in general patterned after bottle washers), taken all together, clearly appear to be lacking in performance, exactness of quality production, uniformity of purity in finished product, and economy to laboratories which produce ampul and vial products used extensively in the medical field and to some extent in other fields of science.

This invention relates particularly to treating and handling medicinal containers, which are used in connection with public health, for the purpose of obtaining freedom from contamination and for overcoming the lack of performance and the deficiencies above mentioned. The field is a distinctive one since it operates under strict regulations in that branch of science where ampul and vial medicaments are injected into human beings. Consequently, the field is distinguished from other branches of science and also from the commercial trades using glass containers of the common-bottle type for purposes other than the medical profession.

As the foregoing explanation suggests, this invention is proposed for handling and washing "ampuls" per se, of the well known flame-sealing or sealed types, inasmuch as they present the more difficult problems. However, glass vials, ampul-vials, serum-bottles, etc., also may be handled, washed and processed with my new apparatus. Thus my invention is directed to glass containers characterized by their special utility to meet the exacting requirements of this field, and which requirements are not essential and not exacted of the commercial trades which process other forms of glassware.

The exactness of quality performance, in processing ampuls and vials for purposes of public health, as achieved by this invention, does not characterize the common-bottle field. This distinction is due to the fact that the commercial utility of common bottles is such as not to require the application of particular rules and regulations approaching the strictness of those under which ampul and vial processing laboratories operate. Hence, the common-bottle trades and certain other glass-container arts do not approach the quality of professional workmanship exacted by law of the pharmaceutical field and are permitted greater latitude of procedure in mass production of common-bottled goods and the like.

One of the significant factors, therefore, which differentiates the ampul and vial field from other glassware arts, is the requirement for perfection of product in the pharmaceutical field which elsewhere is non-existent. Indeed, perfection in result and purity of product is essential and hence preferred to speed in production.

It is going to be appreciated, as this study is advanced, that the differences between the problems, which confront the ampul and vial branch of the pharmaceutical field and of the ordinary commercial-bottle trades, set a striking contrast in the routine of handling and washing the respective glassware of these two widely-differing industries. More importantly, these differences stem from rules and regulations under which the two industries separately operate.

In keeping with the foregoing, my invention is, therefore, first and primarily intended to improve the art of machine-washing and processing of ampuls and vials in the interest of pharmaceutical laboratories which serve public health.

*Explanation of the art, its unusual problems, inspection and "rejects"*

Flame-sealed ampuls are very delicate and fragile, while cap or stopper-closed vials are somewhat more rugged. Both are made of pure or chemically resistant glass (thus differing from common bottles) and are used for preserving the purity and sterility of "hypodermic" medicaments dispensed to the medical profession in the form of solutions known generally as "injectibles" (technically as "parenteral" medicaments or solutions) which represents the largest use of ampuls and vials).

Since hypodermic or parenteral medicaments are injected subcutaneously or intravenously and, therefore, are not assimilated through the intestinal tract (wherein the human system acts to isolate and discard impurities), it follows that such medicaments must be prepared and dispensed under exacting regulations which guarantee such purity that they may be injected directly into the tissue and blood stream of human beings.

On the other hand, it is recognized that the less-costly goods of commerce, such as drugs, foods, beverages, etc., taken by the mouth, are purified in the human intestinal tract, before entry into the blood stream and, therefore, do not require processing under any similarly exacting regulations comparable to that which characterizes the care and expense in processing of ampul and vial parenteral products such as serums, blood albumin, penicillin, plasma and numerous others.

In pharmaceutical-laboratory practice, the "processing," that is, the preparation or production of products dispensed in ampuls and vials usually includes numerous steps along the production line—such as washing, drying, filling with medicaments, and the flame-sealing of ampuls, likewise the cap or stopper-closing of vials, and sterilizing, inspecting and labeling them—all in connection with these finished or processed glass containers supplied to the professions. Certain of the steps relating to the several aspects of the problem are hereinafter illustrated and explained in order to more clearly describe the invention.

In connection with such "processing" or production, as now practiced, there are numerous manual operations—the handling and manipulating of the ampuls and vials—in the different departments of processing laboratories. This handling and carrying of the glass containers, from place to place in a laboratory by operators, introduces very troublesome and costly problems. Such problems involve fragile ampuls and their glass-particle contamination, originating from the multiplied handling operations, although a lesser problem in some respects arises as to the handling of the more durable vials which, nevertheless, are subject to other varieties of contamination.

In particular, parenteral products are processed and dispensed in ampuls and vials under specific regulations, which set up distinctions between these two containers individually, and which also distinguish both as a class from other fields. Such distinctions make for substantial differences in problems, as compared with the handling and washing of common bottles. The differences are due (as to the ampul phase thereof) to their flame-sealing requirements, a condition not at first readily appreciated. The problem of ampul glass-particle contamination, which inheres in the flame-sealing requirement, is going to be better understood as this description proceeds and introductory illustrations are considered.

It will be found, from the explanation herein, why this new art of machine-handling and machine-washing, and more especially the actual handling per se of flame-sealed fragile ampuls (while it is more generally the washing per se of vials), is extremely exacting and entirely different from the old art of washing bottles, jars, test tubes, flasks and other like glassware which are not processed under the strict regulations of "inspection control" applied to the ampul and vial field.

This class of containers is manufactured in popular sizes which have become standard, the smallest ampul now in general use in the United States being one cubic centimeter capacity.

Ampuls in wide use are available in sizes of 1, 2, 5, 10, 20 and 50 cubic centimeters (cc.), designated 1 cc., 2 cc., and so on. Sizes also are marked in milliliters (ml.), being designated 1 ml., 2 ml., and so on. Likewise, vials of general use (ampul-vials, serum-bottles, etc.) are manufactured in similar cc. or ml. sizes comparable to the above mentioned ampul-size range. The cc. and the ml. are equivalent designations for the same size ampuls and vials. The smaller the glass container (particularly so with ampuls), the more delicate and fragile they are in construction.

The processing of scientific containers, especially ampuls, is a comparatively new art (worthwhile professional acceptance, distribution and use in the United States having begun about the years 1915 or 1916), and research in connection with the handling and washing thereof (ampuls being the more difficult problem) has uncovered meager information on the subject, despite the fact that other glassware arts are well developed. It is not surprising, therefore, that the few available makes of ampul and vial washers per se, which are of very recent use, are fashioned after some of the better types of common-bottle washers used in the commercial trades, and that they require much time for the individual or one-by-one handling of ampuls and vials.

At the beginning of the industry, and as long as the demand for ampul and vial medicaments remained small, with the requirement of "inspection control" not too strict in its application that such medicaments "shall be free" from undissolved particles or other contamination (next explained), the slow individual ampul handling and washing methods were minor problems. However, with increased demand, and coming into existence of modern-processing laboratories, not only has there arisen the necessity for mass production of processed-ampul and vial products, but also "inspection control" against contamination has become more rigidly exacting. These current conditions pose difficult problems since present day methods employed in the quantity production do not appear satisfactory to meet "inspection control" requirements, except at undue expense to the laboratories.

To explain "inspection control"—it constitutes a strict application of legal requirements for exactness of processing under which laboratories prepare ampul and vial medicaments for professional use. Such processing comes under "the Federal Food, Drug and Cosmetic Act of 1938" and also "The U. S. Pharmacopoeia," known as the "U. S. P." The latter is an authoritative compendium listing the medicaments, applying controls under the act, and establishing standards covering its products as a basis for rigid enforcement by the act through the courts for the benefit of public health.

It is instructive to note, among other things, that the U. S. P. XI (effective prior to 1942) simply required that ampul and vial parenteral medicaments shall be "substantially" free of undissolved particles. However, the U. S. P. XII (effective since November 1942) omits the word "substantially" and thus imposes by far a more rigid "inspection control" on the industry, in that "shall be free" is now specified. It is well known in the ampul field that the U. S. P. XII requirements are so exacting as to make mass production difficult and costly due to losses in what is characterized as ampul and vial "rejects."

Such a "reject" is a finished or processed ampul or vial medicament which fails to pass "inspection" and is discarded due to some sort of contaminating foreign matter sealed therein. Thus a "reject" is thrown out by a laboratory-inspection department because it contains a grain of glass or dust, or a shred, or other microscopic foreign matter hardly visible to the eye. Such contamination may be a minute particle from the paper or fibrous shipping box in which open ampuls are shipped from ampul factories to laboratories. A contaminating particle may have survived the rigorous washing operations, to which these glass containers are subjected, or it may have worked into a previously cleansed and purified container, which thusly becomes recontaminated before it is filled and sealed.

In an "ampul reject," such foreign matter frequently consists of one or more microscopic particles of glass which somehow get into an open ampul either before or during its flame-sealing, while in a "vial reject" it also may be glass but is more likely to be a minute shred or other foreign particle. In any event, a "reject" contains a microscopic "floater," or an "undissolved" foreign substance which somehow enters the container but never shows up until after the labor and material of processing it have been expended and, thereafter, it is discarded under "inspection control."

Although handled with great care, it nevertheless follows that an empty ampul or vial (although initially washed clean) may pick up a particle of foreign matter, or a recontaminating speck may enter from the air somewhere along the production line. After flame-sealing filled ampuls and cap-closing or stopper-closing filled vials, the foreign matter shows up by strict examination under an inspector's light, and the laboratory accumulates additional "rejects" as a loss in production.

These "reject" losses often run 15% or more, with wide variations, and without any consistent averages. Needless to say, penalties, sometimes very severe, are exacted by the Courts for failure to comply with requirements of the U. S. P. Such losses, currently, lay a heavy burden on pharmaceutical laboratories in the cost of materials and workmanship going into that percentage of ampuls and vials which subsequently become "rejects."

This invention, therefore, is proposed for solving the problem in connection with mass production of ampul and vial medicaments, complying with the U. S. P., and decreasing the current excessive percentage of "rejects" suffered by the laboratories.

In my quest for a solution of the problem of ampul and vial "rejects" and study of the few known ampul and vial per se washing machines now in actual use in the United States and other countries, as well as the very few shown in the U. S. and foreign patent art, I have found that they generally have a mode of operation similar to commercial-bottle washers. In other words, laboratory operators (according to conventional practice) handle ampuls and vials one-by-one (hence individually or a few at a time) by hand and during one or more steps of the washing operation after the fashion of bottle washers.

Thus under present day methods, the fragile ampuls (as received at laboratories in original-shipping boxes carefully packed at an ampul factory) must be and are individually separated and handled. Such "operator handling" of ampuls unavoidably damages them when removing the ampuls from their shipping boxes, as for example, one, two, or a few ampuls at a time, or by the handfuls, in making ready to put them through a conventional ampul washer. This damage is due to fracturing and chipping of the delicate ampuls and is caused by rubbing them frictionally against each other, or by impingement, either in the hands of an operator or in work receptacles used for carrying them along the production line and in which the open-mouth ampuls are commingled.

It follows, therefore, as to fragile ampuls of the flame-sealed type, shipped from an ampul factory in original factory-packed boxes, that when these shipping boxes are opened by operators in processing laboratories under conventional practice, the ampuls are immediately disseminated and treated generally as if they were common bottles. Each box-lot of fragile ampuls (usually a gross to a box) immediately loses its protective-box and "contiguous-body" relation. I have found that such relation (hereinafter illustrated) constitutes an advantageous and protective assurance against glass chipping. This contiguous-body relation of glass containers is afforded by the unity of an original-factory box-lot or package-lot and its retention "in situ," that is, their original position as shipped to processing laboratories.

In this connection, it appears from my research herein that flame-sealed ampuls constitute a field, and apparently the only one, in which the maintaining of the glass containers in contiguous-body relation and in original box-lot unity makes for such difference in perfection of end results attained. In the common-bottle processing trades, there is apparently no need for maintaining the original package-lot unity of a group of glass containers. Consequently, no particular disadvantage stands out in disseminating, separating, commingling, and handling bottles individually or by handfuls in what is the usual and most natural manner.

Significantly, it is the ampul neck-and-mouth spacing, as provided by the simple shipping box-lot packing done in an ampul factory, which prevents damaging impingement and fracturing or grinding contact (glass chips) so long as the contiguous ampul-body relation is maintained. This characteristic and simple advantage of ampul packaging—to which my apparatus is adapted—constitutes a correlated part of my invention. It leads to a mode of operation which I sometimes refer to generally as "box-lot handling" and more specifically as "dump-loading" of a box, package or multiple-lot of given-number of ampuls, in situ, into my new washing machine and "dump-unloading" the washed ampuls therefrom in "massed-lot" formation.

In addition to the above new method of washing operation, my ampul or container-handling devices also act to maintain the contiguous-body relation, hence the above named neck-and-mouth spacing, after the containers come out of the washer in "massed-lots" and until they reach the filling and sealing departments in a processing laboratory. Consequently, the invention eliminates conventional handling all along the production line, particularly avoids damage to ampuls, and facilitates processing of both types of containers.

Among other things, therefore, my invention is based on the foregoing discovery or appreciation of the fact that factory-packed shipping boxes, for ampuls in particular, are so constituted as to lend themselves to my new method of an apparatus for protective "box-lot handling in situ" before and during the washing operation and also to protective "massed-lot" handling after said washing operation when the ampuls are being further treated along the production line of a processing laboratory. Under all three conditions, that is, before, during and after washing, the protective box or package-lot unity is maintained by holding or constraining the given-lot of open-mouth glass containers in contiguous-body relation. Fundamentally, it is this relation thusly maintained by which I solve the problem stemming from conventional practice of operators handling ampuls one-by-one.

Such solution of the problem is found practical and operative, under the control of my method and apparatus, by initially employing the original factory-shipping package (usually a box) as a part of my container-handling means for loading my new washing machine. However, early in the procedure, I eliminate the shipping package since it is of "fibrous" form, is a source of contamination because made of paper, and sheds microscopic fibrous dust and shred particles.

Quantities of these shipping packages (vial cartons and ampul boxes) made of paper accumulate in a laboratory, must be handled and disposed of, in course of which they tend to contaminate the ampuls and vials, the atmosphere, the loading-and-carrying trays, etc., and other processing equipment. My container-handling devices are "non-fibrous" in construction and are employed for handling a box-lot of ampuls and vials with minimum contamination.

*Conventional ampul washers, handling after washing, and problems*

Concerning the opening up and the emptying of an original factory-packed shipping box of flame-sealing ampuls, as currently practiced, it is now seen that the procedure requires the operators either to remove the open-mouth fragile ampuls individually from the box or by the handfuls. Or the ampuls may be indiscriminately piled into work trays when making ready for the vast amount of hand-work which is entrenched in present day methods of hand and machine-washing and the processing of ampuls.

This routine handling of ampuls singly or by the handfuls goes on almost incessantly in processing laboratories—before, during and after washing—and results in abrasion, chipping and fracturing. Aside from the damaged ampuls which are discarded at the outset of the processing work, and hence do not get into the production line, the real loss results from glass-chip particles which accumulate from damaged ampuls on the production line and which subsequently get into the ampuls, thereby causing them to become "rejects," as explained in the previous topic.

The summary herein of the complex subject explains the conditions existing currently, due to the operator-handling methods practiced from the inception of the industry, and imposes substantial expense on processing laboratories. The root of the problem of ampul chipping and breakage, with glass-particle accumulation, which causes contamination and excessive percentage of "rejects," has not been eliminated by the use of present day washing apparatus. There are available very few examples of devices and machines due to the fact that washing ampuls is a comparatively new art.

My research has not brought to light any ampul-handling devices per se which manipulate ampuls "box-lot in situ," as herein taught. However, there are known examples of devices and procedure, for merely washing ampuls, which operate as follows:

(1) First, there is the simple hand-washing of ampuls. It is still practiced to a limited extent, as from the beginning of the industry. This oldest method includes the use of a needle-like nozzle (sometimes called "needle-nozzle," also "needle" for short) inserted by one hand into an ampul held by the other hand. Such hand-manipulated ampul-washing nozzle is similar to a hypodermic needle. It is of tubular-needle form and through which water is squirted under pressure into the ampul. In this method of hand-washing, hot water and/or steam cannot conveniently be used because of discomfort to the operator while holding the ampul. Actually, this simple or crude hand-washing of ampuls constitutes mere "rinsing" and is not satisfactory either in degree of cleansing or quantity production.

(2) Next, there is an improved method of hand-washing in more general use which includes a plurality or a row of upright needle-nozzles mounted on a hot-water and steam manifold. Operators place ampuls one at a time by hand over the tubular needles, whereupon hot water and steam (and sometimes air) squirts or flows in and out of the ampuls under pressure to clean them. The ampuls must cool before being removed by hand from the row or rows of fluid-pressure squirting needles. This slow hand method of washing also entails much individual handling of the fragile ampuls before and after washing.

(3) More recently, there are available motor-driven types of machines which require operators to feed the fragile ampuls by hand into the machines and collect and remove them after the washing operation. Certain of these machines (like the two needle-type devices above explained) possess the advantage of being fluid-pressure squirting-needle washers. The fragile ampuls sometimes discharge from the needles into impingement with each other, thus increasing the likelihood of simultaneously fracturing two or more ampuls at the outset of their processing, that is, during the washing operation.

(4) Also, there are types of motor-driven and manually-operated washers having trays which are filled by hand with ampuls and immersed in a washing solution. These immersion type ampul washers do not employ fluid-pressure squirting-needles. Hence, there is no provision for preventing the soil on the outer surfaces of the ampuls from contaminating the washing fluid, in which the ampuls are immersed, and which is forced in and out of the ampuls in one way or another, as by centrifugal action in one type and vacuum pulsations in another.

In all the examples above noted, the ampuls are either removed individually, or by the handfuls, or emptied disorderly from their original factory-packed shipping boxes for the purpose of initiating the washing operations. Due to the fracturing and chipping caused by this conventional procedure, it is the practice to sort out the damaged ampuls from the beginning of the processing steps. This manual-sorting operation starts immediately the original-shipping box is opened and the removal of the ampuls therefrom begins.

Indeed, it is this initial handling at the very beginning of the production line, even before reaching the washing station, which damages a percentage of the fragile ampuls and which constitutes the root of the ampul problems.

From my research, it appears that present day ampul-washing machines are not substantially faster, and no not perform better work, than the more improved form of hand-washing or semi-machine method (Example 2 above) which has persisted in use since shortly after ampuls were first introduced. Moreover, present day ampul-washing machines as such appear to be beyond the reach in cost of many of the small laboratories. The washers usually are electric-motor driven, have a number of moving parts, and generally require that the previously handled fragile ampuls be actuated or moved about within the machine during the application of water, steam and air used for washing them.

In addition to the above summary of conventional ampul washing, it is important to explain that the fragile ampuls usually are handled after washing in the most obvious way— that of piling disorderly lots of ampuls comingled onto tables or into work receptacles such as metal trays and sometimes into fiber-shedding paper boxes for carrying them along the production line.

The handling operations after washing, as now practiced, produce glass particles by abrasion and chipping and, due to the influence of gravity, cause these particles to fall or work into the washed ampuls, thereby recontaminating them. Gravity-induced contamination especially affects those particular ampuls, in a given-tray lot, which may happen to land upright in a comingled mass when disorderly piled. These detrimental conditions also apply to glass vials, since they are conventionally handled in a similar manner, but vials are less likely to be damaged by chipping because they are more rugged; they resist fracture and, of course, are handled in trays separately from ampuls.

Furthermore, when carrying comingled ampuls or comingled vials in their respective work receptacles or trays, from place to place in a laboratory, after the washing operation, they may pick up particles of foreign matter (such as glass chips) from each other, or contaminating substance (dust, lint, shreds, etc.) may enter from the air. Foreign matter, especially glass, may be picked up when a washed container (especially an ampul), if it is still moist, strikes one or more previously washed ampuls or falls onto a work surface from which previously washed and chipped ampuls have been removed by an operator. Thus the washed container is recontaminated.

The cause and origin of flame-sealed ampul contamination is troublesome, complex, and difficult to locate, much less isolate and eliminate, even in the most careful processing work. This is generally true despite the fact that it may be known to a processing-laboratory superintendent that a goodly percentage of the foreign matter (in a particular lot of reexamined "ampul rejects") comprises glass chips. In any event, these microscopic-contaminating particles show up as "floaters" or "undissolved particles" when finished ampuls are shaken, turned end on end, and examined under the inspector's light. Such ampuls become "rejects," under inspection control of the U. S. P. and are a loss, as previously explained. The same is true of "vial rejects," with the difference that contamination is less likely to be that of glass particles, as will be appreciated upon further consideration.

The difficulties encountered in processing ampuls and vials, more especially fragile flame-sealing ampuls, also is rendered tedious and exasperating to laboratory superintendents due to wide variations from time to time in percentage of "rejects" thrown out by laboratory-inspecting departments. There is great difficulty in locating the point, place or station, or operator, or piece of equipment, along the production line, where the fault of contamination unexpectedly sets in, there eliminating it, and stabilizing the corrected conditions against reoccurrence at that or some other station in the laboratory.

The use of filtered or distilled water, air-conditioned work rooms, cleaned steam and air, and cleaned working equipment is not a final solution of the problem. This particularly is true concerning glass-particle contamination of ampuls which is the more difficult problem plaguing the industry with costly percentage of "rejects."

*Proposed solution of the problems and purposes of the invention*

It clearly appears from my research that efforts heretofore made to avoid contamination of these special-glass containers, particularly ampuls, start too late in the processing steps. It is found that prior efforts have sought to deal with the problem only after the fragile ampuls have been removed from their original shipping boxes (as received from an ampul factory) and hence after suffering damage due to handling, separating and disseminating them, thereby failing to treat the problem at its root.

The genesis of my invention stems from the root of the difficulty which begets this problem of scientific containers and more especially the ampul aspect thereof. I provide a new method, in a combined washing-and-handling operation, which starts with the ampul-shipping boxes and with the vial-shipping cartons, and which adapts these packages to a new environment. My method functions oppositely to conventional practice, in that I do not break up and disseminate an ampul-factory packed-lot of containers.

Accordingly, I start (1) with the ampul box or vial carton; (2) remove such packaging means bodily from its unified-lot of glass containers and thus eliminate conventional one-by-one tedious and damaging-handling operations; (3) I then maintain said unified-lot of containers in contiguous-body relation which in turn positively holds their necks and mouths in protectively-spaced relation; and (4) I finally dispose said unit-lot of containers up-ended thus keeping their open mouths down in order to prevent gravity-induced contamination of the containers.

The removal of the paper package from the glass containers and subsequently confining them in situ while washing constitutes a single and continuous operation which is in marked contrast to the conventional practice of somewhat haphazardly removing the glass containers by handfuls from the package and disorderly comingling them. I propose to handle and wash the containers in a unified-lot while confined in situ and then route them in an orderly inverted massed-lot to the filling department of a laboratory, where they not only arrive as an original unified-lot but also with their open mouths down for protecting them against gravity-induced contamination. The washed containers then are turned upright for further processing steps.

Furthermore, I propose to solve the problem by performing box-lot or unit-handling and washing since this plural method constitutes a more rapid procedure than individually treating the containers, results in "stationary washing" as distinguished from "motion washing" now practiced by moving them in and about a washer, and also eliminates motor-driven apparatus with its servicing.

By such rearrangement of conventional procedure, I provide ampul and vial-handling and washing apparatus of minimum size, also inhibit the handling of one or a few containers at a time, and prevent the indiscriminate and comingled emptying thereof into and from work receptacles. And finally, I eliminate the conventional function of said work receptacles or trays as such, now largely employed, in carrying comingled glass containers from station to station in a laboratory. This new principle has not been availed of heretofore in the ampul and vial field for attaining the new results herein. Thus I come to the purposes of the invention.

According to the foregoing, it now may be explained that a major purpose of this invention is to provide a method of and devices for handling and treating ampuls and vials, by removing the original-shipping packaging-means from said containers, while maintaining their package-lot unity, and for thereafter also maintaining said unity of the containers by holding and confining them in contiguous-body relation and thus protected by spacing their necks and mouths apart, as well as maintaining their open mouths turned down for protection against gravity-induced contamination—all along the production line of a processing laboratory.

Another purpose is to provide ampul-handling devices which have their novel function further enhanced and distinguished by including means to stabilize, retard and minimize the slipping of the down-turned tips of a massed unit-lot of top-heavy ampuls to prevent them from skidding in said handling devices and which, therefore, aids in confining the ampuls in massed-lot contiguous-body relation, thus avoiding tumbling into a comingled pile and reducing or preventing impingement and fracture.

It is a purpose also to provide container-handling devices of new utility for maintaining the package-lot unity—before, during and after putting the containers through my "needle-type washers or sterilizers" as herein shown—as well as for putting them through any other method of cleansing or other types of washers or sterlizers, if any, which may be found suited to my container-handling devices in their several forms.

One of the more important purposes is to provide a washer having means for "dump-loading" into it the glass containers in situ from their shipping package, also for "dump-unloading" them with their open mouths down, and thereafter maintaining them in contiguous-body relation within the unloading and handling devices.

Also it is a purpose to provide a washer and sterilizer which embodies present day fluid-pressure stream-squirting needles, that is, a "needle-nozzle" type washer which is specially suitable for combined operation with my new-purpose container-handling devices and which washes and sterilizes at a single operation one or more package-lots of containers.

Furthermore, a purpose is to provide a washer and sterilizer of simple form, being manually operable and of small size, which performs its operations while the glass containers are held in "stationary" position therein, and which has "no parts movable as such" during the washing operation to accumulate and give off machine-produced contaminating particles from moving parts.

A further purpose is to provide a washer with means which readily may be actuated to its container-loading position, thence to its "stationary-washing position," and back again to unloading position—the several cycles of which (loading, washing, steaming, sterilizing, etc., and unloading) are performed while maintaining the containers in package-lot unity.

Another purpose is to speed the washing operations on package-lots by producing a combined container-handling means and needle-type washer, in which high-temperature air or steam may be used for sterilizing, thermally-shocking and drying the containers without slowing down the work, and in which the operator need not touch the hot containers when unloading them from the washer.

A consideration of this invention, as by study of the disclosure herein or observing the apparatus at work under my method of "package-lot" handling, will suggest various other purposes and advantages, and also will demonstrate increased economy in production of processed containers, as well as a decrease in ampul and vial "rejects."

*The drawings*

The explanations herein of the problems concerning scientific containers of glass used in connection with the public health, and my treatment of such problem at its root, will be more readily understood by employing introductory illustrations of typical forms of ampuls and vials.

As to ampuls, there are several types involved, and such illustrations make more comprehensive an understanding of why the flame-sealing thereof requires a physical formation of glass which characteristically makes ampuls ultra-fragile and hence difficult to handle, and why the washing of ampuls poses a distinct problem in processing similar in some respect to vials but differing in others.

It is also pointed out that research in connection with these problems reveals meager information on the subject of glass containers for parenteral medicaments to which reference otherwise might be made for the information of all concerned. This is especially true of flame-sealing ampuls of the type herein treated. In view of these facts, the general explanations herein made (apparently for the first time in the art), and the introductory illustrations about to be referred to, are believed to be appropriate as a teaching of the problems involved in the new field of machine-handling and machine-washing of ampuls and vials and are essential to an understanding of the particulars of my invention.

Accordingly, reference now is made to the accompanying 11 sheets of drawings, first, Sheet 1 showing typical flame-sealed ampuls as well as an example of a stopper or cap-closed vial and on Sheet 2 an exemplary box-lot of ampuls.

*Figs. 1 through 9 show small-size glass containers of the scientific type and a box-lot of ampuls*

Fig. 1 of the drawings shows an open-mouth empty ampul (known as the constricted-neck type) adapted to be flame-sealed, after it has been washed and filled with a medicament.

Fig. 2 shows a squat-type vial (ampul-vial or serum-bottle) with a stopper or cap for closing its open mouth after being washed and filled. In appearance, many vials resemble common bottles; accordingly, Fig. 2 serves the further purpose of convenient comparison hereinafter made between vials and bottles.

Incidentally, the ampul and vial (Figs. 1 and 2) are shown actual size on the original Patent Office drawings. Both are 20 cubic centimeter (20 cc.) or 20 milliliter (20 ml.) capacity scientific containers.

Fig. 3 and other views to follow show what is usually known as the straight-neck ampul. Its open mouth tip diameter and neck size are magnified (see fragmentary sectional in-set view) in order to show the unfinished, rough, or ragged edge, which results in manufacture. Such a mouth edge accentuates ampul abrasion, chipping and fracturing, unless they are glazed, as next illustrated.

Fig. 4 shows an ampul having a fire-finished or glazed-mouth to impart a smooth surface having the advantage of resistance against the above-mentioned abrasion, chipping and fracturing. The magnified portion (see fragmentary sectional in-set view) more clearly shows the glazed mouth and reveals its shrinkage. This latter condition introduces a disadvantage in processing, as later explained.

Fig. 5 shows the start of flame-sealing a washed and filled ampul by momentarily applying a gas-jet flame to its neck.

Fig. 6 shows the final step in flame-sealing, as by the hand operation shown; but more generally sealing is effected by automatic machines.

Fig. 7 shows a processed flame-sealed ampul being ring-cut around its neck by a physician using a cutting file preparatory to breaking off the neck to make the ampul contents available for use by inserting a hypodermic-syringe needle for drawing out the parenteral medicament.

Figure 24:
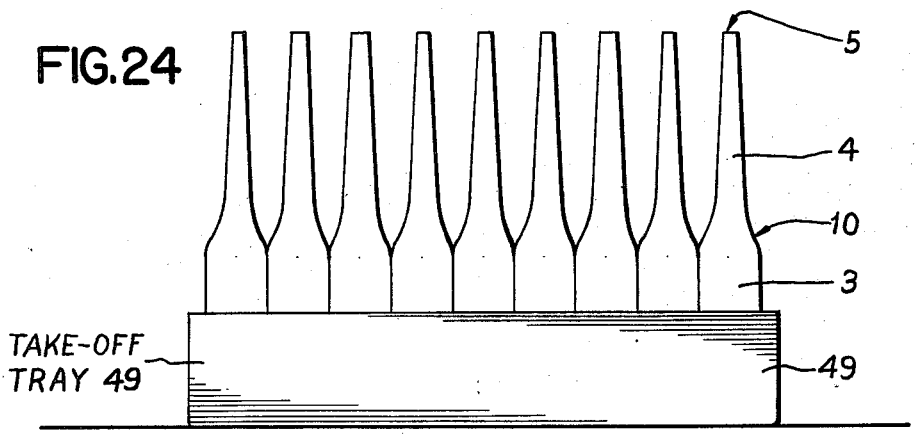

Fig. 8 represents a side view (in elevation and section) of a box-lot of given-size ampuls of the flame-sealing type, as packed at an ampul factory in a light-weight paper shipping box which I adapt to my new handling-and-washing apparatus; and Fig. 9 is a transverse section on the line 9—9 showing an end view of the box-lot of ampuls. These two views are exemplary of factory-packed shipping boxes of paper and show the wide variations in sizes of the necks and mouth tips of ampuls in given-size box-lots.

Ampuls are chosen for illustration in box, package or multiple-lots inasmuch as they present a more difficult problem than vials (Fig. 2) in handling and processing.

In order to make practical the illustrating of the several aspects of this invention, Figs. 8 and 9 show a box-lot of 36 ampuls packed in 4 separated rows of 9 contiguous ampuls to the row. However, one prevailing standard form of factory package is put up in 9 separated rows of 16 contiguous ampuls to the row (gross box-lot); and my new container-handling apparatus herein processes such box-lot of 144 ampuls through my washer, in its several forms, routing them to the laboratory filling and sealing departments by the new method herein described.

Referring further to the drawings (in general to Figs. 1 through 9), three forms of typical flame-sealing ampuls are shown (Figs. 1, 3 and 4) as having long tubular bodies 3, an ampul being adapted to hold one dose of medicament. Ampuls also have comparatively long and small-diameter thin-wall necks 4, which taper outwardly to form open thin-edge mouth-rim tips 5 of smaller diameter than the necks. In general, ampuls have frail glass walls as dotted-in at 6 (Fig. 1), which makes them quite fragile, especially so at their tapering necks 4.

In the manufacture of flame-sealing ampuls, the glass tubing, which forms the bodies 3, usually varies to a limited extent in diameter for a given size. The tubing is hot-drawn in order to produce the long tapering necks 4, which become thinner in neck-wall section, as shown (Fig. 1). This latter condition is seen by the initial body-wall thickness, dotted-in at 6, which further reduces gradually outwardly, thinning down along the neck at 7, and terminating in the outer shell-like thin-annular open-mouth tip 5 of ultra-fragile form.

Furthermore, in the process of hot-drawing the thin necks 4, a large tolerance in diameter of the necks 4 and mouth tips 5 occurs for given body-size ampuls. This is seen in the box-lot (Figs. 8 and 9) illustrations, where the more durable bodies 3 are of comparatively uniform size, but the fragile necks and mouths 4, 5 vary greatly in diameter—as much as 100% as will be seen upon examination of a typical box-lot of given-size ampuls, and from which Figs. 8 and 9 are patterned.

In addition, the tapering neck and tip diameters 4, 5 of all ampul sizes during manufacture necessarily are held to a minimum (in aid of flame-sealing and subsequently breaking off the neck) which produces "capillarity," that is, the necks 4 being long and small, induce capillary attraction of a liquid and prevent it from freely flowing in and out. It is for this reason that ampuls are also known as "capillary containers."

The "capillarity" of ampuls introduces a further problem in the washing and drying operations—the smaller the ampul the more pronounced is the difficulty. If a trace of moisture clings to the interior surface of an ampul, it follows that the medicament with which the moist ampul later is filled, becomes diluted and hence below the required quality and strength of the lot of ampuls being processed. For example, a 1 cc. ampul only holds about 15 drops of medicament, and one (1) drop of water therein makes a dilution of between 6% and 7%, thereby impairing the quality of the dose in the ampul.

In Fig. 1, the lower portion of the ampul thin neck 4 is "bulbed" at 8 and "constricted" at 9 by a groove where the neck merges through a tapering shoulder 10 into the body 3. This type is known as the constricted-neck ampul because the reduced annulus 9 provides a groove in which a cutting file 11 (shown in Fig. 7) more conveniently works under hand pressure to ring-cut or scurf the neck 4 to enable a physician to break it off clean near the tubular body 3 to make available the medicament therein preserved.

The ampuls shown are of medium size, and from the drawings, in general, it is seen that the over-all height of a typical ampul is from five (5) to six (6) times the diameter of its body or base, and that the length of a neck 4 approximates that of a body 3. This produces a high center of gravity which makes all types of ampuls vertically unstable. They readily topple over, singly or in lots, and damage is the result, either from individual chipping or due to several fragile mouths 5 simultaneously fracturing each other as they tumble, roll and comingle on a work table or in a carrying receptacle.

Such difficulty in handling ampuls is much greater with the smaller sizes (not shown) such as 1 cc. and 2 cc. ampuls which frequently are much taller in proportion to the diameter of their bases than the figures just given for the medium-size ampuls herein shown. Furthermore, the small sizes have even longer necks 4 with thinner glass walls 6, 7 and mouth tips 5. The top-heaviness and instability of all sizes of ampuls are factors conducive to damaging each other and unavoidably arise from the flame-sealing requirement.

By way of comparison, Fig. 2 shows a glass vial of the squat type having a tubular body 14 adapted to hold several doses of medicament. A vial has a short neck 15, and its open mouth 16 may be much larger than the ampul mouth 5. Thus vials are not handicapped with "capillarity." This and other types of vials are molded in manufacture. A self-sealing cap or cork 17 is adapted to close its large mouth 16. The squat vial 14 and other types (not shown) have rugged wall-and-neck thickness as dotted-in at 18, and a comparison thereof shows its entire wall section to be uniformly thicker throughout than the differential-wall thickness 6, 7 of the ampul 3. The mouth 16 of a molded vial is usually reinforced with a flange or bead 19, which gives its mouth rim 16 greater thickness than its body 14 and strengthens the mouth against fracture. In contrast, the mouth rim 5 of an ampul is thinner than its body 3 and has less resistance to fracture. Thus is noted certain differences in the physical make-up of these two scientific containers.

Concerning their common characteristics, ampuls 3 and vials 14 alike (for parenteral medicaments) are manufactured of high-grade chemically-resistant glass which inhibits chemical corrosion in order to avoid contamination of medicines preserved and dispensed therein. Furthermore, ampuls and vials are annealed in order to make the glass withstand extreme thermal shock which occurs during processing when subjecting them to sudden temperature changes, as for example, when alternately applying cold and hot water and steam for cleansing and sterilizing and also when flame-sealing ampuls.

On the other hand, it is observed that vials 14 (Fig. 2) are similar in appearance to some types of common bottles used in the commercial trades but such appearance is their only common characteristic. Bottles are usually made of common flint glass because they are not used for parenteral medicaments, need not be chemically-resistant, and cannot be processed under the conditions herein explained. It is because of the difference in utility between vials 14 and bottles that their processing requirements are entirely different. Vials 14 are processed under the same U. S. P. requirements as ampuls 3; hence vials differ from bottles like ampuls differ from bottles.

In perfecting my invention for handling and washing long-neck flame-sealing ampuls, I have found that the additional care and protection which my container-handling devices afford vials 14, although somewhat less required because of their resistance to chipping, produces good results and processing economy equal to that accomplished on ampuls. The point is that my handling devices protect vials to the same extent as ampuls against forms of contamination other than that of glass particles and also speeds the processing work.

In the manufacture of ampuls, when the special-glass tubing forming the bodies 3 is drawn down to form the small tapering-thin necks 4, the latter are severed at 5 in order to cut or break them off square and smooth as possible to form said open mouths 5. At best, this leaves the open mouth with a raw and unfinished lip edge. When magnified (sectional in-set view of Fig. 3), one example of the varieties of this rough-glass mouth 5 and its lack of finish is readily seen.

Such unfinished mouth edge 5 is ultra-thin, may have minute jagged-glass particles of microscopic size which readily chip off, increases the fragility of the delicate neck 4, and promotes glass-particle accumulation along the production line in a processing laboratory. In other words, the raw-jagged mouth tips 5 (Fig. 3 in-set view) are so ultra-frail as to readily chip and fracture when impinging other ampuls or work receptacles. When rubbing frictionally against other surfaces (if resisting fracture) their abrasion forms fine particles or what amounts to glass flour which gets into a percentage of the ampuls and makes "rejects," as previously explained, due to present day methods of manipulating ampuls one-by-one or by handfuls and comingling them in work receptacles.

Ampul manufacturers seeking to correct the foregoing difficulty have produced what is known as a glazed-mouth tip ampul. The unfinished raw-glass edge 5 (Fig. 3 in-set view) is simply fire-finished to form a glazed-mouth lip or tip 21 (see Fig. 4 in-set view). To accomplish this, a flame is momentarily applied to melt down frayed-glass particles constituting the raw edge 5 and thus forms the smooth-mouth glazed finish 21. However, this glazing operation sometimes causes contraction of the glass, thereby forming a smaller-mouth opening 22 than in the case of the rough-unfinished mouth tips 5. This is readily seen by comparing Figs. 3 and 4 (in-set views).

The glazed-ampul mouth 21, 22 has the advantage of strength and resists chipping during impingement and resists abrasion when in rubbing contact as suffered under conventional practice of individual handling and comingling of ampuls in work receptacles. However, the glazed tip 21, 22 has a disadvantage in processing by reason of its reduced-size mouth opening 22. The latter makes for tedious inconvenience when inserting needle-like nozzles for pressure-squirting a cleansing fluid into the ampuls and also when inserting filling needles used for introducing medicaments and the like during the filling of glazed-tip ampuls having the restricted-size mouths 22.

The glazed tip 21, 22 is the result of efforts in ampul manufacture to increase the strength of the ultra-frail mouth 5 against fracture, but it introduces the other disadvantages explained above, unless the glazing technique may be accomplished without reducing an already small-size ampul mouth 5. The foregoing two problems —arising out of the two types of ampul-mouth tips 5 and 21, 22—have been illustrated and explained since my invention accommodates, handles and washes both types with equal facility and preservation against glass chipping and fracture, and since it is important to both the ampul manufacturing field and processing trade to find a solution to the problem.

In Figs. 5 through 7, the previously washed ampuls 3 (irrespective of types) are indicated as having been filled with medicament. A high temperature flame 24 is applied to or momentarily brushes the upper portion of the thin-glass neck 4 (as high as possible above the medicament) to flame-seal the neck as shown at 25. Flame-sealing is accomplished by quickly melting and drawing off the open tip 5 of the neck 4 with tweezers 26 operated by hand or an automatic flame-sealing machine. This operation almost instantly shrinks and coalesces the thin-glass neck 4 locally at the flame 24 and forms the glass-weld tip sealed at 25 before the medicament in the body 3 is affected by the heat.

It is now seen that the glass ampul 3, hermetically sealed at 25, preserves its contents indefinitely. Subsequently, when the ampul medicament is to be used, a physican ring-cuts (as at Fig. 7) the ampul neck 4 with the file 11 and snaps off the thin neck to open the flame-sealed ampul body 3. The groove 9 of the constricted-neck (Fig. 1) provides a type of glass ampul especially convenient in which to run the file 11 and snap-off the neck 4 with a clean break close to the body.

As to the ampul thin-wall feature shown at 6, 7—it is now seen to be essential in order to provide the long thin-wall neck 4, 7 of small diameter so as to adapt it to flame-seal. The neck must have this feature (small and thin) in order to quickly melt and seal below heating the medicament; and it must also be thin on order that a physician may conveniently use his file 11 for cutting and breaking it off from the body 3.

As to the ampul long-neck feature—this also is essential in order that the flame 24 may be applied high above the level of the medicament in the ampul body 3 by which to avoid contamination due to carbon particles which otherwise may result from solution moisture in the neck 4 if the flame were applied too close to the ampul contents. Again, the neck must be sufficiently long to grasp and hold when breaking it off after using the file 11. Further, the original length of the neck 4 must be sufficient to meet all these conditions after it is shortened by pulling off its tip 5 in the flame-sealing operation by the tweezers 26.

The flame-sealing requirement of ampuls constitutes the most apparent difference over all other forms of glassware. So far as known, ampuls are the only containers having a physical structure which is so wholly unsuited to or at least making for such difficulty in complying with their processing requirements. It is indeed the flame-sealing factor, as earlier stated, from which stems the problems in so processing them, especially on a mass-production basis, as to meet the requirements of the U. S. P.

Of interest is the further fact (by way of comparison) that ampuls are "one-dose" containers and are destroyed (Fig. 7) when they are broken open for use. But vials are "multi-dose" containers, are cap-sealed or cork-sealed as at 17, and are neither destroyed nor opened for use since a physician merely runs his hypodermic needle through the self-sealing cap 17, withdraws one dose from the vial, pulls out the needle, and the cap 17 automatically seals the needle passage. As to common bottles (using Fig. 2 for comparison), it is well known that their commercial utility ordinarily requires removal of the cork or cap for pouring out or withdrawing the contents. Again, ampuls are washed only one time and their processing involves high temperature much in excess of 200° F., whereas bottles are washed any number of times and rarely at a higher temperature than 200° F.

The problems confronting the ampul and vial industry, and the differences in practice and technique which stand out in comparison with other arts (such as that of processing common bottles) are more readily understood by defining the ampul and its related vial, as well as the unrelated common bottle. Instructive definitions differentiating these glass containers have not been found in the literature, and they are next given, insofar as possible, in the interest of understanding their distinctions, hence the contrast in problems involved when handling them. Thus the ampul-factory shipping box (Figs. 8 and 9), and how my invention is adapted thereto, will be more fully appreciated.

An ampul is a one-time use or one-dose annealed glass container adapted for professional use in dispensing and preserving the sterility of parenteral medicaments and the like. It is of tubular form, usually of light-weight, thin-wall, and ultra-fragile; it has a long-tapering neck ending with a small-size open mouth of thinner wall-section, and hence the mouth is more fragile than its neck and body. It is made of special-formula high-quality glass which is highly resistant to chemical corrosion and thermal shock, is adapted to be flame-sealed, and eventually is destroyed when broken open for use.

A vial, sometimes called "ampul-vial," also known as a "serum bottle," is similar in utility to the flame-sealed ampul. The vial is either a single or a multiple-dose container; it also is made of annealed glass, is for professional use in dispensing and preserving the sterility of parenteral medicaments and the like, and usually is of tubular form. Serum bottles and some vials are of heavier weight and have thicker walls than ampuls, thus of more rugged form, with short necks, and have flanged open mouths of thicker wall-section than their bodies. The vial also is made of a special-formula high-quality glass which is highly resistant to chemical corrosion and thermal shock. It is adapted to be stopper or cap-closed, and it is not destroyed when a physician inserts his hypodermic needle through the rubber-like self-closing cap or stopper for withdrawing a dose without actually opening said vial. Therefore, the vial is like an ampul in utility and glass formula, but differs in structural appearance.

A bottle is similar to the vial in structural appearance only and may be either a single or a multiple-use glass container (not necessarily annealed) of commercial utility for holding and dispensing beverages, foods and drugs to be assimilated through the intestinal tract. The bottle is also used for dispening cosmetics, industrial chemicals and other goods of common trade. It has a body of any desired shape, is of heavyweight, thick-wall, rugged form, with a neck length of any choice, and has a thickened or flanged open mouth; the bottle mouth ordinarily is or may be larger than the mouths of ampuls and vials. In further contrast, a bottle is usually made of low-grade glass or what may be called standard-flint or other common glass which ordinarily is not pure and is low in chemically-corrosive resistance; and the bottle is not resistant to thermal shock. The common bottle is adapted to be stopper or cap-closed similar to the vial, is not destroyed when opened for use, but, unlike the vial cap or stopper which usually is not removed, the bottle cap or stopper is removed when opening the bottle in order to pour or withdraw the contents.

In my research concerning the three species of glass containers above discussed, it was found that the factory packing of empty ampuls (Figs. 8 and 9) may be and is carried out in a manner somewhat different from packaging other types of glassware. For example, inasmuch as common bottles are comparatively heavy, they frequently are packed and transported, although empty, in a similarly heavy and durable box, with the result that a heavy bottle package has mass and inertia which in motion might fracture the bodies of the bottles.

For the latter reason, a system of cellular or crisscross two-way partitioning is frequently used to prevent contact between the heavy bottle bodies. Thus bottle packaging is not unlike packaging of other fragile commodities having considerable weight, where an individual cell is provided for each bottle, jar, flask, etc., in order to prevent contiguous-body relation, and by which to arrest the mass and inertia of one heavy body from causing impingement with another during shipment.

On the other hand, empty ampuls being of light weight have little inertia. Consequently, the packaging is appropriately of light weight also and possesses little inertia. By reason of this fact, the cellular or two-way partition-packing principle need not be employed. Consequently, it is the practice to ship empty ampuls, packed in rows, in contiguous-body relation. The mass and inertia of adjacently-contacting empty-ampul bodies and their shipping package as a whole is insufficient in weight to cause fracture between them in transit and handling.

As an example of the weight and size of typical factory-shipping packages (Figs. 8 and 9), it is pointed out that a gross box-lot or 144 flame-sealing ampuls of 1 cubic centimeter (1 cc.) size only weighs (box and all) about 12 or 13 ounces, and the box dimensions are approximately 3 by 4 by 7 inches. As to the next size, a box full of 2 cc. ampuls weighs approximately 17 ounces, and the box dimensions are approximately 3½ by 4¾ by 8 inches. These particulars are given because of the importance of this invention to box-lot manipulation of ampuls—the boxes for several of the smaller standard sizes being sufficiently small for an operator to easily hold in one hand—and my discovery of the need for confining the ampuls in contiguous-body relation in rows and in situ (their original box position) when washing and thereafter in unified-lots in order to prevent individual handling along the production line in a processing laboratory.

With the foregoing ampul-box sizes in mind, it is now readily seen that an operator can hold in one hand as a unit 144 ampuls of 1 cc. or 2 cc., etc., sizes when they are confined in orderly box-lot form; whereas in following conventional practice an operator's "handful" of 1 cc. size may total, on the average, a disorderly comingled batch of about 12 ampuls and a lesser number of 2 cc. size. In the former instance, the unified-lot of 144 ampuls are protected against fracture, while in the latter instance the 12 ampuls are ground together in an effort to hold them comingled. This simple comparison of the "box-lot unit" with the "handful unit" discloses a principle which is instructive concerning the mode of operation and utility of this invention.

Now the economy in handling ampuls with my apparatus is better understood, in that the apparatus is adapted to all small-size containers packed in units of large numbers, up to a maximum, wherein the only limitations are size and weight of said unit. In other words, for my manual method, the packaging-lot to be handled is held to a size and weight which are adapted to an operator's ability during a normal-working period. Thus the smaller the size and the lighter the weight, the greater is the number of glass containers which economically may be processed in packaged unit-lots on a mass-production basis.

Next, it is desirable to explain that prevailing standard forms of ampul-factory unit-lot packaging (Figs. 8 and 9) appropriately respond to the foregoing size and weight requirements of my apparatus. Such packaging comprises the use of a light-weight paper shipping box 28 with thin light-weight card-board box-divider partitions 29 loosely inserted, thus keeping the package weight and its inertia to a minimum. The dividers 29 are placed parallel and extend lengthwise of the box 28, thus constituting one-way partitions. They are slightly shorter than the box length and slightly wider than the height of the ampuls. These relations are shown in Figs. 8 and 9 patterned from a standard shipping box.

The long-neck fragile ampuls 3 are placed in rows between the paper dividers 29, and with their bodies 3 engaging and supporting each other, hence in contiguous-body relation. This arrangement positively and protectively spaces the fragile ampul open-mouth tips 5 and prevents chipping contact between them. Thus the thicker walls 6 of the ampul bodies 3 act to protect their more fragile neck-and-tip portions 4, 5. This renders unnecessary cellular or two-way partitioning dividers, between light-weight ampuls 3, as frequently resorted to in packing and shipping heavy-fragile commodities of other arts.

Incidentally, a typical shipping box, containing a gross-lot of ampuls (and the number may be greater in accordance with this invention) as received into a processing laboratory, also usually contains card-board pieces loosely inserted at the ends and along the sides of the paper box, as well as soft-paper stuffing as extra precaution, for tightening up the ampul-row forming paper dividers 29, and for reducing rattling of the glass containers. This extra packing (not shown herein) is withdrawn by a laboratory operator and discarded along with the paper-box cover (also not shown), which leaves a little free space at the ends and along the sides of the ampul rows, between the latter and box walls. This clearance space between the ampuls and box walls is shown by the box-lot views (Figs. 8 and 9).

Of importance is the fact that the actual function of the lengthwise loosely-inserted row-forming dividers 29 in the shipping box 28 is to maintain the unstable individual ampuls 3 in vertically standing parallel position, with open mouths 5 up, and in contiguous-body relation in the package-lot. Such relation prevents them from falling down, comingled in the shipping box 28, and from rubbing against each other. The center of gravity of an ampul being high above its small base, and thus rendering the ampul unstable, the paper dividers 29 are employed to stabilize the ampuls in "formed rows" and in parallel "contiguous-body relation" within their light-weight shipping box 28.

Top-heavy ampuls 3 standing upright are like "tenpins" and easily topple over. If one falls, its thin neck 4 crosses the body 3 of an adjacent ampul, the space thus left by a fallen ampul causes others in the same row to topple over, and they chip and fracture the open mouths 5 of each other as they comingle. Glass chips thus accumulate in the box 28 and particles eventually get into the necks of the fallen and comingled ampuls. When taken from the boxes and again righted with their open mouths up, glass particles may fall by gravity into the ampuls. A gross-lot of ampuls comingled in part or in whole in a shipping box 28 may waste an operator's time and produce a number of "rejects."

Thus an additional problem in handling ampuls by box-lots, in accordance with this invention, particularly in removing them from the shipping box 28 for processing, is to maintain them in situ, in vertical-standing position. The later can only be accomplished by either confining the unstable ampuls to formed rows, as originally packed at the ampul factory, or to massed-formation in contiguous-body relation; and this is accomplished by my handling devices later described.

The ampul-box views (Figs. 8 and 9) are also referred to for demonstrating the non-uniformity of sizes of the necks 4 and mouths 5 in one and the same box-lot 28. This characteristic of flame-sealed ampuls presents one of the more difficult problems in washing them by any method, to say the least of box-lot washing 144 ampuls at a time on a mass-production basis. As stated before, the open-mouth diameters 5 and 22 (see Figs. 3 and 4) may vary as much as one-hundred (100%) percent in any one box-lot 28 of given-size ampuls.

I have presented these explanations (amounting to a mere summary when compared to all ramifications of the problem) of some of the factors involved because of the discovery of controlling facts and conditions in the course of my work and also because of my attempts earlier made to apply bottle-handling principles to ampul-handling procedure. Much time was lost in eventually coming to an appreciation of the fact that such attempts were futile since it was and is the removal of the ampuls by hand (as in the processing of common bottles) from their protective contiguous-body relation in the originally-packed shipping box 28, as received from an ampul factory and thereafter handling them individually, which is the root of the problem.

The remaining views of the drawings show examples or forms of my new container-handling and washing apparatus and the new method comprising my invention—in step-by-step action, from the time the cover or lid (not shown) is removed from the original-shipping box 28 of ampuls (Figs. 8 and 9), to open said box, until they are passed through the washer per se and routed toward the filling and sealing departments in a processing laboratory.

Briefly, the several forms of my new combination apparatus comprise "non-fibrous" container-handling devices manually operable for physically removing the "fibrous" or paper boxes from their packed-lot of glass containers held in rows and for confining them "in situ," that is, keeping them "put" or in "box-lot row" position, when dump-loading them into my "needle-type" washing machines, together with "non-fibrous" handling devices for dump-unloading the washed containers and thereafter maintaining them in "massed-lot contiguous-body relation." In addition thereto, another aspect of my invention comprises a "non-fibrous" handling device for removing the "fibrous" box and washing by immersion its packed-lot of containers independently of my "needle-type washer."

Incidentally, my "container-handling devices" and cooperating "needle-type washers" are size-dimensioned to and built for substantially each glass-container size, more especially for each size ampul. Thus, I usually produce a set of apparatus complete for particular size ampuls and/or vials. While an apparatus for a particular given-size packed-lot of ampuls is more or less limited thereto, the same equipment in certain cases works on and takes other size vials. For example, my 20 cc. ampul apparatus, while not useable on other size ampuls as such, nevertheless, handles 5 cc. vials; and other interchangeable uses exist between ampuls and vials of standard sizes.

*Construction and assembly, first example of the invention, Figs. 8 through 27*

This first embodiment of the invention includes a new form of what may be called a needle-nozzle type of glass container-washing machine in combination with handling or holding devices for such containers. An example of these handling devices comprises two conically-perforated tray-like plates and two pan-like trays. The handling plates are used to load box-lots 28 of containers inverted in situ (original box position) into the washer in straight and orderly parallel rows; and, in cooperation with said handling or holding trays, the plates also are used for unloading the containers in the same inverted or up-ended position to keep their open mouths downward.

For convenience, these container-handling or ampul-holding devices may be referred to separately as an ampul-transfer or cone plate, an ampul-threading or needle-guide plate, a take-off tray, and a storage or carrying tray. The threading needle-guide plate may be and preferably is operatively attached to and remains on the washer. The other three handling devices, for holding and carrying the containers (especially the two trays), are mobile in performing their functions and are manipulated by the operator, to and from the washer, and in relation with the washer and each other.

The construction and operation of this first example of the invention are more fully presented in the accompanying drawings and description to follow, and it is to be remembered (from an earlier topic herein) that a conventional box 28 contains 144 fragile-glass containers, whereas the illustrations to follow show only 36 containers. The complexities of handling a conventional box-lot of 144 ampuls or vials far exceeds the difficulties which would confront one if he were to process and wash an exemplary box-lot 28 as employed herein for illustrating the principle of the invention. I have chosen ampuls, since they are more fragile and difficult to process than vials, for demonstrating the step-by-step action of my apparatus and method herein.

Fig. 10 is a plan view of the above mentioned conically-perforated ampul-transfer tray-like plate; and Fig. 11 is a transverse end-sectional view thereof taken on the line 11—11. The operating steps of this transfer plate are demonstrated in sequence (as manually performed by an operator) in the action-views next explained.

Fig. 12 is a side view of an ampul-factory package-lot of ampuls 3 in their original shipping box 28 which is in upright position (its lid having been discarded) and with the mobile ampul-transfer plate (of Figs. 10 and 11) placed upside down on top of the open box. This is the first step in removing the box from its lot of ampuls, preparatory to dump-transferring or loading them into the washer; and next it is seen that—

Fig. 13 shows the box-lot 28 of ampuls 3 and the ampul-transfer plate (of Fig. 12) reversed as a unit, thus causing the ampuls to drop from the open box onto or into the transfer plate in situ, and thereby freeing the paper box 28 and row-forming dividers 29 of their functions; while in the next two views—

Fig. 14 shows that the box 28 and its dividers 29 have been lifted from the box-lot of ampuls 3 and discarded, thus leaving the inverted ampuls loaded in rows and in contiguous-body relation within the ampul-transfer plate; and Fig. 15 is a transverse end-sectional view taken on the line 15—15 showing the space which is left between the several parallel rows of ampuls 3 by having removed the box dividers 29.

Coming to the ampul-washing machine per se, it is shown in Figs. 16 through 22. It may be referred to as a "needle-type ampul-washer" since it employs fluid-pressure squirting needle-nozzles used for hand-washing from the inception of the ampul industry. This principle is believed most effective inasmuch as a clean-washing solution enters and discharges from the ampuls without being contaminated by contact with their outer surfaces.

Fig. 16 illustrates a front view of the washer. The mobile ampul-transfer plate and its inverted box-lot load of ampuls 3 have been placed in preliminary-loaded position by the washing-machine operator, that is, at rest upon the ampul-threading plate which may remain with and as a part of the washer and hence is stationary when placing the transfer plate thereon.

Next observe three fragmentary detail views taken from Fig. 16, as developed on the section line 17—19 thereof, as follows:

Fig. 17 shows the ampul-transfer plate resting upon the ampul-threading plate, the same as in Fig. 16, except the ampuls are omitted; and Fig. 18 indicates that the operator is in the act of letting the mobile transfer plate loaded with ampuls down onto the stationary ampul-threading plate; while finally—

Fig. 19 shows the completion of the foregoing manipulation; and for clarity, this view is drawn to double scale.

Further, as to the ampul washer per se, Fig. 20 shows another front view thereof, but the two conically-apertured plates with their box-lot load of inverted ampuls 3 are lowered down into the machine in washing position.

Fig. 21 shows a top view of the washer without the ampuls therein. In effect, this is a top view of the conically-apertured ampul-threading plate which may remain on and as a part of the washer. The in-set view is an enlargement of one of the conic apertures and related parts with an ampul mouth 5 indicated by a dotted circle.

This ampul-threading plate (Fig. 21) now may be compared to the ampul-transfer plate (Figs. 10 and 11). These two conically-apertured plates comprise the first set of ampul-handling devices. They function to dump-transfer or load a box-lot 28 of ampuls into the washer. The two plates are similar in construction and complementary to each other.

Fig. 22 is another front view of the washer and repeats Fig. 21, except that the final set of ampul-handling devices is here introduced for the box-lot dump-unloading operation. Thus Fig. 22 demonstrates, among other things, the beginning of the unloading of the ampuls 3 from the washer and shows an ampul-handling or holding take-off pan-like tray placed upside down onto the up-ended bottoms of the washed ampuls; and next, Fig. 23 demonstrates that the ampul-handling take-off tray and its coacting ampul-transfer plate (with their load of washed ampuls 3 still in situ) have been removed as a unit from the washer and placed upright on a table.

At this stage (Fig. 23) of the handling and washing process, the washed ampuls have their open-mouth tips 5 pointed up, only momentarily, while the operator performs the next two manipulations; during which—

At Fig. 24, he has lifted the transfer plate off the rows of washed ampuls 3, whereupon, for the first time, they now may move slightly and relatively to each other within the holding take-off tray and partially lose their parallel-row arrangement. Nevertheless, the ampuls remain confined in massed-protective and contiguous-body relation by reason of being held body-to-body within the upright take-off tray. Although the washed ampuls momentarily stand with their open mouths 5 exposed while pointed upwardly, forthwith—

Figure 25:
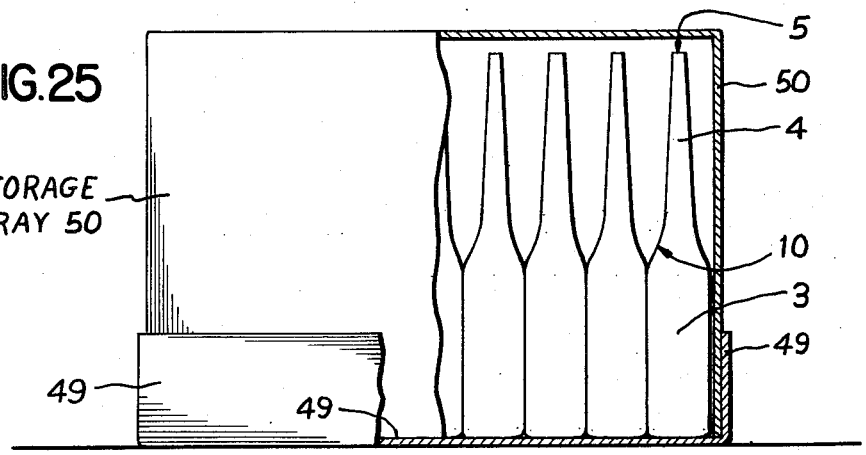

At Fig. 25, the operator, in continuing the unloading operation, has placed a deep-storage tray upside down in a covering manner over the washed ampuls 3 in the shallow take-off tray.

The above-named deep-storage tray is the last of the series of single devices for handling ampuls in box-lots in connection with the needle-type washer. However, this storage tray and its coacting shallow take-off tray, when in combination (Figs. 25 and 26), for use after and beyond the unloading operation, constitute a fifth device, in the form of a two-tray ampul-handling unit.

Figure 26:
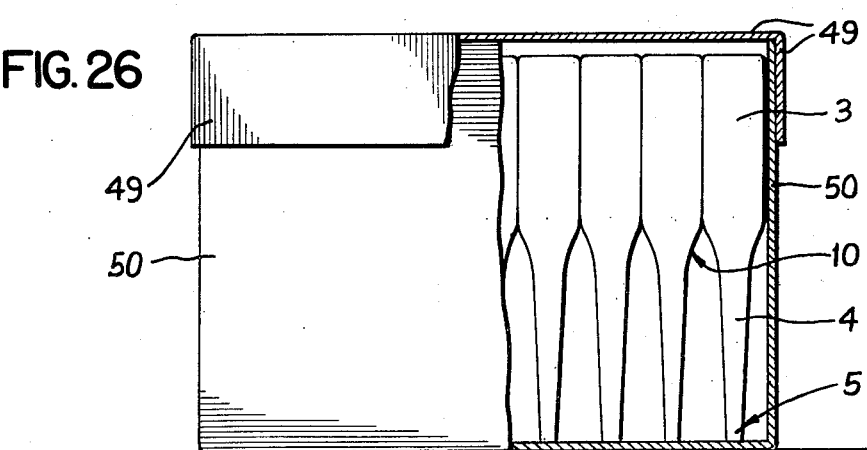

Fig. 26 next shows, in continuing the unloading steps, that the operator has reversed the combination two-tray ampul-handling device, from its former position (Fig. 25), in order to transfer the washed ampuls from the shallow take-off tray into the deep-storage tray, with their open mouths 5 down, and also to free the previously used take-off tray; and finally—

Fig. 27 demonstrates that the operator now has removed the take-off tray (if desired), thus leaving the box-lot of washed ampuls 3 in final position within the deep-storage tray. Here they remain massed in protective contiguous-body and mouth-spaced relation when carried from the washing department.

The manipulations, when unloading the box-lot of cleansed ampuls 3 from the washer (beginning with action-view Fig. 22 and ending at Fig. 27), may be performed entirely with the light-weight mobile ampul-handling devices (transfer-plate, take-off tray, and storage tray), alternately held in the operator's hand especially so when handling small-size box-lots such as 1 cc. and 2 cc. ampuls, etc. However, a work table is indicted by a base line shown (Figs. 23 through 27) and upon which large-size ampuls in box-lots, and correspondingly large-size handling devices, may be placed between or during the cycles of these step-by-step manual operations.

Describing the first form of the invention in detail, an ampul-transfer tray-like plate is indicated generally at 31, and it is shown as being held in the hand of the washing-machine operator. As previously stated, it is mobile in use, and its function is to remove the ampul-factory packed shipping box 28 from the ampul 3 (or a package-lot of vials 14 from a carton) and load them into the washer in situ. The transfer plate 31 is adapted to be placed on top of the open box 28 by the operator; and when thus positioned, it is centered in relation to the box, as shown (Figs. 12 and 13).

The ampul-transfer plate 31 has upper and lower plane and parallel surfaces; it is rectangular in form and may be slightly longer and wider than the box 28 of ampuls. The plate is provided on its upper surface with package-centering or box-centering guides 32 at two or more of its corners. These guides 32 are spaced to make a close-sliding fit with the corners of the box edges, by registering and engaging the outside surfaces of said box corners (Figs. 12 and 13). The guides 32 comprise two or more right-angle flanges which rise from the flat-top surface of the transfer plate 31, and the correspondingly opposite corners of the open top edge of the box 28 snugly register within these centering guides. Two such guides 32 are shown, at diagonally opposite corners, as being sufficient for an operator to readily locate the plate 31 in its centered relation with the box. However, the box and package-centering flange 32 may extend around the four sides of the transfer plate 31.

The ampul-handling or tray-like transfer plate 31 also is formed with a centering hole 33 disposed near each end thereof and on its longitudinal axis. These two spaced-centering holes serve the purpose of locating the transfer plate in operative position on the washer, as later described. The thickness of the plate 31 is not critical, but the example shown is about one-half the length of the necks 4 of a given-size ampul in box-lots which said plate is adapted to handle.

The transfer plate 31 is apertured over its central area to provide guideways 34 with parallel axes and equal in number to the ampuls in box 28. These apertures are conically-shaped in the form of open-ended inverted-truncated cones. The bases or larger diameter of the conic guideways 34 open through the flat top surface (which carries the centering guides 32) and thus face the open box 28 of upright rows of ampuls. Likewise, the larger upper diameters of the guideways 34 are slightly smaller than the ampul bodies 3 and consequently engage their tapering shoulders 10. On the other hand, the lower truncated smaller ends of the conic guideways 34 are larger than the ampul necks 4, thereby affording clearance and a limited amount of lateral movement or mobility of the necks within said guideways.

The conic guideways 34 are closely and equidistantly spaced from each other lengthwise of the transfer plate 31 in straight parallel rows, and said rows are spaced transversely of the plate to register with the ampuls 3, and with the parallel rows thereof, in the box 28. The transverse spacing places the rows of conic guideways 34 slightly further apart than the lengthwise spacing thereof between each guideway in a row. This is necessarily due to the spacing between the rows of ampuls 3 in the box 28, as formed and aligned by the parallel box-dividers 29 which occupy such space. The end view (Fig. 15) shows the dividers 29 as having been removed, and the ampuls are standing in spaced-parallel rows.

Thus it is seen that the axes of the guideways 34 in rows of the ampuls 3 in rows are aligned in order that each guideway be positioned to receive an ampul. This coaxial alignment of the rows of guideways with the rows of the box-lot of ampuls is automatically accomplished, by engagement of the box-receiving or centering guide-flange 32 with the corners of the box 28, when the operator brings the box and ampul-transfer plate 31 together (Figs. 12 and 13) in meeting engagement.

It is important to explain that, preferably, the ampul-transfer plate 31 is made or may be molded of heat-resisting hard thermosetting plastic, or of other like-non-metallic material, such as the well-known "Formica" and also "Bakelite" preferably having an asbestos base which increases the heat-resisting factor of the plastic. Such material is well suited for making the transfer plate 31, in order to provide a frictionless surface free of harsh imgingement with the ampuls 3. It is found that if the surfaces of the conic guideways 34 are of a metallic characteristic that such surfaces may be harsh and coact bluntly when the ampuls are in motion within the guideways and thus may sometimes cause chipping.

Hard wood may make a fairly good ampul-transfer plate 31 since its conic-aperture seats 34 may be polished and made frictionless for engaging glass ampuls. However, the heat and water employed in the washing operation renders hard wood less suitable. Plastic material is excellent and provides frictionless cone seats 34 for easy sliding contact of the ampuls, affording semi-yieldable engagement therewith, minimum-mechanical shock to the ampul mouths, with freedom from chattering and glass chipping, especially if in a long movement or drop of the ampuls onto the plate.

In using the cone plate 31, it is placed by the operator upside down upon and covers the upright open shipping box 28 of ampuls as shown (Fig. 12). However, he may hold the box in one hand and the plate in the other. He tilts the open-top side of the box away from himself at an angle (on an axis parallel with the box-dividers 29); and he also pivots the plate 31 toward himself into parallelism with the open-side top edges of the box, then slips the box edges into the receiving guides 32, and pushes said box against the top face of the plate. A feature of the invention is to pivot the plate 31 on an axis parallel with its rows of cones 34 and also to pivot the box along an axis parallel with its ampul rows, else if the box is tilted on an axis crosswise of the dividers 29, the ampuls 3 may shift out of their normal-row in situ position.

The operator now increases the angular tilt of the box 28 and reverse-tilts the transfer plate 31 (both as a unit along their lengthwise axes) until inverted to the next position (Fig. 13). The ampuls 3 now slide by gravity out of their box, thus dump-loading into the conical-guideway seats 34, and come to rest with their tapering shoulders 10 seated against the upper rims of the conical seats. He then lifts the box 28 off the plate 31 as shown (Figs. 14 and 15). The ampuls now stand pocketed and embraced in box-lot form, hence in situ, within the conically apertured transfer plate. As he lifts the box upwardly, he may thump or slightly shake it to facilitate the rows of ampuls 3, as well as the loose-partition box-dividers 29, in their sliding transfer downward to the plate 31. Incidentally, it is seen that the handling plate 31 establishes a "hold" upon the lot of ampuls before the box 28 is removed therefrom.

The several dividers 29 now are lifted from between the rows of ampuls 3. This leaves a slight spacing between the ampul rows, as illustrated by the sectional-end view (Fig. 15). The operator now discards the box 28 and the ampul row-forming dividers 29, both of which usually are made of fiber-shedding light-weight paper board, with the result that this source of fiber contamination is eliminated once and for all. And the box-lot of ampuls is embraced and held by the transfer plate 31 for further handling and processing as a unified-lot.

According to the foregoing, the ampul-handling device or transfer plate 31 is now charged with a box-lot of ampuls 3 dump-loaded in situ thereinto (Figs. 14 and 15). The ampuls are confined in spaced rows, they stand in parallel contiguous-body relation, with their fragile open mouths 5 "positively" spaced and protected from impinging and chipping each other, and said open mouths are turned downward and are below the lower face of the plate. Any foreign matter may drop out by gravity before reaching the washer. Thus the box-lot of ampuls 3, from which the box 28 has been removed without having been handled one-by-one or by the handfuls, is now ready to be placed into my ampul washer —next described.

The assembly of the ampul-washing machine per se is shown (Figs. 16 through 22) and, of course, includes in its structure and operation the above described mobile ampul-transfer plate 31. The machine is demonstrated in its several operating positions, with the ampuls 3 therein, except in Figs. 17 and 21 where they are omitted for clarity.

The ampul washer rests on a support in the form of a water basin or sink 36 used to drain off the water or other washing fluid which spills downwardly into said basin from the machine and the ampuls 3 therein being washed. The water basin 36 includes, of course, upright enclosing sides and a bottom, and it is piped to a sewer to carry away waste water or other washing solutions.

A fluid-pressure or water chamber 37 is provided, and "37" may be taken also to indicate the washing machine as a whole. The water chamber is rectangular and flat in form, especially its upper wall which is disposed in a horizontal plane. The width and length of the water chamber 37 may approximate that of the ampul-factory packed original shipping box 28 or is slightly larger. Thus, the area of the water chamber 37 also approximates that of the ampul-transfer plate 31 heretofore described. The plate 31 is seen (Fig. 16) in its operative position (where it has been placed by the washing-machine operator) at the upper part of the washer and hence directly above and in a plane parallel with the water chamber 37.

Mounting ears or flanges 38 are shown, one being integral with each end of the water-pressure chamber 37, and they support the machine above the water basin 36, as by resting on the top edges of the basin. This arrangement centers the ampul washer 37 as a whole over the basin 36. In this first example of the invention, the mounting and supporting flanges 38 may be fixedly secured to the water-drain basin 36 in order to mount the washer as a whole in stationary position (if desired) within and near the upper portion of the basin.

A fluid-pressure inlet pipe 39 communicates with the chamber 37 for supplying water and other cleaning agents under pressure to the ampul-washing machine. The water chamber also is provided with a water outlet 40 having a valve with control handle 41. Thus, the valved outlet 40 is open, for example, when its handle 41 is in upright position (Fig. 16), thereby relieving the pressure and draining the water from the chamber 37 into the basin 36 when not actually washing. However, with the control handle 41 down or in horizontal position (Fig. 20), the outlet 40 is closed to trap water, steam, etc., under pressure in the water chamber 37, as continuously supplied thereto by the inlet pipe 39.

Incidentally, I will explain further that the inlet pipe 39 may be connected with a manifold fluid-pressure supply system (not shown) having multiple branch conduits and manual-control valves adapted to alternately feed cold and hot water, cold and hot air, steam and other washing liquids, sterilizing and drying agents, etc., to the ampul-washing machine 37, under the selective control of an operator. It depends somewhat upon the particular laboratory superintendent as to which and how many sources of treating solutions he may desire to connect with my inlet pipe 39.

Next, it is seen that a plurality of tubular fluid-pressure squirting needle-nozzles or jet tubes 42 are provided—in number equal to the plurality of conic guideways 34 of the ampul-transfer plate 31—and have their lower open ends fixed in and extending through the flat upper wall of the water chamber 37 and hence are in flow communication therewith. These squirting needles stand vertically from the water chamber 37, and in parallel relation, with their upper open ends free to be introduced or threaded into a box-lot 28 of ampuls 3. Since the lower ends of the needles 42 are fixed, their upper-free ends are flexible to a limited extent, and provision is made to confine them in parallelism, as later explained.

The water-ejecting needle-nozzles 42 (hereinafter called "needles" for convenience) are somewhat like an ordinary hypodermic needle. Accordingly, the needles are tubular and may have their upper extremities bevelled in order to sharpen them to facilitate their threading entry into the small open mouths 5 of the ampuls 3. For the sake of clarity, a top-end view of one of these small tubular needles 42 is shown, greatly exaggerated in size, in the in-set view (Fig. 21).

Next, it is observed that the fluid pressure-squirting needles 42 are disposed in equidistantly spaced relation and in parallel rows. They are arranged for coaxial registry with the conic guideways 34 of the ampul-transfer plate 31 heretofore described. Hence, the axes of the small hollow needles 42 also closely approximate the packed arrangement of the rows of ampuls 3 in the ampul-factory shipping box 28 of conventional form.

A vertical guide post 43 is fixed at each end of the fluid-pressure chamber 37. These two stationary posts extend upwardly, in parallel relation, spaced apart a distance equal to the spacing of the two centering holes 33 (Figs. 10 and 14) in the ampul-transfer plate 31, and thereby stand apart a distance somewhat more than the length of the ampul box 28. The lower ends of the guide posts 43 are anchored to the water chamber 37 which leaves their upper ends free to enter the centering holes 33 of the transfer plate 31.

The ampul-washer per se (Figs. 16 through 22) is next provided with an ampul-threading plate 45, its top surface being shown in Fig. 21. Because of its functions, it is also known as a cone plate and a needle-guide plate. One function of this plate is to guide and thread the small-mouth orifice tips 5, of the box-lot 28 of ampuls 3, down over the upper points of the fluid-pressure squirting-needles 42. This threading plate 45 is rectangular and approximates the size or spread of the transfer plate 31 and may be similar in thickness. Preferably, it also may be made of non-metallic material the same as heretofore explained in connection with its counterpart member—the ampul-transfer plate 31 which complements it.

The needle-guide ampul-threading plate 45 is provided at each end with a slide-bearing hole 46 (shown also in Fig. 17). These two bearing holes are spaced on the lengthwise axis of said plate 45 to register with the two centering holes 33 of the transfer plate 31 and likewise with the two stationary guide posts 43. The threading plate 45 also is made or molded with conical apertures over its central area to provide conic guideways in the form of conic seats 47 which are equal in number and partially similar in form to those at 34 in the transfer plate 31. These cone seats 47 are disposed in parallel rows and spaced relation to register with the conic guideways 34 of the transfer plate 31 and hence also with the ampuls 3 and rows thereof formed by the divider partitions 29 in the ampul-factory shipping box 28. Finally, the threading plate 45 may be fitted with a pair of wing-set screws 48, one at each end of the plate, to screw into or toward the slide-bearing holes 46.

The dimension form or conic angle of the cone seats 47 in the ampul-threading plate 45 differs somewhat from the conic guideways 34 of the transfer plate 31. It is seen that the upper open ends of the cone seats 47 may approximate the diameter of the upper open ends of the conic guideways 34. However, the lower or smaller open end of each cone seat 47 reduces downwardly to a restricted throat. In this connection, the lower throat ends of the cone seats 47 have a diameter slightly smaller than that of the prevaling-average size of the smallest ampul open-mouth tip 5 to be found in the standard box-lot 28.

In other words, I take a box-lot 28 of given-size ampuls 3, as for example, 1 cc. or 2 cc. size (which are the most difficult to handle and wash), and for which a given-size ampul-handling plate means 31, 45 is to be made; and from that particular box-lot I select the smallest mouth tip 5 ampul as a prevailing standard. Thereupon, the size of the small open bottom end of throat of the cone seat 47 is made slightly smaller than said minimum-size ampul mouth 5 as selected. In this way, the open-mouth tips 5 of any or all ampuls in a box-lot 28 of given size cannot drop through the cone seats 47 of the lower cone plate 45 built for such given-size ampuls.

Now it is observed (Figs. 16 and 20) that the larger mouths 5 of the inverted box-lot of ampuls come to rest by stopping at a point somewhat higher up in the cone seats 47 of the threading plate 45 than the smaller mouth ampuls. This means that the rows of ampuls 3 present their up-ended bottoms in an uneven and irregular line in the washer. Such condition results from the fact that the ampul necks 4 and mouths 5 vary greatly in diameter, as much as 100% in a given box-lot 28, as heretofore explained (Sheets 1 and 2 of the drawings).

The above described ampul-threading or cone plate 45 is assembled with the washer to complete the structure of the latter, by placing said plate in sliding relation on the guide posts 43, as shown (Figs. 16, 20 and 22). This threading plate 45 may remain in and as a part of the washer, whereas its complemental ampul-transfer plate 31 is mobile in use and operative to and from the washer in this particular form of the invention. The two set screws 48 are now tightened against the two guide posts 43 to hold the threading plate 45 in its up position. The rows of needles 42 have their upper free and flexible ends confined and guided in the lower throat ends of the cone seats 47, the needles having annular clearance therein. The lower constricted extremities (throats) of the cone seats 47 perform the important function of operatively confining the flexible needles 42, in coaxially guided and movable relation with the ampul mouths 5, for the threading operation later described.

It is important to observe that the diameter of the fluid-pressure ejecting needles 42 is slightly less than the small throats defining the open bottoms of the cone seats 47, and that the diameter of the latter also is slightly less than that of the mouths 5 of the ampuls. This three-size relation is emphasized by the magnified in-set view (Fig. 21). Such adaptation and arrangement of parts for box-lot ampul or vial-package handling, as worked out to accomplish the new results herein, are new in the ampul field.

The ampul-threading plate 45 and its complemental transfer plate 31 are disposed (as a unit) in horizontal positions on the washer 37, and relative movement is afforded between them and the needles 42. The two plates (as a unit) are thicker than the length of the ampul necks 4 and have a freely sliding action and elevator motion up and down along the guide posts 43. In other words, the operator may readily loosen the two thumb-nut set screws 48 by hand to release the threading plate 45 and then lower it and the transfer plate 31 as a unit to washing position (Figs. 20 and 22) and raise the same to non-washing position (Fig. 16) in manually operating the machine. In effect, the cooperating guide posts 43 and the combination cone-plate means 31, 45 function as elevator means for lowering and raising the box-lot of ampuls 3 into and from washing position to and from the horizontal water chamber 37.

The foregoing description in part discloses the structural make up and assembly of my "needle-type ampul washer" per se, with its first two container-handling devices comprising the conically-perforated plates 31 and 45. The construction of my other handling devices (the unloading means) is introduced in connection with a further description of general operation—to follow.

*Operation and utility, introducing the unloading trays, first example of the invention, Figs. 8 through 27*

Coming to the operation of my apparatus, it is noted that the "dump-loading" or transferring of a box-lot of ampuls 3 in rows, hence in situ, from the shipping box 28 into the mobile ampul-transfer plate 31 is described above (Sheet 3 of drawings), and that the box cooperates as an essential part of the ampul-loading means.

Consequently, it now may be explained that the operator places the loaded transfer plate, embracing and holding the ampuls, upon the upper part of the washer 37 for relative movement of the squirting-needles 42 therewith (Figs. 16-20). In doing so, he reverse-tilts the loaded plate 31 away from himself and on an axis parallel to its rows of cone seats 34. In other words, he reverses the angular motion previously executed when he brought the empty transfer plate from the washer and placed it on the box 28. Thus the plate 31 is manually and tiltably operative in angular relation to its normally-horizontal position in the washer 37 and in angular relation to the upright needles 42.

The operation simply sets the loaded plate 31 down upon the top surface of the stationary ampul-threading plate 45, by first registering the two centering holes 33 of said plate 31 over the upper ends of the two guide posts 43 acting as a piloting means. The open mouths 5 of the box-lot of ampuls (144 of them in actual practice) readily find initial and simultaneous registry within the upper large ends of the cone seats 47 (Fig. 18), and guide downwardly against the annular walls of said cone seats, coming to final rest therein after the upper plate 31 is lowered adjacent or to sit upon the underneath plate 45. It is observed (Figs. 16 and 20) that the smaller-mouth ampuls rest more deeply down in the cone seats 47 than the larger-mouth ampuls.

As the washing-machine operator lowers the loaded transfer plate 31 down onto the empty threading plate 45, with the rows of ampul necks 4 pocketing themselves within the cone seats 47, the ampuls 3 lift bodily upward slightly. Thus it is seen that the shoulders 10 of the ampuls are urged above the upper rims of the conical guideways 34 (Figs. 16 and 20) of the plate 31. In this way, the lower mouth tips 5 only of the ampuls actually engage the combined conic pockets or cone seats 34, 47 of the ampul-handling plate means 31, 45. Consequently, the ampul necks 4 of the entire box-lot have annular clearance within the cone seats 34, 47. Such clearance affords limited freedom and mobility of the ampuls 3 to shift slightly and adjust themselves, singly and in row-lots, also in contiguous-body relation, while being held in situ within the washer.

As the box-lot dump-loading in situ proceeds, the crowding of the delicate ampuls 3, and their relative adjustment while maintaining themselves in contiguous-body relation in rows, is relieved without pressure between their bodies 3. This mobility in row-lots is aided by the former presence of the box-dividers 29 in the ampul-factory packed shipping box 28 because the previous removal of these dividers has left a slight spacing between the lengthwise rows of ampuls, as heretofore explained and shown by the end view (Fig. 15).

Inasmuch as the rows of ampuls 3 are now inverted, their top-heaviness is greatly accentuated and, since their shoulders 10 are now lifted free of the transfer plate 31 (Figs. 16 and 20), it follows that the ampuls seek an adjusted position within their handling-plate means 31, 45 by teetering singly and in rows upon their mouth tips 5 resting against the plastic cone seats 47. The mobility of the teetering inverted box-lot of ampuls also facilitates them individually in dropping all the way down into their cone seats 47 in order to assume coaxial alignment with the restricted throats at the bottoms of said cone seats.

Having loaded the box-lot 28 of ampuls 3 into the washer (indicated as a whole at 37), the operator now loosens the wing-nut set screws 48 and slides the threading plate 45 and transfer plate 31 as a unit, with their load of ampuls, downwardly to the fluid-pressure chamber 37 as shown (Figs. 20 and 22). The upper free ends of the needles 42, being confined as they are in guiding relation within the lower throats of the cone seats 47, thread upwardly through the downwardly moving small ampul mouths 5 as the operator lowers the plate means 31, 45 into washing position. The needles 42 are observed through the glass ampuls (Fig. 20) extending upwardly to a position near the up-ended bottoms thereof.

The loaded ampuls being ready for the washing operation, or indeed having been washed (Figs. 20 and 22), the invention next provides another handling device which now may be used at this stage to advance the processing. The operator now places an unloading take-off pan-like tray 49 upside down upon the rows of inverted bottoms of the box-lot of ampuls 3 as shown (Fig. 22). This handling tray 49 is specially devised and dimensioned to perform its several functions, as will be seen from the description to follow.

First, the take-off tray 49 may act as a stop or weight to hold the rows of the box-lot of ampuls (144 in actual practice) down against washing pressure when the operator rests his hand on the inverted bottom of said tray. Likewise, the tray 49 thereafter acts as a holding device or receptacle for embracing the washed ampuls in protectively-massed contiguous-body relation during and also after box-lot unloading them from the machine 37. Of equal importance, this tray also contributes to "inverted unloading"

of the ampuls, in order that their open mouths 5 be pointed downwardly. This latter function of the take-off tray 49 affords protection not only against gravity-induced recontamination after washing but also constrains the ampul necks 4 in spaced relation, as an assurance against impingement and chipping of their fragile tips 5, after the ampuls come out of the washer 37 and after they lose their former in situ orderly-row arrangement.

For the foregoing several purposes, as steps in unloading the washer 37, as being explained at this stage, the take-off tray 49 may be made of imperforate sheet material, as for example, aluminum, etc., or plastic material is even better. The tray is light in weight, of rectangular form, fits down upon the inverted bodies of the ampuls (Fig. 22) and is just deep enough to embrace and hold the ampul bodies 3 in contiguously-massed formation during unloading.

Of importance is the fact that the tray 49 may have a slight annular clearance between it and the ampul bodies 3. In some instances, such clearance is about equal to the thickness of the thin wall of the tray (Fig. 22), depending somewhat upon the tolerance variation of the bodies 3 found in a given box-lot size. This feature of annular clearance is shown in the present embodiment of the invention for the purpose of telescopically receiving another ampul-handling tray which also is for unloading the washer, as now being described, but which has further utility as disclosed in a topic to follow.

In operating the apparatus, the washing-machine operator may place one hand on the take-off tray 49 (Fig. 22) as he shuts the valve 41 with the other hand to start the washing operation. Preferably, he places a weighting plate (not shown) upon the box-lot of inverted ampuls 3 to hold them down in washing position. Such weighting plate is made of wood or plastic, although a sheet-metal plate may be used. In any event, the washing liquid is pressure ejected upwardly through all of the squirting needles 42 into and from the mass of ampuls 3 in the washer. A pressure of 40 or 50 pounds is sometimes used in the fluid-pressure chamber 37, and such pressure requires that the ampuls be held down to prevent them from popping or blowing out of the washer.

The operator now gives the ampuls a good washing with cold and hot water as well as steam and possibly other cleaning agents. Hot air also may be employed to advantage in drying the ampuls while in the washer. After each fluid-pressure treatment, using first one cleansing agent and then another, the operator necessarily clears or relieves the fluid-pressure chamber 37 by operating the valve-control means 41 on the machine to open the drain outlet 40, in conjunction with closing a manifold fluid-pressure supply system (not shown) to which my inlet pipe 39 is adapted to be connected, as previously explained.

The foregoing "needle washing" operation has the advantage of continuously discharging a clean-washing solution or water under pressure through the glass containers, such as ampuls, vials and the like, that is, a washing solution which is not contaminated by previous contact with the outer surface of the containers. The water discharges downwardly through the throat of the cone seats 47, onto the fluid-pressure chamber 37, and spills into the drain sink 36, some of the wash water also overflowing up through the cone seats 34.

In washing these containers, I have discovered that the thermal shock or shocking to which alternate pressure flows of cold and hot water subject them may be of importance in increasing the washing efficiency. The more sudden the temperature change and the wider the range of such thermal shock (from cold to hot and vice versa), the better. The sudden contraction and expansion of the annealed-glass ampuls appear to aid in breaking away what sometimes seems to be a microscopic film which may be a product of oxidation.

Also the severe contraction and expansion, due to the temperature-shocking treatment, appear to aid in dislodging microscopic foreign matter, such as glass particles. The latter sometimes sticks to the inner walls of ampuls which is possibly due to heat adhesion, for some unknown cause, during the manufacture of certain types of ampuls. These adhering particles sometimes survive conventional washing but may soften up and let go under the dissolving influence of a medicament, with which an ampul is filled, whereupon the ampul becomes a "reject" after processing labor and material have been expended on it. An explanation of "rejects" is given in a previous topic of this specification.

I have found that my ampul washer is well adapted to subject ampuls in box-lots to effectively severe thermal-shocking—this for the reason that if the last pressure flow of cleaning or treating agent, employed by the operator, is that of extremely high temperature steam, the operator need not wait for the ampuls to cool. He may dump-unload them immediately from the washer since he does not touch them by hand. This accomplishment is also new in conjunction with my novel box-lot handling of ampuls.

Having washed and thermally-shocked the box-lot of ampuls 3, while in situ rows in the washer, the operator now shuts off the fluid-pressure flow through the inlet pipe 39 and also shifts the drain valve 40, 41 back to open position (Fig. 16). Inasmuch as an operator, preferably, uses a weighting plate, as above mentioned, to hold the box-lot of ampuls down in the washer, he now removes said weighting plate and sets the cool take-off tray 49 in its holding position (Fig. 22). Due to the high temperatures of the washed ampuls, particularly if thermally-shocked by steam as the last pressure injection given, the operator may not previously have placed the take-off tray 49 on the hot ampuls in the washer, else it would have become too hot to manipulate. However, he now sets the take-off tray 49 (which is at room temperature) in position (Fig. 22), at the end of the several fluid-pressure treatments, preparatory to unloading the box-lot of washed ampuls.

The operator now elevates the cone-plate means 31, 45 from its washing position (Figs. 20 or 22) by sliding it upwardly on the guide posts 43, where he retightens the set screws 48 at the non-washing position shown (Fig. 16). This elevating action retains the upper free ends of the flexible needles 42 in guided relation within the lower throat extremities of the cone seats 47. To insure that the needles 42 remain in the cone seats, a convenient stop means of suitable form may be provided to limit the upward sliding elevator movement of the plate means 31, 45 at the position shown (Fig. 16). Or the operator simply stops the upper plate 31 flush with the top end of the guide posts 43, which may act as a sight-guage, to prevent the upper ends of the squirting needles 42 from coming out of the lower throat ends of the cone seats 47, as illustrated (Fig. 16).

The box-lot of washed ampuls 3, now elevated back to the non-washing position (Fig. 16), with the cool take-off tray 49 thereon (Fig. 22), is now ready to be dump-unloaded from the washer. This is accomplished by first lifting the ampul-transfer plate 31, with its load of ampuls 3 and the take-off tray 49 as a unit, off the washing machine 37. This is shown in the next view (Fig. 23), where the take-off tray 49 is right side up with the open mouths 5 of the washed ampuls also pointed up for the moment, and with the transfer plate 31 still in position embracing the box-lot of ampuls in situ and hence still in orderly arrangement of straight-line rows. The operator immediately removes the ampul-transfer plate 31 as shown (Fig. 24), and sets it aside or replaces it on the machine waiting for the next box-lot washing operation.

Thus relieved and freed of the transfer plate 31 (which up to this stage has confined the ampuls in situ and hence in their former box-lot relation in parallel rows), the ampuls now may for the first time mobilely readjust themselves within the upright take-off tray 49 by shifting, relatively to each other, out of their row arrangement. In a conventional box of ampuls, this means that the 144 ampuls (in 9 parallel rows of 16 ampuls to the row) are now released from their box-lot in situ row relation, and the mass of ampul bodies 3 may edge together in a more fully contiguous-body and self-chocking relation than formerly occupied when embraced in orderly-straight rows by the transfer plate 31.

At this stage, another and the last handling device is introduced. It comprises a simple storage tray 50, which is made similar to the take-off tray 49, except that it is deeper and also preferably fits within the annular-clearance space between the four walls of the take-off tray and the box-lot of washed ampuls. This is shown (Fig. 25) where the operator has placed the deep-storage tray 50 upside down over the mass of upright and parallel ampuls standing in the upright take-off tray 49. The depth of the storage tray 50 is made slightly more than the height of the ampuls 3, in order that their open mouths 5 may have a little clearance from the inverted bottom of the storage tray 50.

The operator now reverses the two-tray ampul-handling devices 49, 50 from its first position (Fig. 25) to its second position (Fig. 26), whereupon the mass of washed ampuls 3 transfer themselves by gravity from the take-off tray 49 down into the storage tray 50 which now stands upright. Thus the washed box-lot of ampuls, in result and effect, is unloaded from the washing machine 37 with their mouths 5 pointed down, within the upright carry or storage tray 50. It is found that this is the best position in which to hold the ampuls after they leave the washer and are carried further along the production line. The take-off tray 49 now may be removed (if desired) and left with the washing machine, as the open-top storage tray 50 leaves the washing department with its load of clean ampuls standing in mouths-down position.

At the end of the washing and unloading operations (Fig. 26), although the ampul mouths 5 are pointed down for protection against recontamination, some processing laboratories may well desire to leave the shallow take-off tray 49 in position as a lid to cover the ampuls in the upright storage tray 50 as it travels to the next station of the production line. In the latter event, the number of take-off trays 49 required may equal the number of storage trays 50 in use, a large number of each being essential, in order to maintain the washer 37 in continuous operation—for it will be understood that some time will elapse before the combination two-tray ampul-handling unit 49, 50 will have made the round trip between the washing and filling departments.

Another point to be noted is that the relative depth of the two cooperating dump-unloading trays 49 and 50, as well as the telescopic fit of one with the other, are merely exemplary features. I have obtained good results with other relative proportions of the trays. In other words, I have used take-off tray 49 somewhat deper than herein illustrated and storage tray 50 of less depth. Likewise, the tray pair 49 and 50 may have the same perimetric dimensions and thus come together with an "edge fit" with the washed mass-lot of ampuls therein acting to center the trays into edge-to-edge engagement. This latter form of the tray pair (two of the same size) may have an advantage in set-up of laboratory equipment in quantity since an operator may pick up and use any two trays without having to "pair" them. In any of these alternate tray forms or modifications, the combined depth of the two cooperating trays should be slightly greater than the height of the ampuls in order to provide clearance as shown (Figs. 25–27).

Emphasis is placed on the fact, according to my research into the subject, that the advantages are substantial in routing the ampuls from the washing machine 37 with their open-mouth tips 5 turned down, and this is accomplished by employing either form of ampul-handling tray devices, whether of the covered type (Fig. 26) or of the open type (Fig. 27).

In either case, the box-lot of washed ampuls reaches the filling and sealing departments (where the medicament is introduced and the ampuls flame-sealed) with the ampul bodies 3 up-ended. The filling operator may conveniently grasp or take hold of the bottoms of one or more ampuls for removing same from the carry and storage tray 50. This feature of my apparatus and method is important since an operator is not required to touch the necks and mouths and thus further reduces the likelihood of recontamination.

From the foregoing, it will be seen that the box-lot of ampuls 3 has been maintained in protective contiguous-body relation, with their fragile necks 4 and mouths 5 spaced apart, from the time the ampul box 28 was first opened (Fig. 8 or 12), down through the several steps and to final-unloaded position, also with their mouths 5 down and safely retained in the deep-storage tray 50 (Fig. 26 or 27), and until the washed ampuls have reached the laboratory filling and sealing departments. The continuity of manual operations is characterized and distinguished throughout by freedom from handling ampuls one-by-one or by the handfuls and constitutes an innovation in processing results achieved in this field.

*Second example of the invention as shown in Figs. 28 through 33*

This further example of construction shows the principle of the invention embodied in one of its simplest forms and with a minimum number of parts—featuring the "box-dump loading and unloading" of containers in box-lots to and from the washer. Ampuls are shown for the purpose of this further description.

Referring to additional views (Figs. 28 through 33) of the accompanying drawings, the apparatus comprises a mobile or manually-operable one-piece ampul or container-transfer cone plate, thus differing from the former ampul-transfer plate (Fig. 10, etc.) and also its coacting ampul-threading plate (Fig. 21, etc.) constituting the two-piece plate means 31, 45 of the first example or form of the invention (Figs. 8 through 27).

Fig. 28 shows a plan as well as a bottom view of this simple one-piece ampul-transfer cone plate, both surfaces of which are the same in conically-perforate structural form; and Fig. 29 is a transverse end-sectional view on the line 29—29, thus showing a double or duplicate-face cone plate.

Fig. 30 shows the one-piece cone plate as having been placed by an operator upon an upright open paper box 28 of factory-packed ampuls 3 (thereby demonstrating the same manual operation as first observed at Fig. 12 for the first form of the invention), in making ready to load the box-lot into the washer and remove the box therefrom.

Fig. 31 is a front view of the washer and shows an important feature of the invention, wherein I employ the ampul-factory packed original shipping paper box 28 in connection with my one-piece ampul-transfer cone plate. The box-lot of ampuls 3 is here held not only by the cone plate but also is held by the box 28 inverted upside down on the washing machine when loading it.

The washer itself is shown in Fig. 31 in its simplest form, inasmuch as it does not here include the former two-part ampul-handling coneplate means 31, 45 and other parts used in the first example (Figs. 8 through 27) of the invention. Accordingly, a second example of the washer per se is illustrated.

Fig. 32 is a transverse end-sectional fragmentary view on the line 32—33. This view demonstrates a new function of the one-piece dual-face cone plate, in that it is here acting to center such, if any, of the slim and flexible needle-nozzles of the washer which may have become slightly misaligned or bent during long use, thereby lining up any and all needles in parallel relation and threading them into the small open-mouth tips 5 of the box-lot of ampuls.

Fig. 33 is a fragmentary sectional view (greatly enlarged), as developed along the line 32—33 through one ampul neck and mouth 4, 5 as an example of all. However, the cone plate is shown in its lowermost position, and the ampul or ampuls is or are shown threaded downwardly in finally-loaded washing position on the needles.

This new type of mobile ampul-transfer cone plate of one-piece construction acts alone to adapt and utilize the ampul-factory packed original shipping box 28 for direct dump-loading of the box-lot of ampuls 3 into the washer, thus differing in some respects from the former two-piece cone-plate means 31, 45. However, the dump-unloading operation is accomplished as before (first example of the invention), by using the take-off tray 49 and the deep-storage tray 50 for holding and removing the washed ampuls with their fragile open-mouth tips 5 in down position and in contiguous-body relation, as and for the purposes heretofore described and shown.

For the sake of clarity and convenience in this topic of my specification, the same reference part numbers are used in the drawings (Figs. 28 through 33) where the structural elements are the same as in the first form of the invention (Figs. 8 through 27). Accordingly, the water basin or sink 36 supports the fluid-pressure or water chamber 37, the part number "37" again indicating the washer as a whole. The fluid-pressure tubular-squirting needles 42 extend upwardly in rows and also in parallelism from the water chamber. In other words, these parts (and their numbers on the drawings) are the same in structural form, size and function as previously described.

This second example of the apparatus is enhanced in its simplicity by a new double-faced ampul-transfer cone plate 54 provided as a handling (loading and unloading) device for intermediate operation between the box-lot 28 of ampuls and the needles 42 of the washer. This new one-piece cone plate brings the ampul box 28 directly to the washer and also adapts said box as part of the loading means. The double-faced cone plate 54 is provided with spaced rows of cone seats 55 on both of its sides as shown.

The cone seats 55 formed in rows are molded or drilled in complemental coaxial pairs in the opposite parallel faces of the cone plate 54; and they are disposed in coaxial rows with the needles 42 and also coaxial with the ampuls 3 and the rows of the latter in the box 28. The double-faced cone plate 54 is of an area in proportion to and slightly greater than that of the ampul box 28 and, preferably, is made of non-metallic (such as plastic) material all as heretofore described in reference to the ampul-transfer plate 31 (Fig. 10, etc.) as well as the ampul-threading plate 45 (Fig. 21, etc.) of the first form of the invention.

This new type of one-piece cone plate 54 may have a thickness of approximately the proportion shown in relation to the neck length of a given-size ampul for which said cone plate is made. Each complementary or dual-cone seat 55 has maximum diameter at its outer end as afforded by the spacing between the cone seats forming the rows thereof and extends from each opposite surface about halfway through the thickness of the plate where the coaxial pair of said cone seats communicate with each other through a restricted needle-guide throat 56. These throats are reduced to a diameter slightly smaller than that of the prevailing minimum-size open-mouth tip 5 of the ampuls 3 in a standard box-lot 28. Thus, the ampul mouths come to rest in the cone seats 55 before reaching the throats 56—this throat structure being similar in purpose here, in this double-faced cone plate 54, to that of the small throat-end of the cone seats 47 of the ampul-threading plate 45 heretofore described for the first form of the invention.

In operation, the double-faced cone plate 54 has a freely sliding movement up and down with an elevator motion on the rows of squirting needles 42. The plate is simple to handle due to its duplicate-form faces; either side functions with the box-lot 28 of ampuls and with the machine-needle rows 42. In use, the washing-machine operator places the cone plate 54 (either face thereof) upon the top edge of a box 28 and in coaxial registry with the rows of ampuls as shown (Fig. 30). He then inverts or reverse-tilts the box and cone plate as a unit, about an axis parallel with the box-dividers 29 in order to preserve the row formation of the ampuls, as next shown (Fig. 31), and registers the rows of cone seats 55 in coaxial alignment with the upper free ends of the squirting needles 42.

The rows of ampuls 3 and the several ampul-row forming box-dividers 29 now gravitate downwardly onto the cone plate 54. The operator shakes or thumps the box to hasten this gravity-transfer action but does not at this stage lift the box 28 off the ampuls and plate while in up position (Fig. 31). It is seen that the box 28 retains the rows of ampuls in standing inverted position, also in situ (box-lot contiguous-body relation), and with the mouths 5 pocketed down within the cone seats 55.

The operator next lowers the duplicate-faced cone plate 54 and its box-lot load 28 of ampuls as a unit downwardly along the squirting needles 42 until the cone plate is adjacent to or it may come to rest upon the upper flat surface of the water chamber 37. The downward movement of the cone plate 54 simultaneously threads the open mouths 5 of the ampuls over the upper points of the needles 42. Accordingly, when the cone plate is in its lowermost position (Fig. 33) each needle 42, and the rows of said needles, is introduced and threaded upwardly into the ampuls 3 in washing position.

The transverse sectional detail view (Fig. 32) now is noted for the purpose of explaining the occasional misalignment of the flexible and tubular squirting needles 42. In other words, after the washer is used for a time, it may be that one or more of the flexible needles 42 may become slightly bent out of upright parallelism. Two bent needles 42B are shown (Fig. 32) as having been slightly distorted or accidentally bent at their lower ends, with the result that their upper free ends may engage and rub against the annular surfaces of the cone seats 55 when the operator first brings the cone plate 54 into registry with the rows of needles.

In the latter event, it follows that the lower or underneath cone seats 55 straighten up and restore the bent needles 42B to parallelism by piloting them toward and into the cone-seat throats 56 and hence up through the ampul mouths 5 as the cone plate 54 with its box-load of ampuls is lowered into the washer. During this manipulation, the box 28 continues its dump-loading function of holding the ampuls in upright contiguous-body relation and hence in situ.

Having loaded a box-lot 28 of ampuls onto the washer-squirting needles 42 and 42B, and down upon the water chamber 37, the box 28 is no longer needed to retain the ampuls in situ. Indeed, the cone plate 54 and needles 42 now perform that function. Accordingly, the operator next carefully removes the ampul box 28 and its dividers 29 before he starts the washing operation. This is advisable inasmuch as the box and dividers are usually made of paper and readily shed dust and fiber or shred particles. The box 28 and dividers 29 should be disposed of before starting the washing operation in order to remove this source of contamination.

The box 28 is lifted slowly at first off the ampuls and out of the washer and thumped by hand to release one or more ampuls if their contiguous-body relation tends to stick them in the box. When the lower edge of the box is sufficiently clear of and high above the cone plate 54, the operator watches for any marginal-row ampuls which may be lifting with the box, and he thumps them down. Or he may find one or more ampuls which require rethreading onto the needles 42, depending somewhat on his loading care and skill developed in handling the cone plate 54 and box-lot 28 as a unit. He manipulates the unthreaded ampul or ampuls back onto their needles and discards the paper box 28 with its dividers 29. Accordingly, the box-lot dump-loading operation is completed.

The operator now places a weighting plate on the loading ampuls 3 to hold them down in the machine against the fluid pressure and gives them a washing treatment. He may apply hot and cold water, steam, hot and cold air, and/or such other washing solutions in sequence as may be preferred by the laboratory. The water or other washing solution is forced upwardly under pressure through the squirting needles 42 into the ampuls and discharges therefrom through their necks 4 and open mouths, thence out through the cone-plate throats 56.

From the cone plate 54, the water pours down onto the fluid-pressure chamber 37 and spills into the water sink 36 which drains into a sewer. Continuous flow of clean washing solution is effected through the box-lot of ampuls 3—so that they never come in contact with a previously used and contaminated solution. This cleansing treatment usually includes high-pressure or super-heated steam for sterilizing the ampuls at the end of the washing operation.

Having washed the box-lot of ampuls, and while in down position as shown (Fig. 33), the operator now places the take-off tray 49 (heretofore described at Fig. 22) down upon the up-ended bottoms of the washed box-lot of ampuls. This metal or plastic tray 49 performs its dump-unloading function here, in combination with this one-piece cone plate 54, in a similar manner as previously described when demonstrating the take-off tray in connection with the first example of the invention (beginning with Fig. 22 thereof). Accordingly, the previously illustrated steps (Figs. 22 through 27) are here referred to for also demonstrating the unloading function of the new one-piece cone plate 54.

The operator now withdraws the cone plate 54 and its box-lot of washed ampuls upwardly from the squirting needles 42, with the take-off tray 49 in place on the up-ended ampuls (the same as at Fig. 22) for holding them together in mass—all as an assembled unit. After the cone plate clears the upper free ends of the needles, the operator reverses the position of the unit (cone plate with load of ampuls and take-off tray), whereupon he lays the cone plate aside and places the take-off tray 49 upright with its load of washed ampuls 3 on a work table as shown (Fig. 24).

Having reached this operating stage (at Fig. 24), where the box-lot of unloaded and washed ampuls are held upright and in massed-lot contiguous-body relation, within said take-off tray 49, the operator then may proceed from that step (Fig. 24) onwardly by applying the deep-storage tray 50 (previously described) to the take-off tray 49 as shown (Fig. 25). Thereupon, he again may invert the same to reach the last step (Fig. 26) in order finally to turn the washed ampuls with their open mouths 5 downwardly.

The box-lot of washed ampuls 3 now may be carried to the next processing station in the laboratory, as for example, to a baking or drying oven for further heat-treatment, sterilizing and drying. The ampuls are held in massed-lot contiguous-body relation with mouths 5 downward, by the deep-storage tray 50, while being carried and handled as a unified-lot. Thusly confined, the unit-lot of glass ampuls have their fragile necks and open mouths protectively spaced to insure against chipping impingement and to minimize picking up glass particles.

This topic and two previous ones describe the two exemplary forms of my needle-type ampul and vial washer, wherein I have disclosed the horizontal fluid-pressure chamber 37 with its upright-needles 42 as being mounted in stationary position on the water basin 36, and the normally-horizontal container-loading plate means 31, 45 and also the plate means 54 as being operatively pivotal to establish a meeting engagement with the original-shipping package 28 to receive its lot of containers.

In these simplified forms of construction, the invention also includes washers in which the fluid-pressure chamber 37 tilts on the water basin 36 toward the operator to swing the upright needles 42 with cone plate 31 and needle-guide threading-plate 45 to similarly establish meeting engagement with the box 28 to receive its lot of containers. In all forms of the washer, the swinging or pivotal motion of the several parts (fluid-pressure chamber 37, cone plate 31, needle-guide plate 45, and also the container box 28) is upon an axis disposed in parallel relation to the rows of the cone seats 34, needle-guide throats 47, as well as the ampul-row forming box-dividers 29; and such pivotal motion is also back and forth in relation to the operator standing in front of the machine.

*New environment of ampul or vial box 28 eliminates one-by-one handling as demonstrated on sheet 10, showing third example of the invention*

Fig. 34 of the accompanying drawings (Sheet 10) shows an action-diagram graphically illustrating an operator manipulating an original-shipping package-lot 28 of small glass containers and how he is prevented from individually handling them—before, during and after a washing operation. The method shown preserves the glass containers against damage from the inception of processing, speeds production, and is presented to solve the difficult problems experienced by pharmaceutical-processing laboratories in handling glass containers (especially ampuls) and in more economically complying with the strict requirements of the U. S. Pharmacopoeia (U. S. P.).

The continuity of action illustrated by Fig. 34 further and more clearly demonstrates my new "box-lot dump-loading and unloading" method for handling and washing packed-lots of glass containers such as ampuls—wherein I adapt the ampul box 28, or an equivalent multi-lot package of vials, to a new and useful environment and as a part of my apparatus employed for implementing said method. The consecutive-motion views and arrow lines on Sheet 10 portray manipulating steps taken by the operator, beginning with first step S1 at the left side of Sheet 10 and ending with final step S7 at the bottom right corner thereof, during which the operator rapidly washes an entire gross-lot of ampuls.

The mobile and tiltable one-piece cone plate 54, and the simplified type of needle washer 37 (second example of washer per se) as well as the two unloading-tray devices 49 and 50, are selected for making this graphic and exemplary description. However, this demonstration of the principles and method involved applies to all examples of the invention, which I have made and tested, and like-wise to my full-size washers which thermally-shock, hot-wash and handle gross-lots of glass containers.

At the left side of this diagram is shown the hands of an operator while standing adjacent the washer (a front view thereof indicated as a whole at 37) and starting the loading operation, that is, the first manipulating step at S1. He is holding a box-lot 28 of ampuls (shown as an end view) in one hand and also one form or another of my new ampul-transfer plates in his other hand, such as the exemplary-size cone plate 54 (likewise end view). The former cone plate 54 is here modified by providing it with a package or box-centering guide flange 57 on its four sides dimensioned to make a sliding fit with the open top edges of the ampul box 28. This box-centering means 57 and the former centering means 32 (Figs. 20, etc.) have like functions. This cone plate 54, 57 comprises a third example of handling plate construction.

Thus at S1, by a tilting motion, the operator is bringing the open box-lot and its load of upright ampuls 3 (formed in rows by the box-dividers 29) up into the centering flange 57 and against the face of the cone plate 54. He has partly inverted the box and cone plate as a unit. In fact, he is simply tilting, by hand motion, these two loading devices 28 and 54 into centered relation with each other so that the rows of cone seats 55 and rows of ampul necks and their open mouths 4, 5 are lining up in coaxial registry, as previously explained.

In effect, therefore, the operator at S1 is going through the former motions of Figs. 12 and 13 (first example of the invention), for box or package-lot 28 dump-loading of the ampuls into the washer, as finally accomplished at Figs. 16, etc., by employing the box 28 as an initial or preliminary mobile loading device, but without actually taking said box (in the first example) to the washer. And also at S1, he is similarly going through the former motions of Figs. 30 and 31 (second example) where he actually does take the box 28, as a loading device, directly to the washer. The two methods of procedure differ slightly but attain the same novel results by employing the original package 28 in a new environment for performance of a new and useful function.

Continuing the hand operation, he further pivots and completes the inverting or reverse-tilting movement of the cone plate 54, carrying the box 28 with it as a unit, by manipulating same along its "loading" motion line 28L (simultaneously inverting said unit 28, 54) onto the ampul washer, as next accomplished at S2. This reverse-tilting motion (away from the operator) along the loading line 28L is performed by pivoting the box 28 on its lengthwise axis—hence on an axis parallel with the ampul-row forming dividers 29. Such box-lot loading operation 28L, after lowering the inverted package-lot 28 of ampuls or vials down into the washer, completes the second step at S2 in preparation for the "stationary" washing operation. The containers now stand loaded in situ and inverted within the needle-type washer comprising the fluid-pressure chamber 37 with other parts, as previously described.

The operator at S2 now carefully lifts off the paper box (indicated by dotted lines 28) and eliminates it and the paper-dividers 29 at the third step S3, as by the hand-motion arrow 28D, to "discard" these fibrous or paper-package parts as a source of contamination. This action of "discarding" the box at 28D is one of the more important features of my processing steps. Significantly, the two steps taken when box-lot "loading" 28L and when box "discarding" 28D constitute an innovation in this field, in that my apparatus "dump-loads" the box of containers in situ, with and by employing said box 28 and its row-forming box-dividers 29 as an implementing part of my loading means and procedure. Not until after the loading operation is accomplished in this new manner is the box "discarded" or thrown away at the third step S3, as intended to be demonstrated at 28D.

In conventional practice, from the beginning of the industry, the paper box 28 and its row-forming paper-dividers 29 are not utilized in loading the containers but are discarded when first opened in a laboratory in order to initiate the washing of a box-lot of ampuls 3 or vials 14 one-by-one or by the handfuls. Such conventional practice begets a major portion of the "glass-chip" problem confronting processing laboratories because of the damage suffered, at the inception, by the ultra-fragile ampul necks and mouths 4, 5 and the accumulation of glass chips, as explained in an earlier topic.

The operator at S2 now subjects the ampuls to a washing operation while held stationary in the washer 37 by proceeding as heretofore explained as to both examples of the invention. He then picks up, as at S4, a cool take-off tray 49 and "places" it downwardly, as demonstrated by the tray-motion line 49P, into position to embrace and hold the up-ended box-lot of hot-washed ampuls 3 on the squirting-needles of the washer (previous Figs. 20, 22 and other views show the needles 42). The take-off tray is shown by dot-and-dash lines 49 (at the second step S2), down upon the ampuls in situ within the washer, preliminary to "dump-unloading" them therefrom in a massed-lot, as the next step will show.

Coming to the unloading steps, the operator now lifts the cone plate 54 (with its load of up-ended washed ampuls 3 and take-off tray 49 as a unit) from the washer and manipulates said unit along the tray inverting-motion "unloading" line 49U. In doing so, the cone plate is set aside, and simultaneously the take-off tray with its mass of ampuls is placed in upright position, as for example, on a table T, thereby completing the fifth step at S5. Accordingly, the washed ampuls now are held massed together in contiguous-body relation, but with their open mouths 5 up, within the upright take-off tray 49.

Continuing, the operator picks up a deep-storage tray 50, as observed at S6, and is lowering it into position, along the storage tray-motion "placing" line 50P, to engage the upright take-off tray 49 and cover the massed-lot of washed ampuls 3 standing upright in said take-off tray on the table T. The deep-storage or carrying tray is shown at step S5, by dot-and-dash line 50, on the table T as being in final covering position over the mass of cleansed ampuls now unloaded from the washer. The lot of ampuls is still maintained in protective contiguous-body relation, that is, with their fragile necks and open mouths 4, 5 positively spaced and hence restrained against chipping or fracturing impingement.

Concluding the unloading steps, the operator now picks up the contiguous-mass of washed upright ampuls from S5 (as a unit in the take-off tray 49 which is covered by the storage tray 50) and reinverts said unit along the storage-tray motion-inverting line 50H, for transferring the ampuls to and "holding" them in said storage tray; and he again sets the unit down upon the table T in final position at S7, in order to complete the dump-unloading operation from the washer 37.

At this last step S7, the shallow take-off tray 49 is at the top and acts as a lid over the deep-storage tray 50 on the bottom. Accordingly, the open-mouth tips 5 of the massed-lot of thermally-shocked and hot-washed ampuls 3 now are pointed down and "held" in protectively-spaced relation by the storage tray 50. Thusly, the operator reaches the unloaded position S7, as previously shown at Fig. 26 but here more fully illustrated on Sheet 10 as an action-diagram showing continuity of motion from beginning to end.

The foregoing actual washing operation is characterized by the "stationary" position of the machine and the containers; hence no motion-produced or machine-wear contamination occurs. And the pivotal action of the box 28 and cone plate 54 is, importantly, along axes which are parallel with the box-rows of ampuls 3 and cone-seat rows 55 in order to control their registration.

*Processing tray shown on Sheet 11 having novel utility independently of and also with the needle-type washer per se*

A modified form of the previous take-off tray 49 and its cooperating deep-storage tray 50 is next disclosed on Sheet 11 of the accompanying drawings and is characterized by its foraminous or perforate construction for handling glass containers and for performing further novel functions with and/or without my "needle-type washer" (indicated as a whole at 37 in previous views). For the sake of clarity, this container-handling device is referred to as a "processing tray," thus differentiating it from the former "unloading" take-off and storage tray pair 49, 50.

There are two purposes, among others, of this particular aspect of my invention, concerning this new "processing tray" of foraminous form—first, to provide a method and means for eliminating the conventional-hand practice of manipulating glass containers one-by-one or by the handfuls (so detrimental in damaging effect on ampuls) in those instances in a laboratory where it may be desirable to give them an ordinary boiling treatment by immersion in water or other cleansing solution—and, second, for likewise and more importantly eliminating such conventional-hand practice in the operations of what may be referred to as "immersion washers," thus aiding the utility of the latter. Immersion types of ampul washers per se recently have come on the market, do not operate on the "needle-washing" principle, and are later explained in connection with my new "processing tray."

Accordingly, this aspect of the invention relates to "immersion washing" and the solution of problems arising thereunder which are not directly connected with my "needle-type washer." Such problems are believed to be solved and the several known methods of "immersion washing"

performed to greater advantage by using my new "processing tray" of foraminous type shown on Sheet 11, as next described.

It first should be noted, however, that the former container-unloading storage tray 50 and its coacting take-off tray 49 are imperforate, that is, of closed-wall formation, and have been described only in connection with the two illustrated examples of the invention (as beginning at Fig. 22) and also as demonstrated on Sheet 10 by a washing-machine operator in action. In both examples of the invention, the unloading trays 49 and 50 were described only in reference to their new function for "dump-unloading" the glass containers, from my needle-type washer, in protectively-massed contiguous-body relation, and with their open mouths 5 turned down. Furthermore, it is observed that the former co-operating trays 49 and 50 satisfactorily perform said unloading function when constructed of imperforate sheet material.

Of next importance also is the fact that my new foraminous processing tray (Sheet 11 and the instant topic) is more versatile in utility and adaptability to all aspects of the invention than the previously-described imperforate unloading trays 49 and 50. This is due to the fact that said processing tray not only may be used for unloading my needle-type washer but also for "immersion washing" operations which are independent of "needle-type washing." On the other hand, the unloading trays 49 and 50, being imperforate or of closed formation, are not suited to "immersion washing."

Reference now is made to Sheet 11 (where legends distinguish main parts and indicate their functions) showing sequential action-views demonstrating step-by-step my new method of multi-lot or box-lot dump-loading of glass containers, from an ampul or vial factory-packed original-shipping paper box 28, directly into my new foraminous processing tray having an overall utility and new functions for use in connection with "needle-type washing" and also for "immersion-type washing." In other words, this new "processing tray" also functions to embrace and hold a box-lot of ampuls 3 and to remove the box 28 therefrom but does so by a mode of operation modified in respect to and for a purpose differing in part from the embracing and holding function of the ampul-transfer plate 31 previously shown (Figs. 10 and 11).

In referring to Sheet 11, glass ampuls 3 again are illustrated inasmuch as they present a more difficult problem in handling and processing than vial-type containers 14 (Fig. 2).

Fig. 35 shows a longitudinal sectional view of an open box-lot 28 of ampuls in upright position, the paper-box lid having been removed and discarded, with my new processing tray (or the body portion thereof) telescoped upside down into said box—thus being placed over, covering, and embracing the box-lot of ampuls; and Fig. 36 shows a transverse sectional-end view taken on the line 36—36.

Fig. 37 shows the next step in removing the paper box 28 from its load of ampuls 3 in order to deposit them by gravity action into the body of the processing tray for holding the ampuls in contiguous-body relation. This view shows the turned-over or inverted position, hence with the ampuls turned down, and their open-mouth tips 5 resting on the bottom surface of the upright processing tray body.

Fig. 38 shows the next step, and it is observed that the operator has removed the paper box 28 and its loose dividers 29, thereby leaving the inverted box-lot of ampuls 3 deposited in massed-formation in the tray body which is open at its top; and Fig. 39 shows the final step—merely comprising the setting of a lid telescopically upon and closing the loaded tray body to cover the up-ended bottoms of the massed ampuls 3 and to complete the assembly of the processing tray for handling its box-lot of ampuls through immersion-washing operations.

This new processing tray (Sheet 11) comprises two parts which are similar to the unloading trays 49 and 50 when the latter is retained as a lid on the former, as earlier described and as used (at Fig. 26), when sending the massed-lot of washed ampuls from the needle-type washer in the covered container-handling device 49, 50. There is one exception—this new processing tray is of foraminous form in part or whole, for the purpose of immersing it, with its load of ampuls or vials, into a solution for boiling and/or washing the glass containers.

Accordingly, I provide a body 60 as the receptacle of the "processing tray"; it is in the form of an open-top box, having a depth slightly greater than the length of given-size ampuls 3 for which said processing tray is made, and somewhat like the former deep-storage carry tray 50. The length and breadth of the tray body 60 preferably are dimensioned to make a slip-entry telescoping fit down into the paper box 28 within the space which exists between the outer rows, and also between the ends of said rows, of ampuls and the four walls of the box 28 as shown (Figs. 35 and 36). The removal of side and end loose-paper pieces or card boards (not shown), which usually are provided as extra and precautionary packing in a typical ampul paper box 28, when it is packed at the ampul factory, provides said space and affords easy entry of the upside down processing-tray body 60 into the box—although said tray body may be made to telescopically fit over the outside of the ampul box.

Thus the upright box-lot 28 of ampuls is capped and embraced by the slip-entry fit of the upside down tray body 60. Moreover, it is important to observe that, preferably, I have designed the tray body 60 with a dimensioned depth slightly less than the width of the ampul-row forming box-dividers 29. Consequently, when the tray body 60 slips into position, to embrace and hold the box-lot 28 of ampuls, it follows that the up-ended bottom wall of said tray body comes to rest upon and is supported by the top edges of the dividers 29 and just above the fragile open-mouth tips of the ampuls as shown (Figs. 35 and 36).

The tray body 60 is distinguished (for immersed washing) from the former unloading tray 50 by including any suitable form of foraminations or open-work such as perforations 61. As an example, the side walls and/or the bottom of the tray body may be made of fine-mesh wire fabric 61 in order to allow a washing solution to circulate within the tray and the ampuls 3 held therein. Furthermore, the entire tray body 60 may be made of metallic or plastic open-mesh or expanded-sheet material, if desired.

Next, a cover lid 59 is provided with a telescoping fit onto the open-tray body 60 (see Fig. 39) which completes the assembly of the "processing tray." The coacting lid 59 may have a depth proportion like that shown for the former unloading take-off tray 49, in relation to latter's coacting storage tray 50, as previously described. The lid 59 may have a snug slip-fit onto the open-top perforated-tray body 60 in order to place it by hand into closing position and to remove it. Thus, the combination two-part immersed processing tray 59, 60 may be similar in structure and size, for a given-size box-lot 28 of ampuls, to the container-unloading tray device 49, 50 (Figs. 25 and 26)—differing only in the foraminous-wall portion 61. All four trays 49, 50, 59 and 60 are rectangular, have straight sides perpendicular to their bottoms, and are of "non-fibrous" material.

As a matter of fact, either or both processing tray parts 59 and 60 may be made, in whole or in part, of open-work perforations 61 or mesh-like or expanded-sheet metal or plastic material. However, this exemplary processing tray device 59, 60 is shown with only one of its wall portions 61 formed of finely-perforated sheeting since that is sufficient for "immersed washing," as later explained. When the bottom 61 of this tray body 60 is made of open-work, its bottom porosity should be sufficiently fine for the smallest container open-mouth tips 5 in a given-size lot to rest upon the top surface of the mesh or porosity.

With the foregoing in mind (concerning, specifically, box-lot handling), it is now explained that, in the processing of ampuls 3 and vials 14, it sometimes may be desirable to supplement the work of my ampul washer, or indeed other ampul washers, with a boiling treatment by immersing the containers for special sterilization. Again, it may transpire that boiling suffices (for a particular ampul or vial product being processed) and, if so, it follows that said particular lot of containers may not need to be processed through a washing machine at all.

Sterilizing by boiling is carried out in a conventional manner by filling any available or present day work receptacle with ampuls, one-by-one or by the handfuls, immersing such loaded receptacle in an ordinary boiling vat with the open-mouth tips 5 pointed upward, and boiling the ampuls for a time specified by a laboratory superintendent. Two hours of boiling, more or less, is sometimes desirable for complete sterilization. Despite capillary resistance, the ebullition of boiling water will fill an immersed ampul, when it is upright, in about five minutes, and good sterilization is obtained if thereafter boiled sufficiently long.

Present day "immersion-vat" methods of washing require the conventionally-practiced individual-handling of the ampuls which is the practice I seek to eliminate since it leads to chipping and glass-particle accumulation when removing ampuls a few at a time or one-by-one from their shipping box 28 for loading the trays employed in the boiling, centrifuging, and vacuum-pulsating immersed washing methods now available to the trade. It is believed that such vat washing may be expedited and improved by this invention inasmuch as my box-lot handling procedure and my new "processing tray" 59, 60 with its foraminous portion 61, eliminates said conventional practice of handling the ampuls when making ready to wash them by immersion.

In the foregoing known "immersion washing" it is apparent that my combination two-part processing tray 59, 60 of foraminous form lets the water or other washing solution circulate within and through the tray in order to reach and enter the open-mouth glass containers for effecting said immersion-type washing. And moreover, in my new method of "needle washing," it is just as apparent that the foraminous wall or walls 61 of the tray or trays 59 and 60 do not interfere with their utility when also employing them for the additional purpose of unloading my needle-type washer (beginning at Fig. 22) in the same fashion as first described in connection with the former imperforate trays 49 and 50.

The method of box-lot dump-loading ampuls from the box 28 into this new processing tray 59, 60 is simple, fast and direct, as shown in the four step-by-step manipulations (Figs. 35 through 39). In addition thereto, the ampul-transfer plate 31 (Fig. 10, etc.) may also be used for loading this processing tray 59, 60 by setting its lid 59 onto the up-ended ampuls held by the transfer plate (as in Fig. 14), then inverting the same as a unit, removing the transfer plate to arrive at the same position as shown in Fig. 24, and then setting the tray body 60 in place to reach the stages shown at Figs. 25 and/or 26. Accordingly, I have shown two methods of loading a box-lot 28 of glass containers 3 or 14, in contiguous-body relation, into the processing tray 59, 60.

Thus it is appreciated that "immersion-vat" washing requires open-work or foraminous ampul-holding trays of the type indicated at 61 in order to promote water circulation and flow within and about the ampuls, and that "needle-washing," as performed by my washers 37 herein and other examples thereof, does not necessarily require imperforate trays of the type previously shown at 49 and 50. Consequently, it follows that my processing tray 59, 60—with its perforated or mesh portion 61—may be preferred because of its over-all adaptability to the variety of equipment used and methods practiced in processing laboratories.

Work-carrying receptacles in the form of pans, boxes and trays always have been used in processing laboratories for piling and carrying ampuls and vials from one department to another. Their miscellaneous sizes and nondescript types arise from the fact that there has been no demand for nor a supplier of particular forms of trays for this conventional-handling practice. Trays never have been designed in purpose and dimensioned with intention of and for coaction internally with ampul boxes (Sheet 11) for unit-lot processing. Such fact is evident since the fixed practice in laboratories is to open box-lots 28 and immediately empty the lot of fragile ampuls 3 into any convenient work receptacle at hand.

The above is explained since in my efforts I have not found a suitable ampul-handling device for carrying into effect my several methods of engaging an ampul box (Fig. 12) or entering the box (Figs. 35 and 36) for embracing (in both examples) an entire lot of ampuls and holding them together as a unit-lot while "dump-loading" the lot from an original ampul box 28—either into my machine 37 for "needle-washing" and then "dump-unloading" them by using my unloading-tray device 49, 50—or for "dump-loading" directly into my "processing tray" 59, 60 for "immersed washing."

*Further problem when handling unified-lots of containers, mouths down in tray 60 with its bottom 61, also in cone plate 31 as a carrier*

Attention is called to a further handling feature which enhances the utility of the new processing-tray device 59, 60 whether or not for the "immersion-washing" procedure described in the foregoing topic. The foraminous or mesh portion 61 is an example of one of several forms of frictional-bottoms and also bracing-type bottoms provided by the undulated or uniformly-roughened surface 61—for establishing a non-slip contact with the down-turned open mouths 5 of long-neck top-heavy ampuls—in aid of stabilizing massed-lots thereof when handled up-ended as herein.

This aspect or origin of the problem and its proposed solution will be more fully understood by first explaining another characteristic peculiar to a massed-lot of inverted or up-ended ampuls held and carried along the production line in contiguous-body relation, by the tray-type handling devices 49, 50 and 59, 60 as well as by the cone plate 31—all heretofore treated in part, but without explaining the instant problem which they overcome concerning inverted top-heavy massed-lots of ampuls.

Due to the small size of the down-turned ampul necks and mouths 4, 5 in relation to their bodies 3, the space in the bottoms of the trays 50 and 60 is not fully occupied. Thus, the spaced mouths do not chock and brace each other against relative displacing movement, as in the case of the larger bodies 3 which stand contiguously and hold each other in up-ended parallel position. Thus the important mouth and neck-spacing feature depends upon maintaining the contiguous-body relation—a problem by far more difficult when the ampuls are inverted bottoms-up in a massed-lot of irregular pattern than when standing upright in formed rows within the shipping box 28 assisted and stabilized by the box-dividers 29.

Among other conditions which introduce this further problem is the fact that cylindrical-glass members (as in the case of ampul bodies 3 engaging each other) make what amounts to a circular-tangent line-contact, with the result that no appreciable engaging-area exists between ampuls massed together in contiguous-body relation. Then too, a glass-to-glass engagement possesses a minimum of retentive friction. Add thereto the unbalanced instability of inverted ampuls and, cumulatively, we have the more pronounced conditions which render difficult the handling of up-ended ampuls in unified-lots—the inverted position being desirable in order to insure against gravity-induced recontamination after washing them.

Explaining the point further—the rounding shoulders 10 of the contiguous bodies 3 when up-ended appear to act as unbalancing or starting pivots between parallel ampuls engaging each other in circular-tangent line-contact and seem to induce slipping of one ampul on another. Thus, if a single down-turned ampul mouth 5 (within a tray holding a gross-lot) starts to slip out of its vertical position, the two engaging annular shoulders 10 appear to establish a frictionless-point contact and cam or urge against each other, thereby accelerating further relative motion between the "slick" or frictionless-glass bodies. Almost immediately, the single ampul slips down to the bottom of the tray by skidding into the open space between the down-turned necks 4 of the standing ampuls and lodges in under the up-ended bodies 3 of the remaining lot.

With one ampul now out of place from its gross-lot, the remaining 143 ampuls instantly lose their grip on each other, that is, their contiguous-body relation. This displacement is greatly accelerated by the one first-fallen ampul since, as it slips down and under, it strikes the mouths and necks of several adjacent ampuls and starts them to skidding also. This displacing action multiplies chain-fashion so rapidly that usually a portion or the entire gross-lot of small-size ampuls quickly comingles into a disorderly impinging pile within the tray. The smaller the ampul, the more pronounced is this condition since their necks 4 are usually longer in proportion to their bodies 3 than in the case of larger ampuls—hence greater instability. And the most skillful operator ordinarily cannot retrieve the one fallen ampul in time—for once it goes to the bottom of the tray it is buried under the up-ended massed-lot which instantly becomes unstable and slides into a heap.

Insofar as determined by my research work herein, long-neck flame-sealing ampuls are the only species of glassware or containers posing this particular aspect of a problem. Common bottles and other heavy commodities are usually packed, shipped and handled in two-way divider box-partitioning and furthermore their processing is not burdened with the "glass-chipping" problem and not under the U. S. P. control. It appears that it is this and other peculiar characteristics of fragile ampuls, coupled with the further fact that conventional ampul washers require one-by-one or handfuls handling, taken altogether, causes or leads operators to work on and carry fragile ampuls along laboratory-production lines in comingled and piled-lots within work receptacles.

With the foregoing in mind, as to the problem of maintaining up-ended contiguous-body relation of a massed-lot of ampuls, the principle of the retentive-surface bottom 61 of my new handling tray 60 is next described. Such tray bottom imparts stability to each up-ended top-heavy ampul and, therefore, to a massed-lot thereof, thus reducing the tendency to slip, skid and tumble down. This feature minimizes the tendency of ampuls to slip, comingle and impinge when their tips 5 rest on a friction-bottom ampul-handling tray. There are a number of different materials and types of friction-bottom surfaces (imperforate for tray 50 and foraminous for tray 60) which may be employed in producing handling-trays in accordance with this further principle of the invention—and for this reason the mesh bottom 61 is illustrated merely as helpful in explaining said principle.

For example, other forms of non-skid surface, instead of the mesh-bottom wall 61 of the processing tray body 60 (or for the former unloading tray 50), may be made by grooving, corrugating, or embossing—also by molding the bottom wall 61 of plastic material with any one of these or other appropriate non-skid mottled or roughened surfaces. A pebbled or dimpled-surface, against which rests the open mouths 5, also reduces the tendency of inverted top-heavy ampuls to slip and comingle. More particularly, the bottom walls of the trays 50 and 60 may be "cone seated," that is, they may be formed with the ampul-mouth retaining-cone seats 47 of the handling plate 45 (Fig. 21, etc.). Thus each ampul mouth of the massed-lot is pocketed within a cone seat and positively restrained against slipping.

It is found also that certain plastic materials, one type of which is on the market under the trade-mark "Silicone," make a satisfactory handling-tray device of the type illustrated at 49, 50 and at 59, 60, especially for the bottom portion 61. A plastic material having the characteristics of "Silicone" withstands a temperature of about 500° F., more or less, and may be used to mold a uniformly-roughened bottom for ampul-handling trays, either of foraminous or imperforate form—bearing in mind the fact that ampul and vial processing involves much higher temperature than common bottles which are not washed at temperatures greater than 200° F., more or less.

A friction-producing retentive-surface bottom 61 of one form or another as above suggested (and such also as a resilient or semi-soft surface) is especially useful for trays 50 and 60 when handling ampuls, especially those having glazed-mouth tips 21, 22 (Fig. 4). The open mouths of glazed-tip ampuls form a smooth finish and present a "slick" and almost frictionless-surface against the bottom walls of handling trays, thus having a marked tendency to become displaced out of their chocked and contiguous-body relation and slip into a comingled mass. The high temperatures employed make difficult the selection of a material for the bottom surfaces of the handling trays. For example, a rubber surface produces friction-holding engagement with ampul tips but the high temperatures involved in processing render common rubber impractical.

Preventing the skidding displacement and the tumbling down of ampuls into a comingled and disordered mass within work trays serves to maintain them in a self-chocked contiguous-body relation, by which to inhibit impingement and glass chipping. Thus a non-skid, either positive-bracing or a friction-producing surface, of one form or another, built into the handling trays 50 and 60, furthers the purposes of my invention.

Finally, it is pointed out that the ampul-handling plate 31 possesses another noteworthy function not heretofore described. It will be seen that its use, in the operating steps as heretofore explained, ceased when the operator unloaded the washed-lot of ampuls (as shown at Fig. 23) and from thereon the handling trays 49 and 50 took over (Figs. 24 through 27) for carrying ampuls along the production line and to the filling department. Thus the transfer plate was retained in the washing department for the next washing operation.

However, it is seen that another feature or modification of the invention involves the use of the ampul-transfer or handling plate 31 all along the production line. Doing so eliminates the use of the trays 49 and 50 as carrying receptacles. Accordingly, there exists the advantage of eliminating the transferring operations (at Figs. 22 through 27) from the cone plate 31 into the tray 49—thus less manipulating of the fragile ampuls. In this connection, the operator simply removes the cone plate and its washed-lot of ampuls from the washer 37 (at Fig. 16 or 20), without employing the take-off tray 49 and sends the loaded plate from the washing department with the ampul mouths 5 down the same as shown at Figs. 14 and 15.

In this particular handling method, the unit-lot of washed ampuls reaches the filling department in the carrying plate 31, whereupon the filling operator sets it in a retaining frame which, preferably, holds the plate on angle within easy reach. Thereupon, the ampuls, their bodies upended toward a filling machine, are removed from the carrying plate 31 by grasping their bodies. This further handling of the clean ampuls by holding their bodies prevents contact with their open mouths and minimizes recontamination.

Now it is appreciated that I have provided a handling device 31 which removes the box-lot of ampuls (as at Fig. 13) and maintains the lot intact and together from beginning to end, that the ampuls have not been touched by human hands along the production line, that they have been handled mouths down at all times in the apertured-carrying receptacles 31, and that they have not been exposed with mouths up to gravity-induced contamination so much as during the few seconds required in the manipulations (at Figs. 23 and 24) where the two trays 49 and 50 cooperate to ultimately reach the unloaded mouths-down position (Figs. 26 and 27).

This description and its accompanying drawings present several contrasting structural forms of my apparatus, as well as alternate or dual functions thereof, together with optional modes of procedure in the method steps along the production line—from the opening of an original package of containers (as at Fig. 8) until the package-lot thereof has been cleansed and dispatched as a unified-lot from the washing department. It is believed, therefore, that choice in selection is made available, and that the invention is beneficial to pharmaceutical-processing laboratories and other like institutions.

The disclosure herein explains the principles of the invention and the best mode contemplated in applying such principles, so as to distinguish the invention from others; and there is particularly pointed out and distinctly claimed the part, improvement or combination, which constitutes the invention or discovery, as understood by a comparison thereof with the prior art.

This invention is presented to fill the need for a new and useful apparatus for and method of handling and washing ampuls and vials in packed-lots. Since various modifications in construction, mode of operation, use and method, may and often do occur to others skilled in the art, especially so after acquaintance with an invention, it is to be understood that this disclosure is exemplary of the principles and equivalent constructions, without being limited to the present showing of the invention.

What is claimed is:

1. A method of handling open-mouth containers of the ampul and vial types for cleansing them, such containers being packed as unified-lots and in upright contiguous-body relation within original-shipping packages, comprising manually removing a said unified-lot of containers in inverted position from a said original-shipping package while maintaining said contiguous-body relation, then subjecting the unified-lot of removed containers to a cleansing treatment while still inverted and in said contiguous-body relation, and removing the cleansed containers from the cleansing treatment while still inverted as a unified-lot and in said contiguous-body relation to deter recontamination, all without hand contact at any time.

2. A method for handling fragile long-neck open-mouth ampuls in unit-lots along the production lines of a laboratory and for washing them; comprising the several steps of dump-loading a said unit-lot of ampuls from their original-shipping box into a handling device, at the beginning of the production line, with their long-necks and open mouths turned down; maintaining the unit-lot of ampuls in contiguous-body relation within the handling device, engaging the down-turned ampul open mouths against a retentive-surface in the handling device to stabilize the top-heavy lot of up-ended ampul bodies in the handling device and to retard their displacement from contiguous-body relation, and subjecting the unit-lot of ampuls to a cleansing treatment while thusly maintaining and engaging them.

3. The method defined in claim 2, but more specifically engaging said down-turned ampul open mouths against a friction-producing surface for accomplishing the purposes described.

4. The method defined in claim 2, but more specifically cleansing by immersing the unit-lot of ampuls in a washing solution while maintaining and engaging them as and for the purposes described.

5. A method for handling ampuls in lots and removing them for washing from an original-shipping box within which they are packed in contiguous-body relation and in rows between one-way parallel dividers, comprising the several steps of first engaging the shipping box with an ampul-handling device, then inverting the box with its lot of ampuls as well as the handling device as a unit and thus dump-loading by gravity said lot of ampuls from said box into said handling device and in rows therein, holding and maintaining the lot of ampuls in contiguous-body relation and in rows within the handling device, removing the shipping box from the ampuls supported in rows by the handling device, and forcing a washing solution from rows of needle-nozzles into the lot of ampuls while still holding and maintaining them inverted in contiguous-body relation and in rows within the handling device.

6. The washing method of claim 5, but wherein the original-shipping box and its dividers are made of paper-like material which sheds fibrous-foreign matter and which contaminates the ampuls, the paper dividers being loose within the paper box; comprising also the dump-loading of the dividers along with the rows of ampuls from the box into engagement with the handling device, and, after removing the box from the handling device, also removing the dividers from between the rows of ampuls held within the handling device, the removal of the box and dividers aforesaid as a source of fiber contamination being performed before forcing the washing solution into the lot of ampuls.

7. A method for handling ampuls of the long neck type in lots and removing them for washing from an original-shipping box within which they are packed in contiguous-body relation and in rows between one-way parallel loose dividers; comprising the several steps of first bringing a plate, which is apertured in rows, and the shipping box, which is open, into engagement with each other and in a position coaxially registering said apertures with the necks of the ampuls; then tilting the engaged box and the plate as a unit to an upside down position and thus dump-loading by gravity the entire lot of ampuls from the shipping box in inverted position with their necks into the apertures of the plate while maintaining the contiguous-body relation, and simultaneously dump-loading the loose dividers onto the plate, removing the shipping box as well as its loose dividers from the plate and discarding same, threading rows of needle-nozzles through the rows of apertures and into the rows of inverted ampuls while the lot of ampul necks is supported by the plate, and ejecting a washing solution from the needle-nozzles into the ampuls.

8. The handling and washing method described in claim 7, but more particularly tilting the original-shipping box and the engaged apertured plate as a unit about a pivotal axis which is parallel with said one-way parallel loose dividers, particularly supporting the parallel rows of ampuls by and between said parallel loose dividers during the tilting motion, and thus staying the influence of gravity against acting on or displacing the ampuls individually in the direction of their rows during said tilting motion; but thereafter employing gravity, after reaching the upside down position, to dump-load the ampuls in rows and also the parallel loose dividers from the shipping box into engagement with the plate.

9. The combination of an original-shipping box of open-mouth long-neck ampuls with an ampul-handling device, the shipping box being of contaminating fibrous material while the handling device is non-fibrous and non-contaminating, and cooperating with each other for removing said box from its lot of ampuls for washing them, the ampuls being packed in contiguous-body relation and in rows between one-way parallel loose fibrous dividers within the shipping box, the box having side walls and an open top, the ampul-handling device including a flat surface cooperatively associated with the side walls and open top and engaging said box, the handling device also including means effectively embracing and holding the ampuls by their long necks as a unified-lot and in contiguous-body relation, and by which the contaminating fibrous shipping box and its fibrous dividers are removed from the ampuls and discarded, and the ampuls dump-loaded as a unified-lot in contiguous-body relation into the non-fibrous handling device, upon inverting said box with the engaged handling device as a unit.

10. An ampul-handling device for removing an original-shipping box from its lot of ampuls of the type having open-mouthed long-necks tapering from shoulders merging with cylindrical bodies, the ampuls being packed in contiguous-body relation and in rows between one-way parallel dividers and required to be removed from said box for washing them, comprising rows of parallel-pocketing means provided in the handling device and adapted to be cooperatively placed in registering relation with the rows of ampuls by engaging the ampul-handling device with the shipping box, the pocketing-means forming open-parallel spaces in the handling device, the spaces being dimension-formed to a size less than the diameter of the bodies of the ampuls and of less depth than the length of the ampul necks, by which inverting the handling device with its rows of pocketing means and the engaged box as a unit acts to dump-load the rows of ampuls as a unified-lot into the rows of pocketing means and in contiguous-body relation therein, with the long-necks of the ampuls extending through said pocketing means, which disposes the open mouths therebeyond, and the shoulders at rest against the pocketing means.

11. An ampul-handling device for removing an original-shipping box from its lot of ampuls for washing them, the depth of the shipping box being greater than the height of the ampuls packed in contiguous-body relation and in rows between one-way parallel dividers within said box, comprising plate means provided with rows of apertures adapted to coaxially register with the ampuls and rows thereof; a box-centering guide on the plate means to receive the open top of the box manually placed in engagement therewith, and without the plate means initially engaging the ampuls, to position the box and plate means in the aforesaid registering relation; and the box and plate means being held together as a unit by the box-centering guide and an operator, by which the box and plate means may be inverted manually as a unit, to transfer the ampuls by gravity as a unified-lot in situ from the shipping box and hence in contiguous-body relation into the apertures of the plate means.

12. An ampul-handling device for removing an original-shipping box from its lot of fragile long-neck open-mouth ampuls for washing them, within which shipping box the ampuls are packed in contiguous-body relation and in rows between parallel loose dividers, comprising a one-piece flat-surface plate apertured with cone seats in rows adapted to register coaxially with the ampuls in rows within the shipping box, the diameter of the larger ends of the cone seats approximating the diameter of the bodies of the ampuls, while the diameter of the smaller ends of the cone seats is less than that of the open mouth of the minimum-size ampul within the box-lot aforesaid; and cylindrical throats, which are of the same diameter as the smaller diameter of the cone seats, provided in the plate in coaxial communication with said cone seats; by which the shipping box with its lot of ampuls is adapted to have its open top manually placed against the flat surface of the one-piece apertured plate, with its rows of open-mouth ampuls disposed in coaxial registry with the larger-diameter ends of the cone seats, and said box turned upside down by an operator onto the apertured plate to dump-load its lot of ampuls and dividers in situ onto said apertured plate and thus in contiguous-body relation thereon, and the box thereafter lifted off the rows of ampuls, as well as the loose dividers lifted therefrom, and by which said box and its dividers are discarded by the operator from the lot of ampuls supported by the apertured plate, with the open mouths of the ampuls resting down in the cone seats above the cylindrical throats.

13. An ampul-handling device as described in claim 12, but having additional features, comprising a box-centering guide-flange provided on the one-piece apertured plate, and on the flat surface thereof which contains the larger-diameter ends of the cone seats, said box-centering guide-flange being dimension-formed to make a slip-entry receiving-fit with the edges of the open top of the shipping box thereby adapting the box to be manually centered against the flat surface of the apertured plate, and the ampuls and the rows thereof automatically aligned with the cone seats and the rows thereof, when an operator places the shipping box within the box-centering guide-flange.

14. A container-handling device for removing an original-shipping box from its lot of open-mouth containers of the ampul and vial types for washing them on a machine having rows of needle-nozzles, the containers being packed in contiguous-body relation and in rows within said box, comprising a needle-guide plate apertured with rows of throats adapted to receive the rows of needle-nozzles of the washing machine and also to coaxially align with the rows of open-mouth containers in the box, and a cone plate apertured with rows of conical seats which are adapted to register with and receive the rows of open-mouth containers seated therein, the cone plate being disposed above and adjacent the needle-guide plate, means for mounting the two plates in adjacent and horizontal positions and for retaining the rows of throats and conical seats in coaxial alignment as well as for supporting the cone plate in manually-operable angular relation with the needle-guide plate, by which the cone plate may be actuated away from the horizontal needle-guide plate toward the opened shipping box manually placed thereagainst and then restored to horizontal position for inverting said box and dump-loading its containers therefrom in contiguous-body relation into the conical seats above the throats.

15. An ampul-handling device for holding a box-lot of open-mouth ampuls packed upright in contiguous-body relation and in rows between fibrous dividers loose within an original-shipping box also of fibrous material which contaminates the ampuls, comprising a non-fibrous tray means having a bottom and side walls with an open top dimension-formed for adapting it to a telescopic fitting relation with the shipping box and over the entire box-lot of ampuls therein and holding them as a unified-lot in contiguous-body relation as will as holding the dividers while in the shipping box, by which the tray means and the shipping box when inverted as a unit dump-load the unified-lot of ampuls with their open mouths turned down as well as the dividers into said tray means, and the fibrous-shipping box and its fibrous dividers discarded to eliminate same as a source of contamination, the tray means holding the ampuls up-ended in massed-lot contiguous-body relation, and a non-fibrous covering lid engaging the open top of the tray means for enclosing the ampuls therein.

16. An ampul-handling device for holding a box-lot of open-mouth ampuls packed upright in contiguous-body relation and in rows between fibrous dividers loose within an original-shipping box also of fibrous material which contaminates the ampuls, and the packing material of which when removed provides a space between the ampuls and the walls of the box, comprising a rectangular-shaped non-fibrous tray means having a bottom and side walls standing perpendicularly to said bottom and with an open top, the tray means being dimension-formed for adapting it to make a slip-entry removably-engaging fit upside down into said space adjacent the box walls, thus within the box and over the dividers and the entire box-lot of upright ampuls therein, by which the tray means and the engaging box when inverted as a unit dump-load the lot of ampuls from said box into said tray means, and the fibrous box and its contaminating dividers discarded from the ampuls held up-ended as a massed-lot in contiguous-body relation with their open mouths turned downward within the non-fibrous tray means.

17. An ampul-handling device for removing an original-shipping box of fibrous material from its lot of ampuls for washing them, within which box the ampuls are packed with their open mouths upward and standing in rows as well as in contiguous-body relation between parallel loose dividers of fibrous material which contaminates the ampuls, and wherein the loose dividers are shorter than the length of the shipping box and wider than the height of the ampuls, comprising a non-fibrous tray means having a bottom and perpendicular side walls with an open top, the tray means being dimension-formed for adapting it to make a slip-entry fit upside down into the upright opened shipping box within its space at the divider ends and its space along the outermost rows of ampuls, thereby covering and embracing the rows of ampuls and also the dividers, the side walls of the tray means being dimension-formed with less depth than that of the dividers thereby adapting the upside down bottom of the tray means to rest upon the top edges of the dividers without engaging the ampul mouths, by which the box of ampuls and the handling device when inverted as a unit dump-load the ampuls into the non-fibrous tray means, the containing fibrous box and dividers eliminated, and the ampuls held by the tray means in up-ended massed-lot contiguous-body relation.

18. An ampul-handling device as described in claim 15, but having an additional feature and function, comprising a non-fibrous friction-bottom provided within the non-fibrous tray means, and against which the down-turned open mouths of the ampuls rest with non-skid engagement, for stabilizing them against displacement from their up-ended massed-lot contiguous-body relation, to prevent comingling glass-chipping impingement between the ampul mouths.

19. Apparatus for loading and washing a package-lot of open-mouth containers of the ampul and vial types which are packed upright in contiguous-body relation and in rows within an original-shipping package, comprising a fluid-pressure chamber having rows of upright needle-nozzles adapted to register coaxially with the rows of containers from the shipping package when they are inverted into the apparatus, handling plate means provided with rows of apertures in which the upright needle-nozzles are guided for relative movement, and guide means on the plate means as well as on the fluid-pressure chamber and coacting with each other and also with the open top of the original-shipping package from which said containers are transferred in mass to said plate means for effecting said inverting operation, thereby automatically disposing the rows of containers aligned in registering relation with the rows of needle-nozzles, by which to manually load in situ and hence in contiguous-body relation the package-lot of containers into the apparatus and discard the shipping package before performing the washing operation on said lot of containers.

20. Apparatus for loading and washing package-lots of containers of the ampul and vial types, as described in claim 19, and having additional features relating to said plate means provided with rows of apertures, wherein the latter includes a plate member having rows of conic guideways disposed coaxially with the rows of apertures, said plate member being mounted in normally-horizontal position on the upright needle-nozzles for up and down motion therealong, with the needle-nozzles threading through the conic guideways, and the plate member being manually tiltable forward toward the operator at an angle to its normally-horizontal position to receive the open top of the shipping package and the lot of containers therefrom into the conic guideways.

21. Apparatus for loading and washing package-lots of containers of the ampul and vial types, as described in claim 19, and having additional features, in that said plate means consists of a pair of cooperating plates, thus comprising a two-part plate means; one plate constituting a container-transfer plate having rows of conic guideways, and being manually operable and tiltable forward toward the operator, away from the upright needle-nozzles, on an axis parallel with said rows of conic guideways, to receive the open top of the shipping package; and the other plate constituting a needle-guide threading-plate having rows of throats, in coaxial registration with the conic guideways of the transfer plate, in which throats the upright needle-nozzles are confined for a threading operation through said transfer plate; and said two-part plate means as a unit and said needle-nozzles having relative movement, the needle-guide threading-plate being disposed under and adjacent the tiltable container-transfer plate and retained in horizontal position on the upright needle-nozzles.

22. Apparatus for loading and washing package-lots of containers of the ampul and vial types, as described in claim 19, and having additional features, in that said plate means is provided with rows of conic guideways in coaxial alignment with the rows of apertures, and is of mobile utility, that is, manually removable from the needle-nozzles for engaging and receiving the package-lot rows of containers into the rows of conic guideways and is manually replaceable on the needle-nozzles for dump-loading the package-lot of containers into the apparatus coaxial with the rows of apertures.

23. Apparatus for loading and washing package-lots of containers of the ampul and vial types, as described in claim 19, and having unloading means in addition thereto, in that a take-off tray is included as a cooperating part of the apparatus, which take-off tray is adapted to be manually placed upside down on the washed inverted containers to embrace them in situ, and in which tray the operator unloads the containers from the needle-nozzles in massed-lot contiguous-body relation and with their mouths turned upward.

24. Apparatus for loading and washing package-lots of containers of the ampul and vial types, as described in claim 19, and having unloading means in addition thereto, in that a take-off tray is included as a cooperating part of the apparatus, which take-off tray is adapted to be manually placed upside down on the washed inverted containers to embrace them in situ, and in which tray the operator unloads the containers from the needle-nozzles in massed-lot contiguous-body relation and with their mouths turned upward; and a storage tray also included as a cooperating part of the apparatus, which storage tray is adapted to be manually placed upside down on and over the massed-lot of containers held in contiguous-body relation within the take-off tray with their mouths turned upward, and by which manually inverting said trays as a unit causes the containers to transfer into said storage tray with their mouths turned downward.

25. Apparatus for handling and washing package-lots of containers of the ampule and vial types which are packed upright in contiguous-body relation within an original-shipping package, comprising a fluid-pressure chamber having upright needle-nozzles arranged in rows and adapted to register coaxially with the containers and the rows thereof in the shipping package when inverted into the apparatus, a needle-guide plate disposed in normally-horizontal position and being provided with rows of throats in which the rows of upright needle-nozzles are confined and guided, a cone plate mounted on the needle-guide plate and being provided with rows of conic guideways in coaxial registry with the rows of needle-nozzles and with the rows of throats, the two plates as a unit and the needle-nozzles having relative vertical motion, the cone plate having relative tilting angular motion with respect to the normally-horizontal needle-guide plate, a package-centering guide-flange provided on the cone plate adapted to receive the opened shipping package with its lot of containers which the operator places therein and which he manually holds against the cone plate as he tilts the latter toward himself, and, by reverse-tilting the shipping package and cone plate as a unit, manually returns the cone plate to its normally-horizontal position on the needle-guide plate, thereby inverting the shipping package onto the cone plate for dump-loading the package-lot of containers inverted in situ within the washing apparatus, that is, into the rows of conic guideways, and thereupon removing the shipping package from its lot of containers and discarding it before washing the containers.

26. Apparatus for loading and washing package-lots of containers of the ampul and vial types, as described in claim 25, and having unloading means in addition thereto, comprising a cooperating take-off tray and storage tray, the trays being dimension-formed to fit the lot of "containers inverted in situ within the washing apparatus" and also to engage each other, whereby one tray is placed manually upside down upon the inverted lot of containers after washing them and manipulated to initially unload said lot of containers in upright position, the other tray being placed upside down upon the unloaded upright lot of containers in the first tray, and by re-inverting both trays as a unit the lot of containers is manipulated to final-unloaded inverted position and held in massed-lot contiguous-body relation within the last-named tray.

27. A machine for washing open-mouth containers of the ampul and vial types in unified-lots held upright in contiguous-body relation and in rows, comprising a fluid-pressure chamber having rows of upright needle-nozzles adapted to register coaxially with the rows of containers, a needle-guide plate having rows of throats registering coaxially with the upright needle-nozzles and in which the latter are operatively confined; a cone-plate means provided with rows of conic guideways adapted to register coaxially with the rows of the unified-lot of containers, and being mounted above and adjacent the needle-guide plate, with the rows of conic guideways aligned coaxially with the rows of throats; a centering-guide flange carried by the cone-plate means adapted to receive the unified-lot of containers inverted thereinto by an operator for automatically guiding the rows of container mouths into threading alignment with the rows of upright needle-nozzles, by which to manually load in situ and hence in contiguous-body relation the unified-lot of containers inverted into the machine for washing them, and means for operatively supporting the two plates as a unit above the fluid-pressure chamber and for relative movement between the upright needle-nozzles and said two plates.

28. A machine for washing open-mouth containers of the ampul and vial types, as described in claim 27, but wherein the containers are long-neck open-mouth ampuls which are ultra-fragile, and in which the rows of conic guideways are formed of heat-resisting hard thermosetting plastic material to provide a frictionless surface affording minimum-mechanical shock to the container mouths engaging said guideways.

29. A machine as described in claim 28, except that it is specially devised for washing long-neck open-mouth ultra-fragile ampuls and is provided with means for handling the ampuls after washing them, comprising an ampul-handling device having rows of pocketing means carrying said unified-lot of ampuls inverted in contiguous-body relation and in rows, the pocketing means having a depth less than the length of the down-turned necks, thus extending said necks and open mouths downward beyond the pocketing means, thereby adapting the down-turned ampul mouths to enter the conic guideways and the needle-nozzles to thread into and wash the ampuls held by the handling device, and whereby the washed ampuls are removed from the machine in the handling device and left therein for carrying them as a unified-lot away from the machine.

30. A handling plate operative with a paper shipping package of containers of the ampul and vial types adapted for parenteral medicaments, the containers having body shoulders from which extend necks with open mouths, and packed upright in quantity-lots in contiguous-body relation in rows within the package; said handling plate made of contaminant-resisting material, provided with rows of round apertures, and also with package-centering means which locates the plate and the open top side of the box in fitted relation for aligning said apertures with the container mouths, the apertures being smaller than the body shoulders but larger than the necks; whereby the plate and package in said fitted relation are adapted as a unit to be turned manually upside down, thus sliding the containers by gravity toward the plate, dropping the necks through the apertures, with the shoulders resting on the plate, hence in situ, with their open mouths positively spaced from each other preventing impingement, and the package withdrawn from the quantity-lot of containers, thus eliminating the paper shipping package as a contaminant, and the open mouths being upside down inhibit entry of contaminants from the air while carrying the quantity-lot of containers in situ along a laboratory processing line in said handling plate.

31. An apparatus for processing medicament containers of the ampul and vial types, comprising in combination, a washer, a paper shipping box having an open top in which is packed a group of medicament containers having body shoulders and necks with open mouths, the containers being upright and in contiguous-body relation, said box being taller than said containers therein, a tray-like handling device having a group of apertures, each aperture being larger than the neck of a container and smaller than the shoulder thereof, means on said tray-like handling device engageable with said box and being adapted to so locate said device relatively to the group of containers in the box that the apertures of the device align directly over the necks of the containers, said box and device thus located being invertable as a unit, whereupon the containers fall down to their shoulders respectively in the respective apertures of the device, said box after being inverted with the device being removable therefrom and from the group of containers seated in the apertures, and said device having hand grip portions whereby the device holding the containers therein and the box removed may be carried about and placed in and withdrawn from the washer free of hand contact with said containers.

32. In an apparatus for mass washing and sterilizing ampuls free of hand contact with the same, the combination of an ampul washer having upwardly directed jet tubes, a portable ampul-holding tray transferable to and from the washer, said tray providing individual seats for a mass assembly of ampuls in which they are held solely by their own weight in definite spaced relation and without removal therefrom in conveyance within the tray to which they are transferred in mass from their packing boxes to the washer for the washing operation and in subsequent conveyance from the washer.

33. An apparatus for processing medicament ampuls, comprising in combination, a washer, a paper shipping box having an open top in which is packed a group of ampuls having body shoulders and necks with open mouths, the ampuls being upright and in contiguous-body relation, said box being taller than said ampuls therein, an ampul support of flat form and of contaminant-resisting material having a group of apertures, each aperture being larger than the neck of an ampul and smaller than its shoulder, the ampul support being dimension-sized at its perimeter to make a slip-entry fit into the open top of said box and engageable within the upper edges thereof above the ampuls and being adapted to so locate said support relatively to the group of ampuls in the box that the apertures of the support align directly over the necks of the ampuls, said box and support thus located being invertable as a unit, whereupon the ampuls fall down to their shoulders respectively in the respective apertures of the support, said apertures being of sufficient depth to resist tilting of said necks therein and thus stabilizing the ampuls resting on and in said support, and said sufficient depth being less than the length of said necks by which the latter may extend through said apertures, said box after being inverted with the support being removable therefrom and from the group of ampuls seated in the apertures, and said support being adapted to hold the ampuls therein and whereby the ampuls, with the box removed therefrom, may be carried about and placed in and withdrawn from the washer free of hand contact with said ampuls.

RUDOLPH N. PRICE.

References Cited in the file of this patent

UNITED STATES PATENTS

| Number | Name | Date |
|---|---|---|
| 695,446 | Doherty | Mar. 18, 1902 |
| 843,056 | Young | Feb. 5, 1907 |
| 843,555 | Weymar | Feb. 5, 1907 |
| 1,017,829 | Wakefield | Feb. 20, 1912 |
| 1,088,642 | Wilcox | Feb. 24, 1914 |
| 1,253,748 | Tyson | Jan. 15, 1918 |
| 1,400,797 | Burnham | Dec. 20, 1921 |
| 1,460,068 | Linfoot | June 26, 1923 |
| 1,757,035 | Beckman | May 6, 1930 |
| 1,814,680 | Ford | July 14, 1931 |
| 1,988,795 | Howard | Jan. 22, 1935 |
| 2,143,518 | Kolin | Jan. 10, 1939 |
| 2,222,676 | Mahler | Nov. 26, 1940 |
| 2,254,980 | Simmons | Sept. 2, 1941 |
| 2,311,709 | Taylor | Feb. 23, 1943 |
| 2,330,671 | Boh | Sept. 28, 1943 |
| 2,338,586 | Keller | Jan. 4, 1944 |
| 2,386,076 | Taylor et al. | Oct. 2, 1945 |
| 2,419,040 | Stepanian | Apr. 15, 1947 |
| 2,431,988 | Cozzoli | Dec. 2, 1947 |
| 2,546,385 | Christina | Mar. 27, 1951 |

FOREIGN PATENTS

| Number | Country | Date |
|---|---|---|
| 577,306 | Great Britain | May 13, 1946 |